United States Patent
Youn et al.

(10) Patent No.: US 12,137,430 B2
(45) Date of Patent: Nov. 5, 2024

(54) MULTI-ACCESS PROTOCOL DATA UNIT SESSION MANAGEMENT

(71) Applicant: LG ELECTRONICS INC., Seoul (KR)

(72) Inventors: Myungjune Youn, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 491 days.

(21) Appl. No.: 17/310,870

(22) PCT Filed: Mar. 10, 2020

(86) PCT No.: PCT/KR2020/003331
§ 371 (c)(1),
(2) Date: Aug. 27, 2021

(87) PCT Pub. No.: WO2020/184956
PCT Pub. Date: Sep. 17, 2020

(65) Prior Publication Data
US 2022/0132454 A1    Apr. 28, 2022

(30) Foreign Application Priority Data

Mar. 12, 2019  (KR) .......... 10-2019-0028404
Apr. 2, 2019   (KR) .......... 10-2019-0038677

(51) Int. Cl.
*H04W 60/00*   (2009.01)
*H04W 76/10*   (2018.01)
*H04W 76/34*   (2018.01)

(52) U.S. Cl.
CPC .......... *H04W 60/00* (2013.01); *H04W 76/10* (2018.02); *H04W 76/34* (2018.02)

(58) Field of Classification Search
CPC ...... H04W 60/00; H04W 76/10; H04W 76/34
See application file for complete search history.

(56) References Cited

U.S. PATENT DOCUMENTS

2019/0069194 A1   2/2019  Jun et al.
2019/0116229 A1*  4/2019  Shi .................. H04L 67/143
(Continued)

FOREIGN PATENT DOCUMENTS

CN   108574969   9/2018
CN   109417826   3/2019
(Continued)

OTHER PUBLICATIONS

The State Intellectual Property Office of the People's Republic of China Application Serial No. 202080020586.1, Office Action dated Jun. 14, 2023, 13 pages.

(Continued)

*Primary Examiner* — Barry W Taylor
(74) *Attorney, Agent, or Firm* — LEE, HONG, DEGERMAN, KANG & WAIMEY

(57) ABSTRACT

A disclosure of the present specification provides a method for managing a PDU session performed by an SMF node. The method may comprise the steps of: determining to release an MA PDU session for at least one access of a 3GPP access and a non-3GPP access; and transmitting a message associated with the release of the PDU session to an AMF node.

5 Claims, 42 Drawing Sheets

(56) References Cited

U.S. PATENT DOCUMENTS

| | | | | |
|---|---|---|---|---|
| 2019/0394833 | A1* | 12/2019 | Talebi Fard | H04W 68/005 |
| 2020/0260401 | A1* | 8/2020 | So | H04W 76/50 |
| 2020/0267785 | A1* | 8/2020 | Talebi Fard | H04W 40/248 |
| 2020/0280836 | A1* | 9/2020 | Velev | H04W 76/19 |
| 2022/0078871 | A1* | 3/2022 | Won | H04W 76/19 |
| 2022/0312198 | A1* | 9/2022 | Koshta | H04W 4/029 |
| 2023/0254755 | A1* | 8/2023 | Talebi Fard | H04W 40/248 370/256 |
| 2023/0300943 | A1* | 9/2023 | Wang | H04M 15/8228 370/329 |

FOREIGN PATENT DOCUMENTS

| | | |
|---|---|---|
| KR | 20190021461 | 3/2019 |
| WO | 2018175000 | 9/2018 |

OTHER PUBLICATIONS

ETRI, "23.793: Proposed Solution for Multi-access PDU Session," S2-182123, SA WG2 Meeting #126, Mar. 2018, 8 pages.

ETRI, "Updating 6.2 Solution 2 to support a Multi-Access PDU Session with a single PDU session ID," S2-183690, SA WG2 Meeting #127, Apr. 2018, 10 pages.

ETRI et al., "Updating 6.2 Solution 2 to add a procedure for Multi-Access PDU Session Modification," S2-187104, SA WG2 Meeting #128, Jul. 2018, 3 pages.

European Patent Office Application Serial No. 20769064.5, Search Report dated Mar. 10, 2022, 14 pages.

3rd Generation Partnership Project, "Technical Specification Group Core Network and Terminals; Non-Access-Stratum (NAS) protocol for 5G System (5GS); Stage 3 (Release 15)," 3GPP TS 24.501 V15.2.1, Jan. 2019, 455 pages.

Huawei et al., "Update solution 4.23 and interim agreement on session management," S2-165646, SA WG2 Meeting #117, Oct. 2016, 5 pages.

PCT International Application No. PCT/KR2020/003331, International Search Report dated Jun. 18, 2020, 4 pages.

3rd Generation Partnership Project, "Technical Specification Group Services and System Aspects; Study on access traffic steering, switch and splitting support in the 5G system architecture (Release 16)," 3GPP TR 23.793 V16.0.0, Dec. 2018, 116 pages.

3rd Generation Partnership Project, "Technical Specification Group Services and System Aspects; Procedures for the 5G System; Stage 2 (Release 15)," 3GPP TS 23.502 V15.4.1, Jan. 2019, 349 pages.

Huawei et al., "Clarification on PDU Session modification and release procedure," S2-1902312, 3GPP TSG-SA2 Meeting #131, Mar. 2019, 12 pages.

* cited by examiner

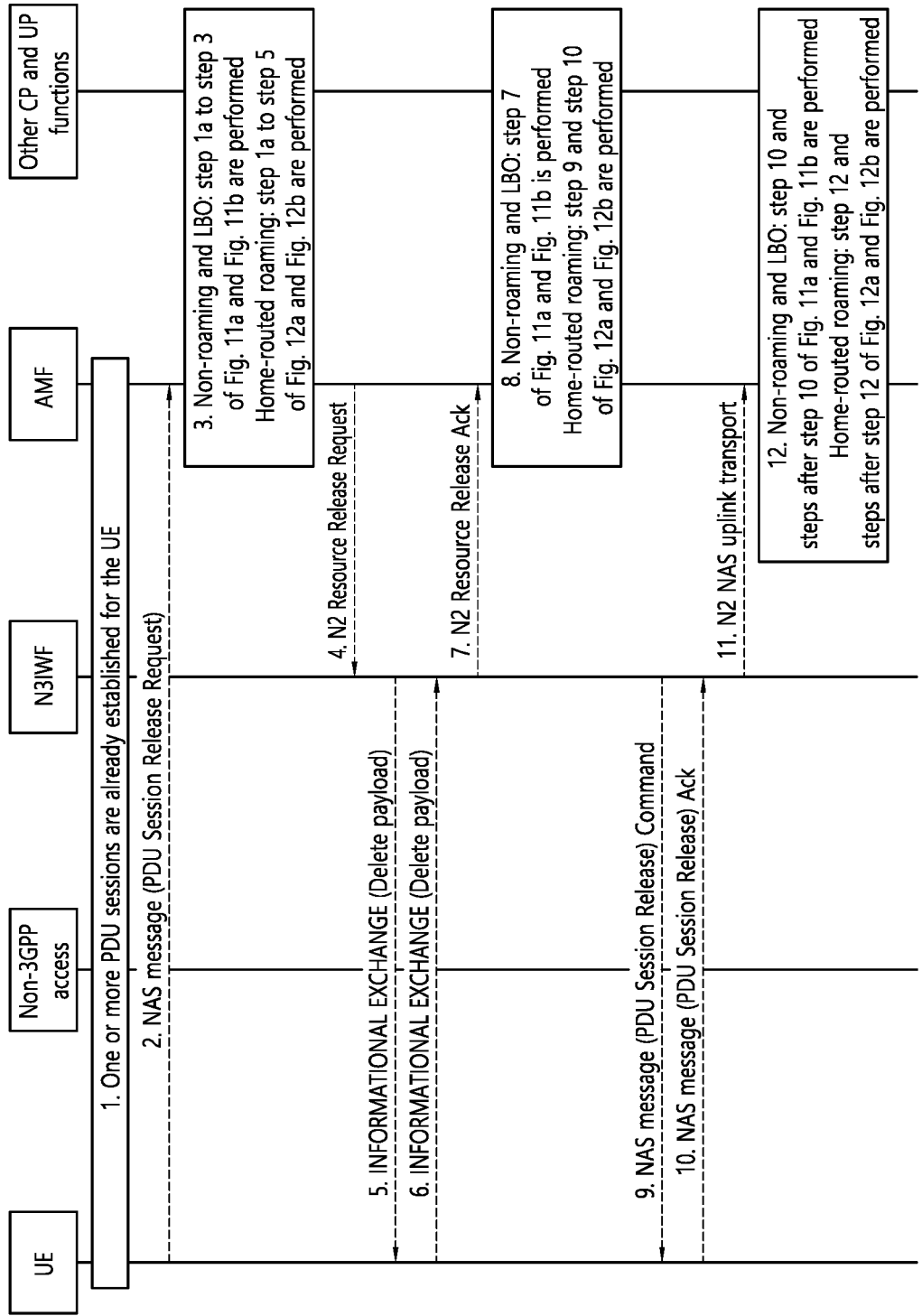

MULTI-ACCESS PROTOCOL DATA UNIT SESSION MANAGEMENT

CROSS-REFERENCE TO RELATED APPLICATIONS

This application is the National Stage filing under 35 U.S.C. 371 of International Application No. PCT/KR2020/003331, filed on Mar. 10, 2020, which claims the benefit of earlier filing date and right of priority to Korean Application Nos. 10-2019-0028404, filed on Mar. 12, 2019, and 10-2019-0038677, filed on Apr. 2, 2019, the contents of which are all hereby incorporated by reference herein in their entireties.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

In 5G mobile communication, a MA (Multi Access) PDU (Protocol Data Unit) session was introduced. Meanwhile, a procedure for managing an MA PDU session has not been clearly defined in the prior art. As an example, it is not clearly defined which operations are to be performed in order to release the MA PDU session. As another example, when the user plane resource for one access is released after the MA PDU session is established in both accesses, it is not clearly defined what operations should be performed to add the user plane resource of the MA PDU session. As another example, when the MA PDU session is deactivated for at least one access, it is not clearly defined what operations are to be performed in order to re-activate the MA PDU session. As another example, the operation of synchronizing the PDU session state of the MA PDU session between the UE and the network node (e.g., AMF, SMF, etc.) is not clearly defined.

SUMMARY

Accordingly, a disclosure of the present specification has been made in an effort to solve the aforementioned problem.

In order to solve the above problems, one disclosure of the present specification provides a method for managing a PDU session performed by an SMF node. The method may includes: determining to release the MA PDU session for at least one of 3GPP access and non-3GPP access; and transmitting a message related to PDU session release to the AMF node.

In order to solve the above problems, one disclosure of the present specification provides a method for managing a PDU session performed by an AMF node. The method may include: determining to release the MA PDU session for at least one of 3GPP access and non-3GPP access; and transmitting a message related to PDU session update or a message related to PDU session release to the SMF.

In order to solve the above problems, one disclosure of the present specification provides a method for managing an MA PDU session performed by a wireless communication device. The method may include: determining addition or re-activation of a user plane of the MA PDU session for one of 3GPP access and non-3GPP access; and transmitting a PDU session establishment request message, a service request message, or a registration request message to the AMF node.

In order to solve the above problems, one disclosure of the present specification provides an SMF node for a MA PDU session. The SMF node may include at least one processor; and at least one memory for storing instructions and operably electrically connectable with the at least one processor, wherein the operations performed based on the instructions being executed by the at least one processor may include: determining to release the MA PDU session for at least one of 3GPP access and non-3GPP access; and transmitting a message related to PDU session release to the AMF node.

In order to solve the above problems, one disclosure of the present specification provides an AMF node for a MA PDU session. The AMF node may include at least one processor; and at least one memory for storing instructions and operably electrically connectable with the at least one processor, wherein the operations performed based on the instructions being executed by the at least one processor may include: determining to release the MA PDU session for at least one of 3GPP access and non-3GPP access; and transmitting a message related to PDU session update or a message related to PDU session release to the SMF.

In order to solve the above problems, one disclosure of the present specification provides a wireless communication apparatus for a MA PDU session. The wireless communication device may include at least one processor; and at least one memory to store an instruction and operably electrically connectable with the at least one processor, wherein the operation performed based on the instruction being executed by the at least one processor may comprise: determining addition or re-activation of a user plane of the MA PDU session for one of 3GPP access and non-3GPP access; and transmitting a PDU session establishment request message, a service request message, or a registration request message to the AMF node.

In order to solve the above problems, one disclosure of the present specification provides an apparatus in mobile communication. The apparatus may include at least one processor; and at least one memory for storing instructions and operably electrically connectable with the at least one processor, wherein the operations performed based on the instructions being executed by the at least one processor may include: determining the addition or re-activation of a user plane of the MA PDU session for one of 3GPP (3rd Generation Partnership Project) access and non-3GPP access; and generating a transmission signal for transmitting a PDU session establishment request message, a service request message, or a registration request message to the AMF node.

In order to solve the above problems, one disclosure of the present specification provides a non-volatile computer-readable storage medium storing instructions. The instructions, when executed by one or more processors, may cause the one or more processors to: determining addition or re-activation of a user plane of the MA PDU session for access of one of 3rd Generation Partnership Project (3GPP) access and non-3GPP (non-3GPP) access; and transmitting a PDU session establishment request message or a service request message or a registration request message to an Access and Mobility Management Function (AMF) node.

Accordingly, a disclosure of the present specification has been made in an effort to solve the aforementioned problem.

BRIEF DESCRIPTION OF THE DRAWINGS

FIG. 13 shows a third example of a PDU session release procedure.

DESCRIPTION OF EXEMPLARY EMBODIMENTS

Figure 1:
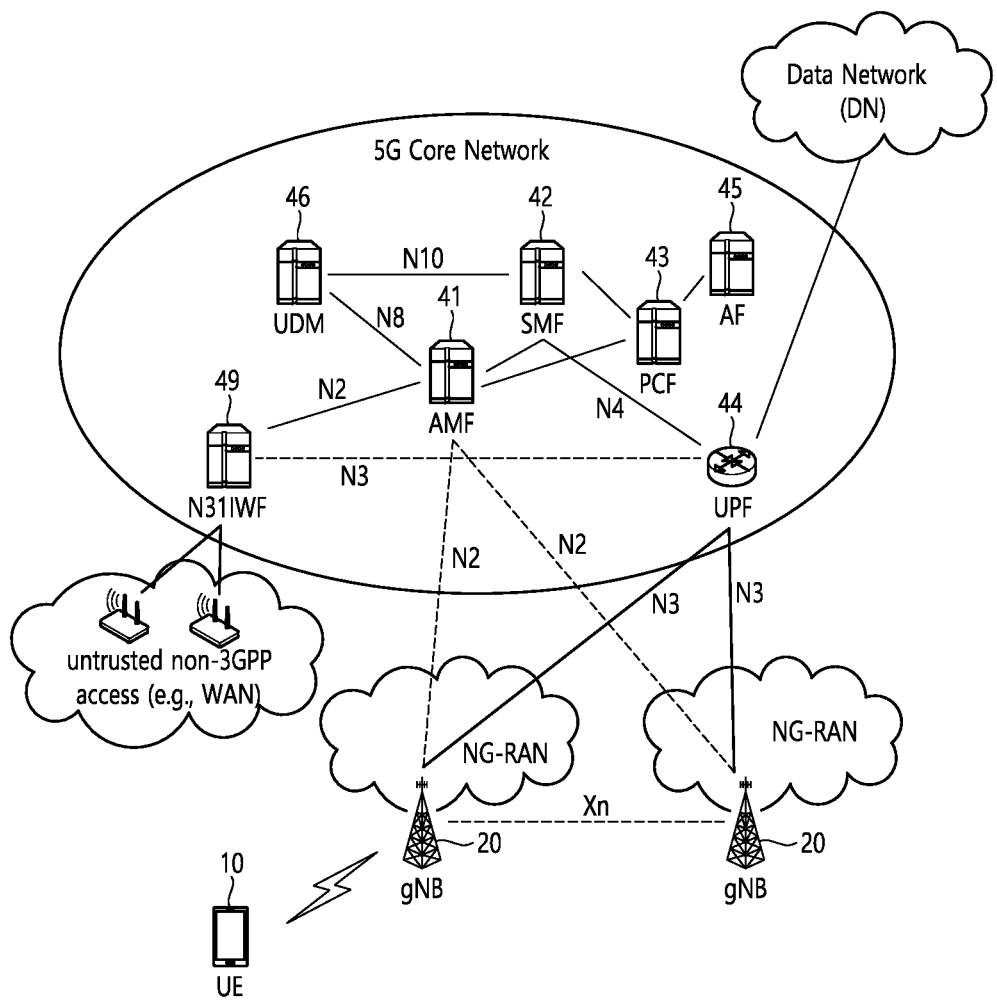
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C"

herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 41, a session management function (SMF) 42, a policy control function (PCF) 43, a User Plane Function (UPF) 44, an application function (AF) 45, a unified data management (UDM) data network 46, and a non-3GPP interworking function (N3IWF) 49.

A UE 10 is connected to a data network via the UPF 44 through a Next Generation Radio Access Network (NG-RAN) including the gNB 20.

The UE 10 may be provided with a data service even through untrusted non-3GPP access, e.g., a wireless local area network (WLAN). In order to connect the non-3GPP access to a core network, the N3IWF 49 may be deployed.

The illustrated N3IWF 49 performs a function of managing interworking between the non-3GPP access and the 5G system. When the UE 10 is connected to non-3GPP access (e.g., WiFi referred to as IEEE 801.11), the UE 10 may be connected to the 5G system through the N3IWF 49. The N3IWF 49 performs control signaling with the AMF 41 and is connected to the UPF 44 through an N3 interface for data transmission.

The illustrated AMF 41 may manage access and mobility in the 5G system. The AMF 41 may perform a function of managing NAS security. The AMF 41 may perform a function of handling mobility in an idle state.

The illustrated UPF 44 is a type of gateway through which user data is transmitted/received. The UPF 44 may perform the entirety or a portion of a user plane function of a serving gateway (S-GW) and a packet data network gateway (P-GW) of 4G mobile communication.

The UPF 44 operates as a boundary point between a next generation radio access network (NG-RAN) and the core network and maintains a data path between the gNB 20 and the SMF 42. In addition, when the UE 10 moves over an area served by the gNB 20, the UPF 44 serves as a mobility anchor point. The UPF 44 may perform a function of handling a PDU. For mobility within the NG-RAN (which is defined after 3GPP Release-15), the UPF 44 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 44 may correspond to a termination point of a data interface toward the data network.

The illustrated PCF 43 is a node that controls an operator's policy.

The illustrated AF 45 is a server for providing various services to the UE 10.

The illustrated UDM 46 is a kind of server that manages subscriber information, such as home subscriber server (HSS) of 4G mobile communication. The UDM 46 stores and manages the subscriber information in a unified data repository (UDR).

The illustrated SMF 42 may perform a function of allocating an Internet protocol (IP) address of the UE. In addition, the SMF may control a protocol data unit (PDU) session.

For reference, hereinafter, reference numerals for AMF (41), SMF (42), PCF (43), UPF (44), AF (45), UDM (46), N3IWF (49), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band is defined as two types of frequency ranges (FR1, FR2). FR1 is 410 MHz-7125 MHz, and FR2 is 24250 MHz-52600 MHz, which may mean millimeter wave (mmW).

For convenience of explanation, among the frequency ranges used in the NR system, FR1 may mean "sub 6 GHz range" and FR2 may mean "above 6 GHz range" and may be called millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
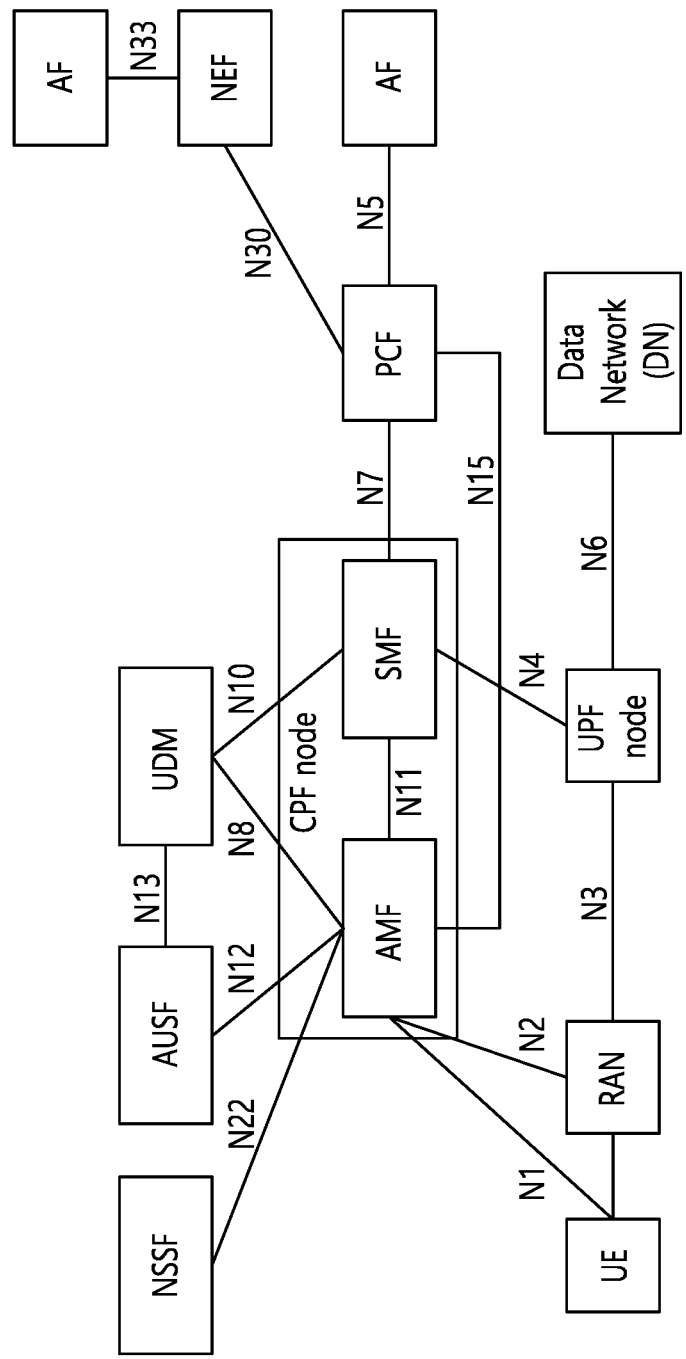
FIG. 2 is an exemplary diagram illustrating a predicted structure of a next generation mobile communication in terms of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
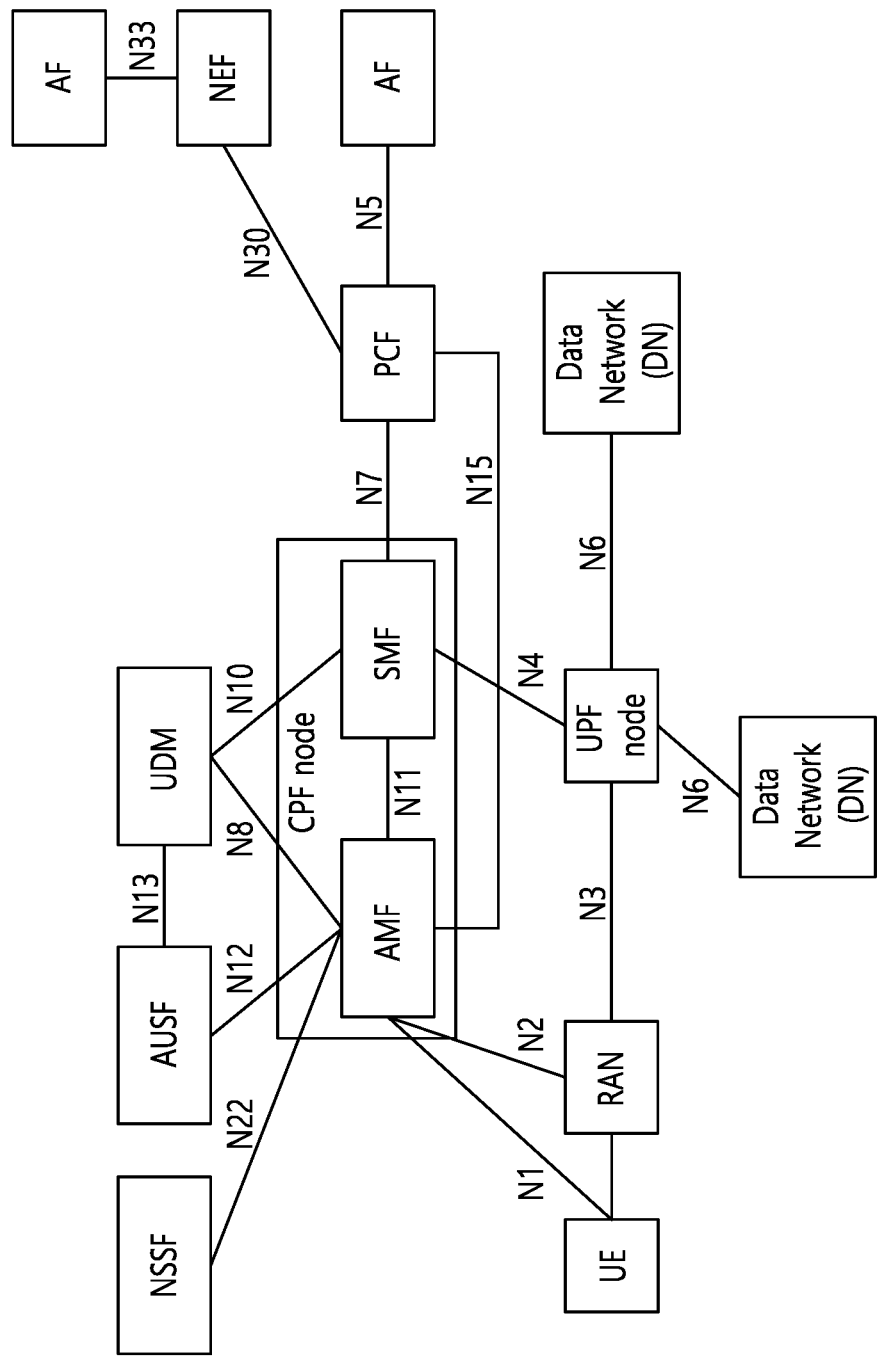
FIG. 3 is an exemplary diagram illustrating an architecture for supporting a concurrent access through two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
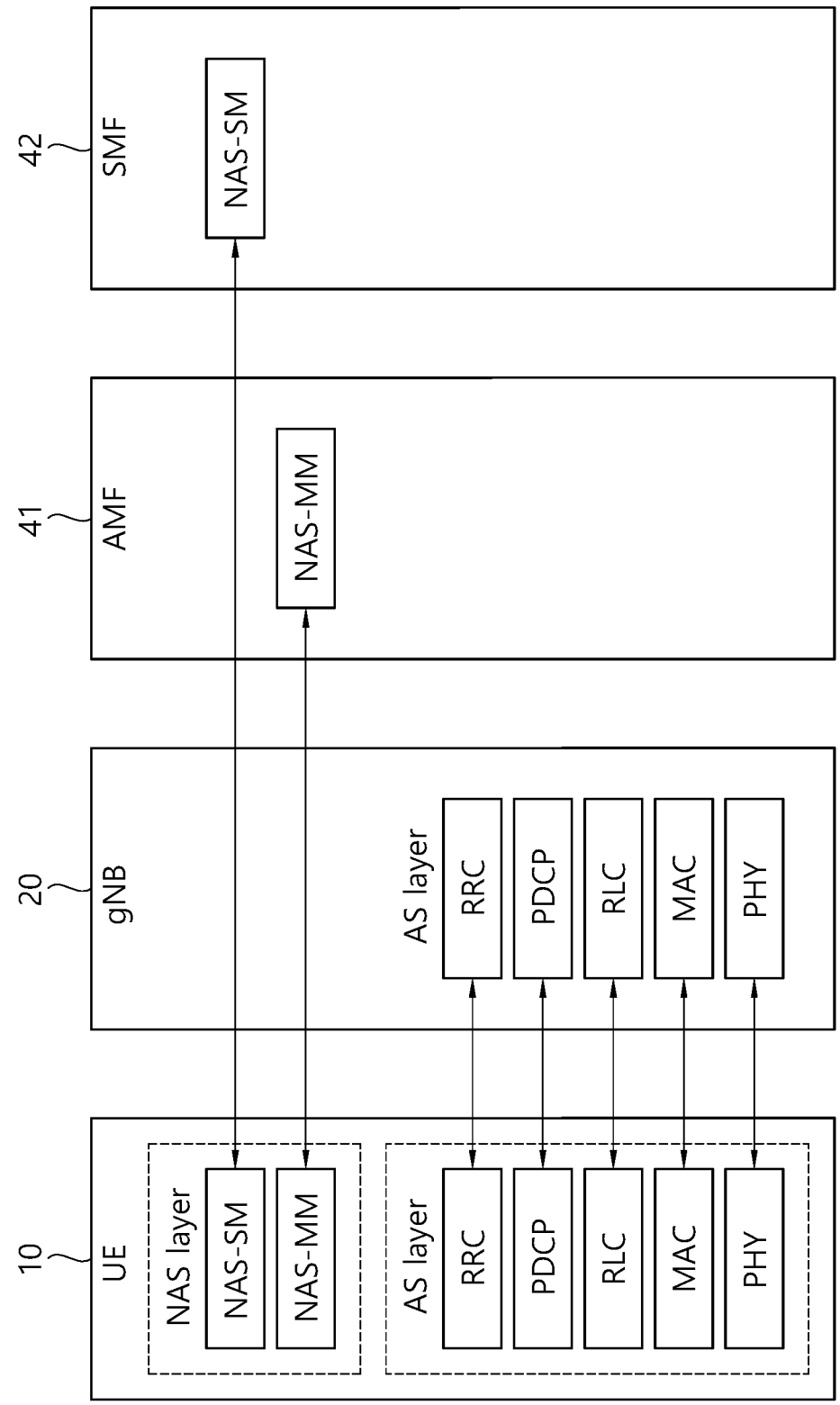
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
    NAS procedures related to AMF include the following.
    Registration management and access management procedures. AMF supports the following functions.
    Secure NAS signal connection between UE and AMF (integrity protection, encryption)

2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
    The NAS entity for the MM creates a NAS-MM message that derives how and where to deliver an SM signaling message through a security header representing the NAS transmission of SM signaling and additional information on a received NAS-MM.
    Upon receiving SM signaling, the NAS entity for the SM performs an integrity check of the NAS-MM message, analyzes additional information, and derives a method and place to derive the SM signaling message.

Meanwhile, in FIG. 4, the RRC layer, the RLC layer, the MAC layer, and the PHY layer located below the NAS layer are collectively referred to as an access stratum (AS).

A network system (i.e., 5GC) for next-generation mobile communication (i.e., 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Roaming in Next Generation Mobile Communication Network>

Meanwhile, there are two methods for managing a PDU session serviced to the UE in a situation in which the UE roams in a visited network, for example, a Visited Public Land Mobile Network (VPLMN). According to the local break out (LBO) method, which is the first method, the PDU session anchor is located in the visited network, and the session control is also handled in the visited network. According to HR (Home Routing) method, which is the second method, the PDU session anchor is located in the home network, and the SMF of the home network may control the session.

Figure 5A:
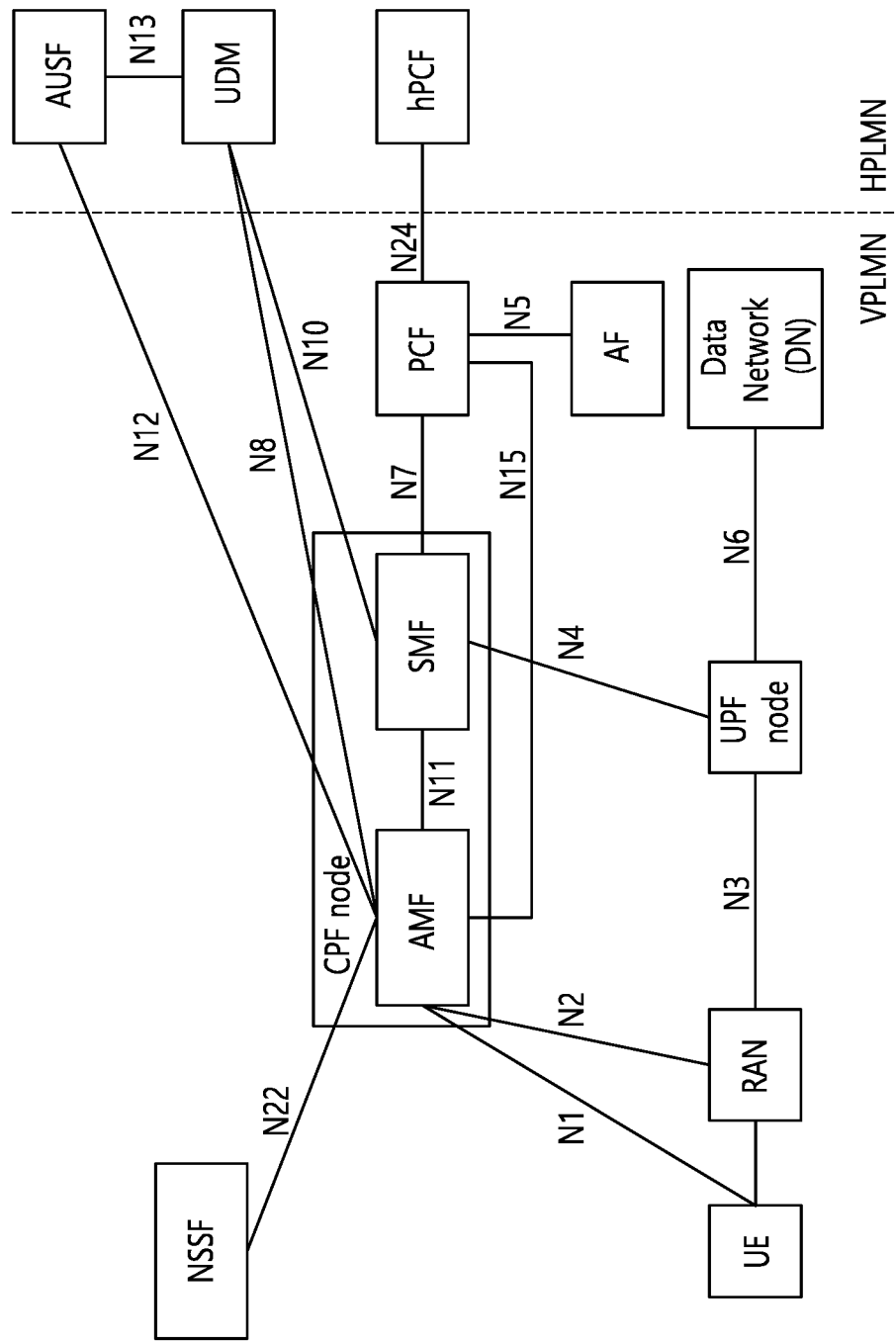
FIG. 5a is an exemplary diagram illustrating an architecture to which a local breakout (LBO) scheme is applied during roaming and FIG. 5b is an exemplary diagram illustrating an architecture to which a home routed (HR) scheme is applied during roaming.
Figure 5B:
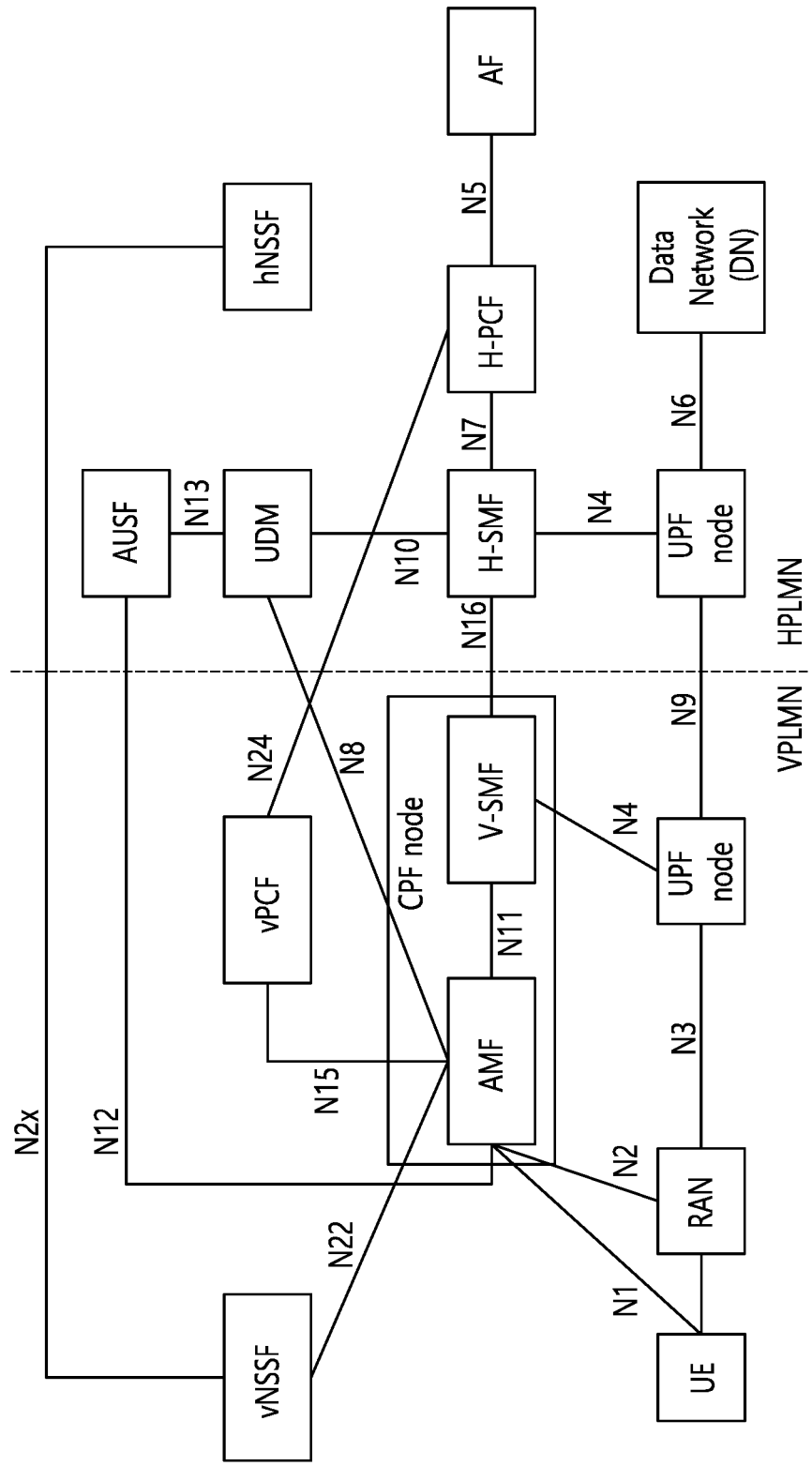
Figure 6A:
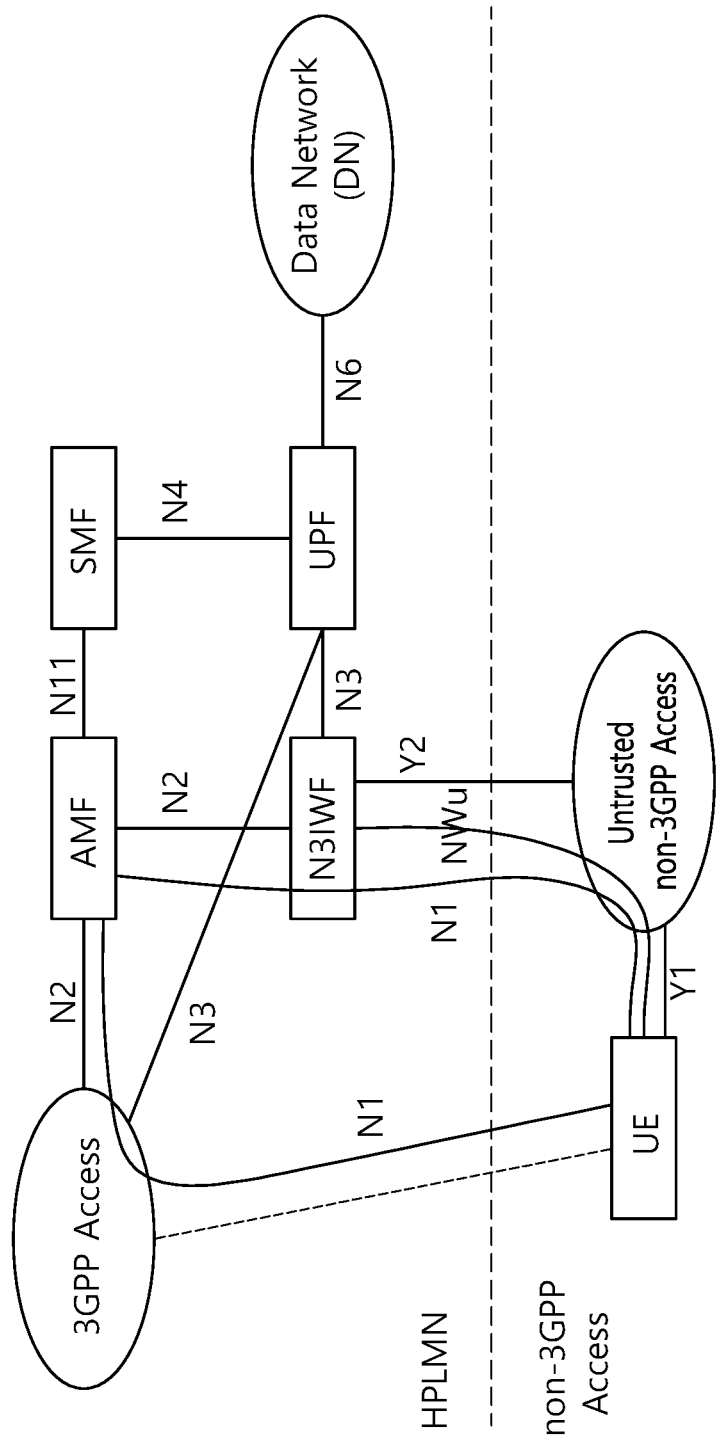
FIGS. 6a to 6f illustrate architectures for detouring data to a non-3GPP network.
Figure 6B:
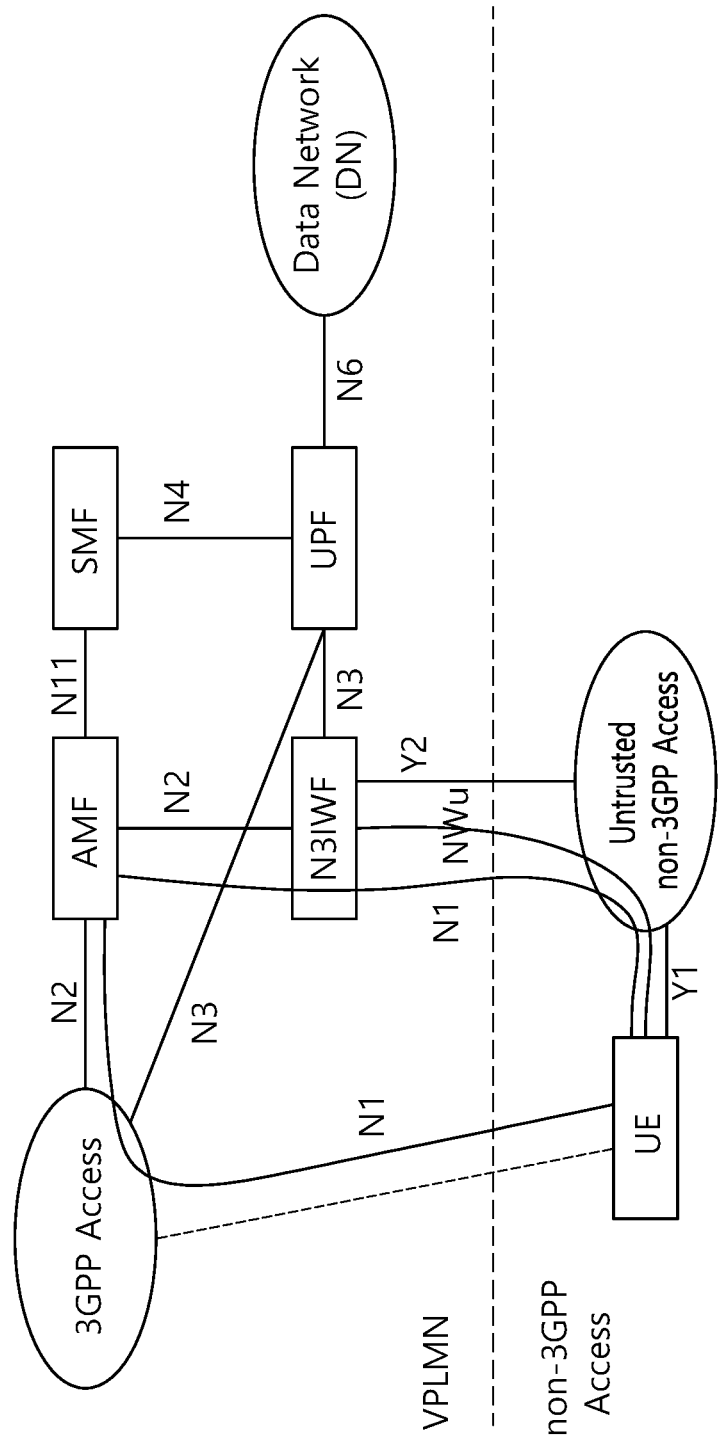
Figure 6C:
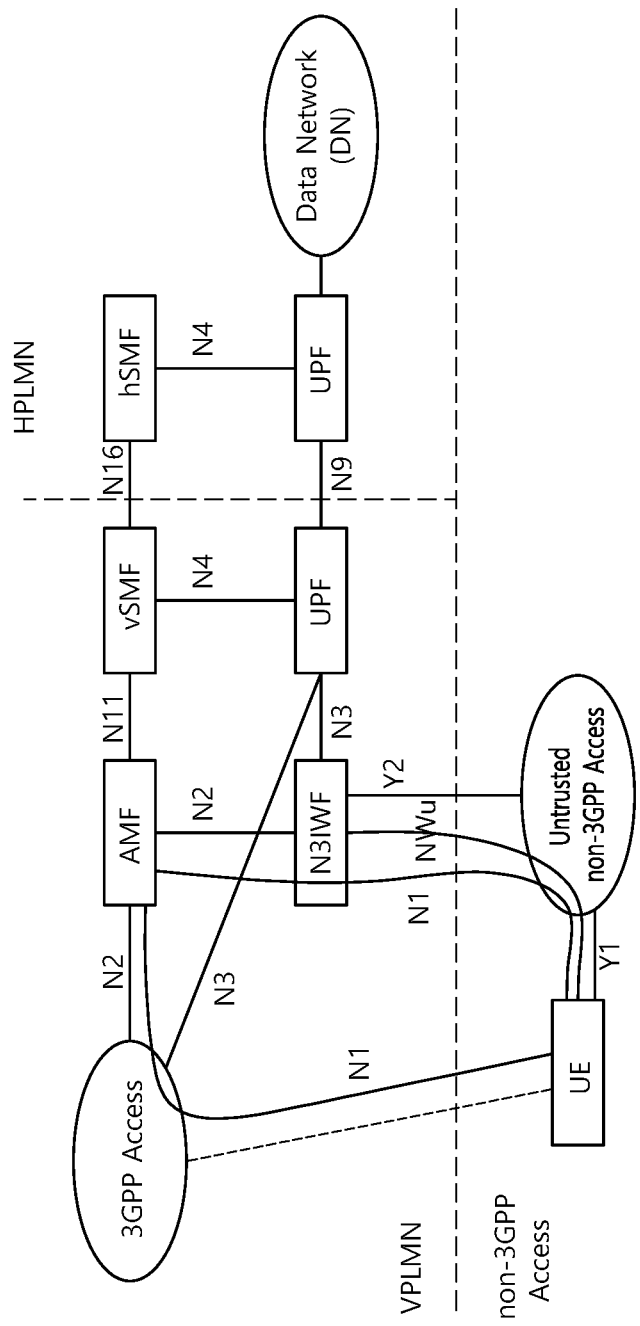
Figure 6D:
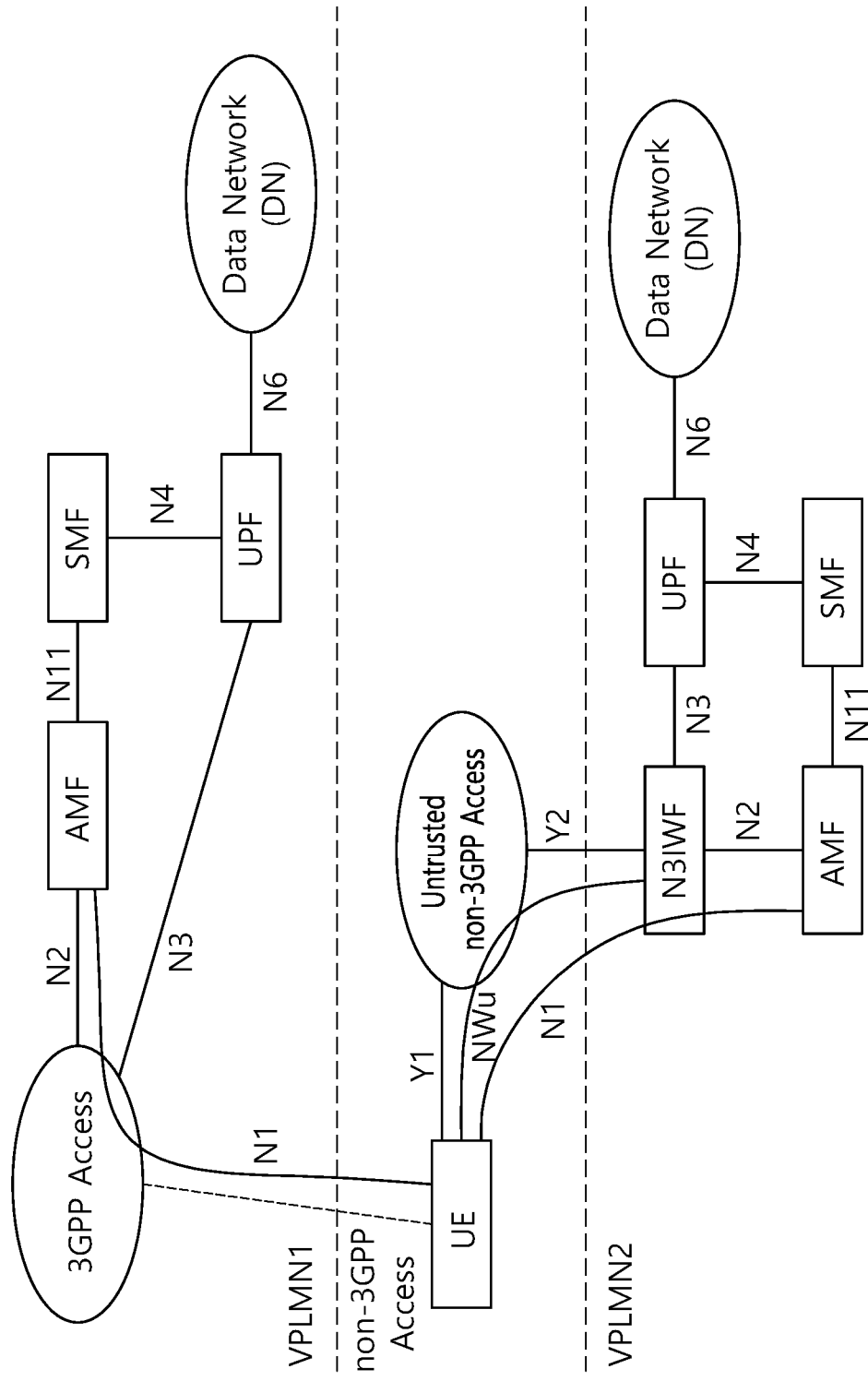
Figure 6E:
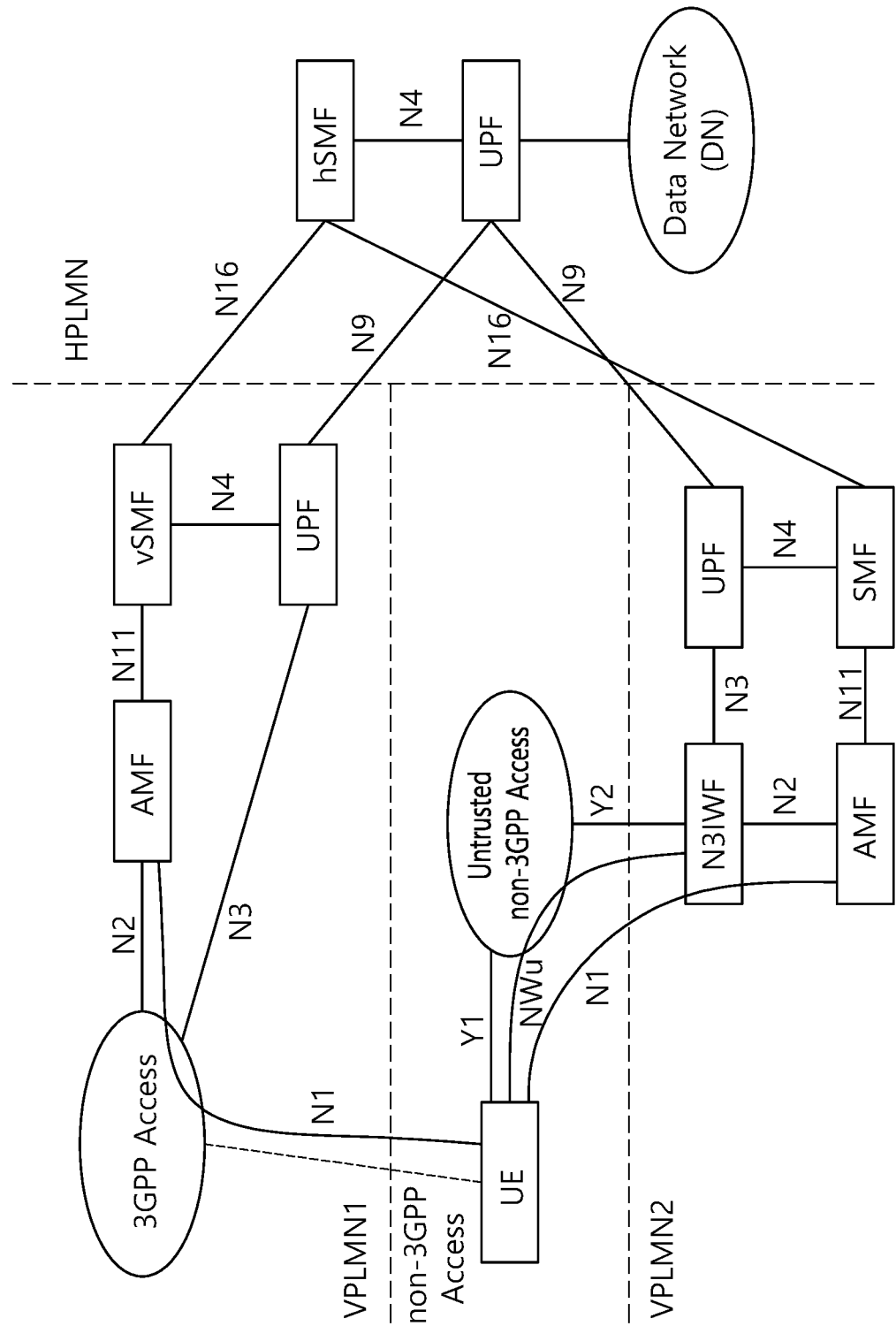
Figure 6F:
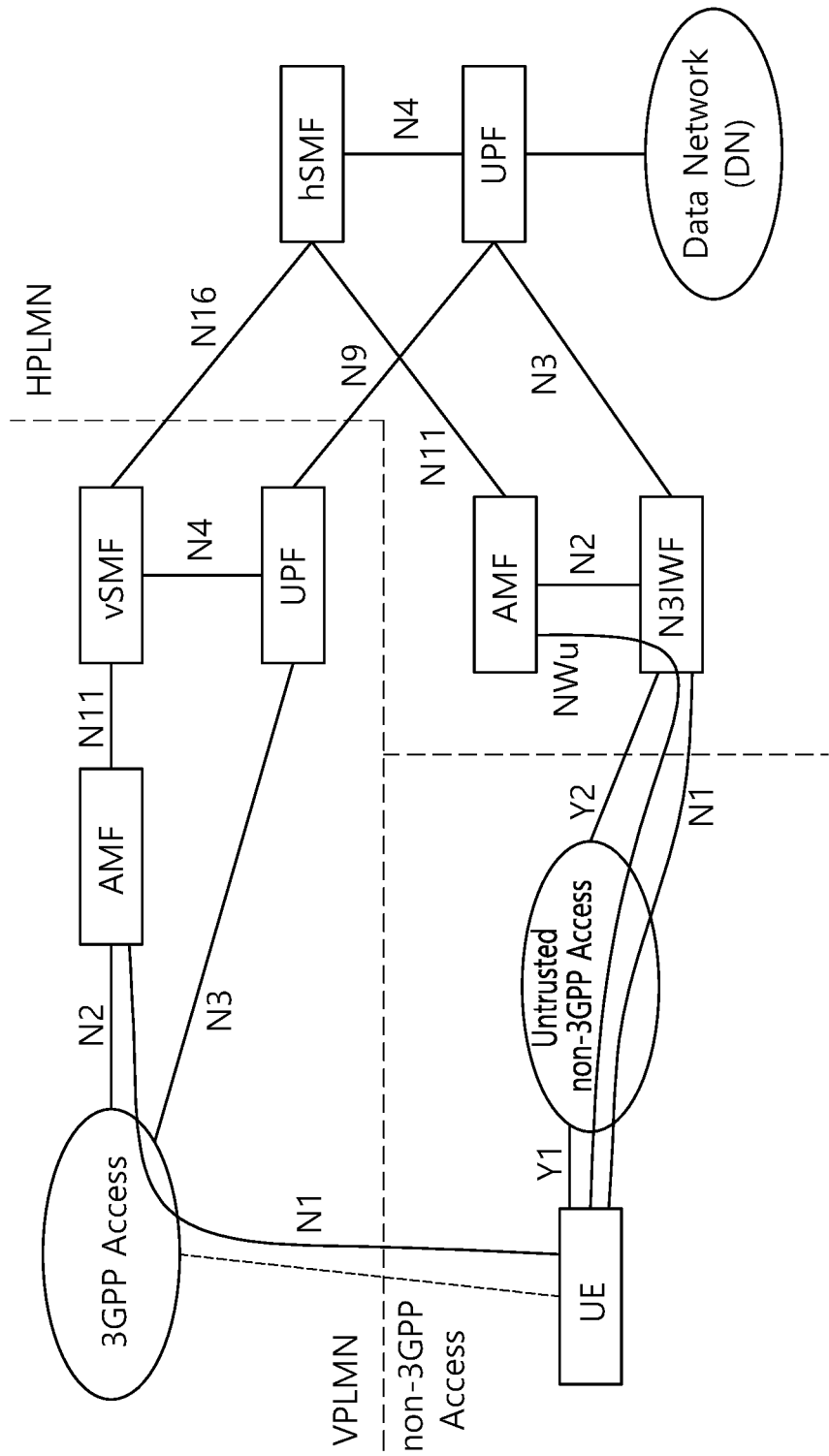

FIG. 5a is an exemplary diagram illustrating an architecture to which a local breakout (LBO) scheme is applied during roaming, and FIG. 5b is an exemplary diagram illustrating an architecture to which a home routed (HR) scheme is applied during roaming.

As illustrated in FIG. 5a, in an architecture to which the LBO scheme is applied, data of a user is delivered to a data network in the VPLMN. To this end, the PCF in the VPLMN performs an interaction with the AF in order to generate a PCC rule for a service in the VPLMN. A CPF node in the VPLMN generates the PCC rule based on a policy set internally according to a roaming agreement with a Home Public Land Mobile Network (HPLMN) operator.

As illustrated in FIG. 5b, in an architecture to which the HR scheme is applied, data of the UE is delivered to the data network in the HPLMN.

<Data Detouring to Non-3GPP Network>

In the next generation mobile communication, the data of the UE may be detoured to a non-3GPP network, e.g., a Wireless Local Area Network (WLAN) or WiFi.

FIGS. 6a to 6f illustrate architectures for detouring data to a non-3GPP network.

The Wireless Local Area Network (WLAN) or Wi-Fi is considered as an untrusted non-GPP network. In order to connect the non-3GPP network to a core network, Non-3GPP InterWorking Function (N3IWF) may be added.

<Session and Service Continuity>

The next-generation mobile communication network provides various modes to support session and service continuity (SSC).

1) SSC Mode 1

In the protocol data unit (PDU) session establishment procedure, the UPF operating as a PDU session anchor is maintained regardless of the access technology (i.e., access type and cell). In the case of an IP-type PDU session, IP continuity is supported regardless of the movement of the UE. SSC mode 1 may be applied to any PDU session type and may also be applied to any access type.

2) SSC Mode 2

When a PDU session has one PDU session anchor, the network may trigger release of the PDU session and instruct the UE to establish the same PDU session. In the process of establishing the new PDU session, a UPF acting as a PDU session anchor may be newly selected. SSC mode 2 may be applied to any PDU session type and may also be applied to any access type.

3) SSC Mode 3

For a PDU session for SSC mode 3, the network may allow the UE to establish a connection using a new PDU session to the same data network before releasing the connection between the UE and the previous PDU session anchor. When the trigger condition is applied, the network may determine whether to select a PDU session anchor suitable for the new condition of the UE, that is, the UPF. SSC mode 3 may be applied to any PDU session type and may also be applied to any access type.

4) Selection of SSC Mode

An SSC mode selection policy may be used to determine the type of SSC mode associated with the UE's application or UE's application group.

The operator may provide the SSC mode selection policy to the UE. The policy may include one or more SSC mode selection policy rules.

<Registration Procedure>

In order to allow mobility tracking and data reception to be performed, and in order to receive a service, the UE needs to gain authorization. For this, the UE shall register to a network. The registration procedure is performed when the UE needs to perform initial registration to a 5G system.

Additionally, the Registration Procedure is performed when the UE performs periodic registration update, when the UE relocates to a new tracking area (TA) in an Idle state, and when the UE needs to perform periodic registration renewal.

During the initial registration procedure, an ID of the UE may be obtained from the UE. The AMF may forward (or transfer) a PEI (IMEISV) to a UDM, SMF, and PCF.

Figure 7A:
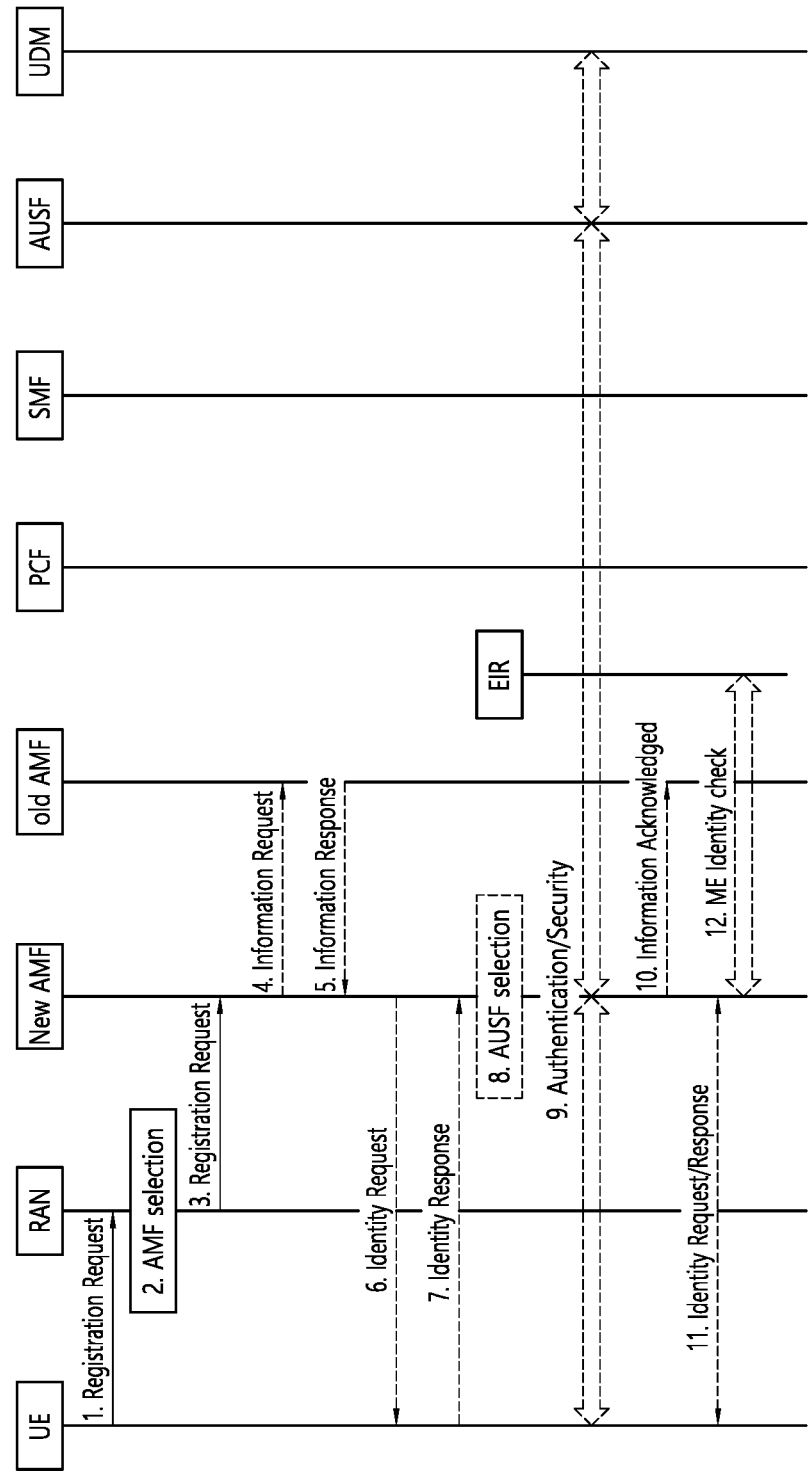
FIGS. 7a and 7b is a signal flow chart showing an exemplary registration procedure.
Figure 7B:
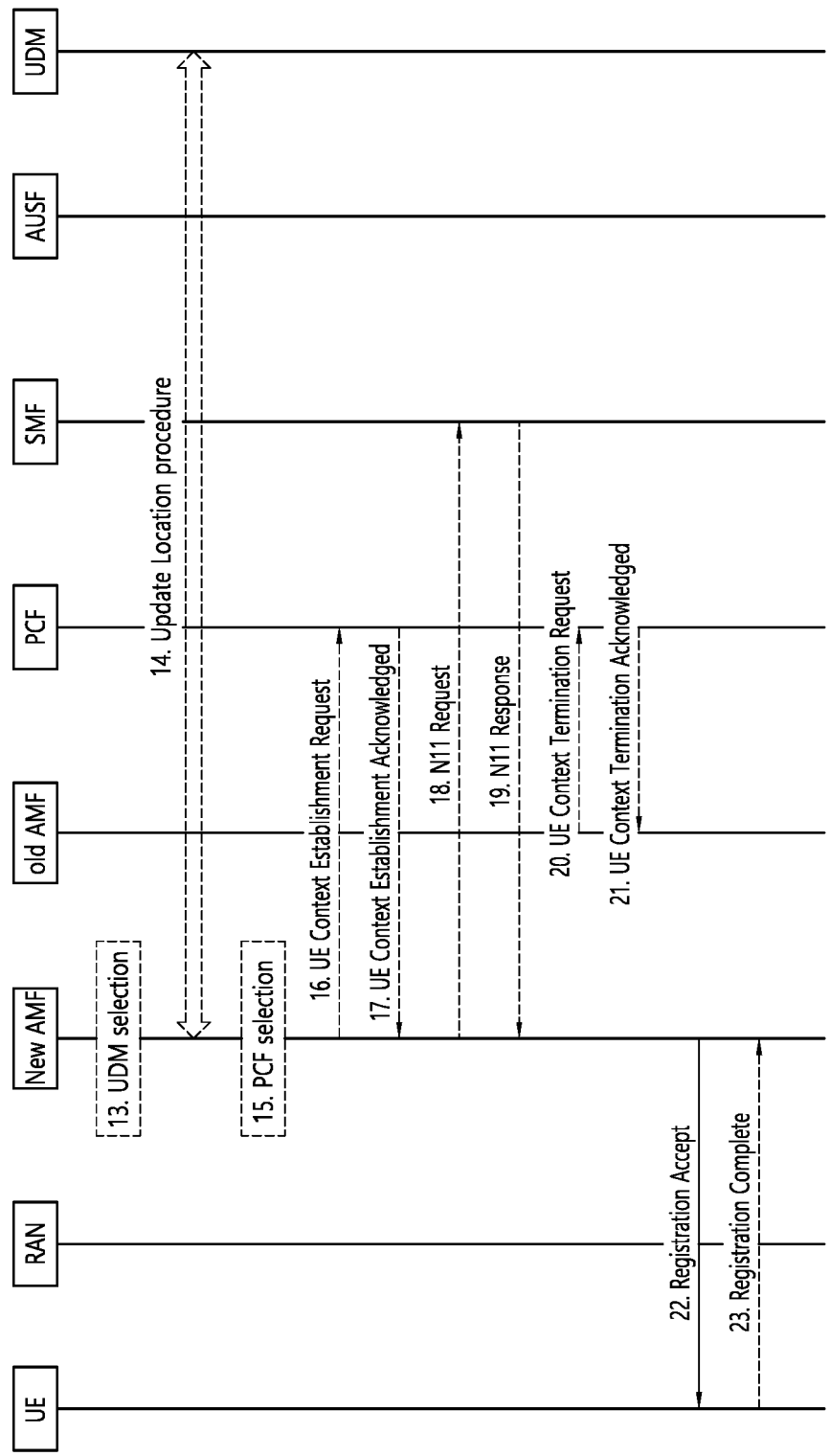

FIGS. 7a and 7b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI of the allowed NSSAI to the S-NASSI of the NSSAI configured for HPLMN.

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<Service Request Procedures>

The service request procedure is used to request establishment of a secure connection to AMF by a UE or a 5G core network (5GC). The service request procedure is used to activate the user plane connection of the established PDU session even when the UE is in a CM-IDLE state and a CM-CONNECTED state. For reference, in order to reflect NAS signaling connection between the AMF and the UE, two CM states of the CM-IDLE state and the CM-CONNECTED state are used.

The UE does not initiate a service request procedure if there is an ongoing service request procedure.

The service request procedure includes a service request procedure initiated by the UE (i.e., a UE triggered service request) and a service request procedure initiated by the network (i.e., a network triggered service request).

Hereinafter, an example of the UE triggered service request procedure will be described with reference to FIGS. 8A to 8C, and an example of the network triggered service request procedure will be described with reference to FIG. 9. The service request procedure described in FIGS. 8A to 8C and 9 is only an example, and the service request procedure in the present disclosure includes all the service request procedures triggered by the UE and all the service request procedures triggered by the network.

Figure 8A:
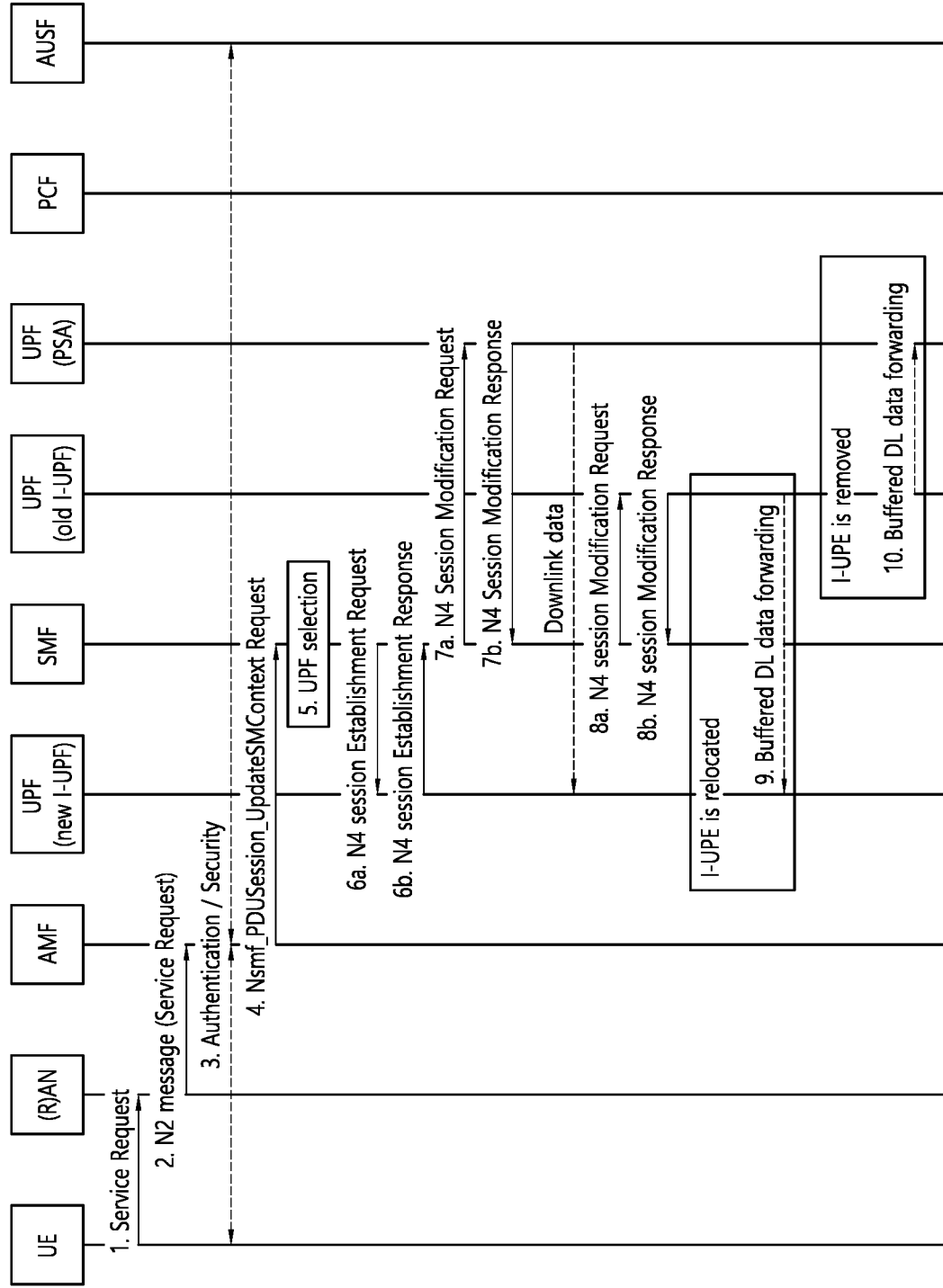
FIGS. 8A to 8C are signal flowcharts illustrating an exemplary UE initiated service request procedure.
Figure 8B:
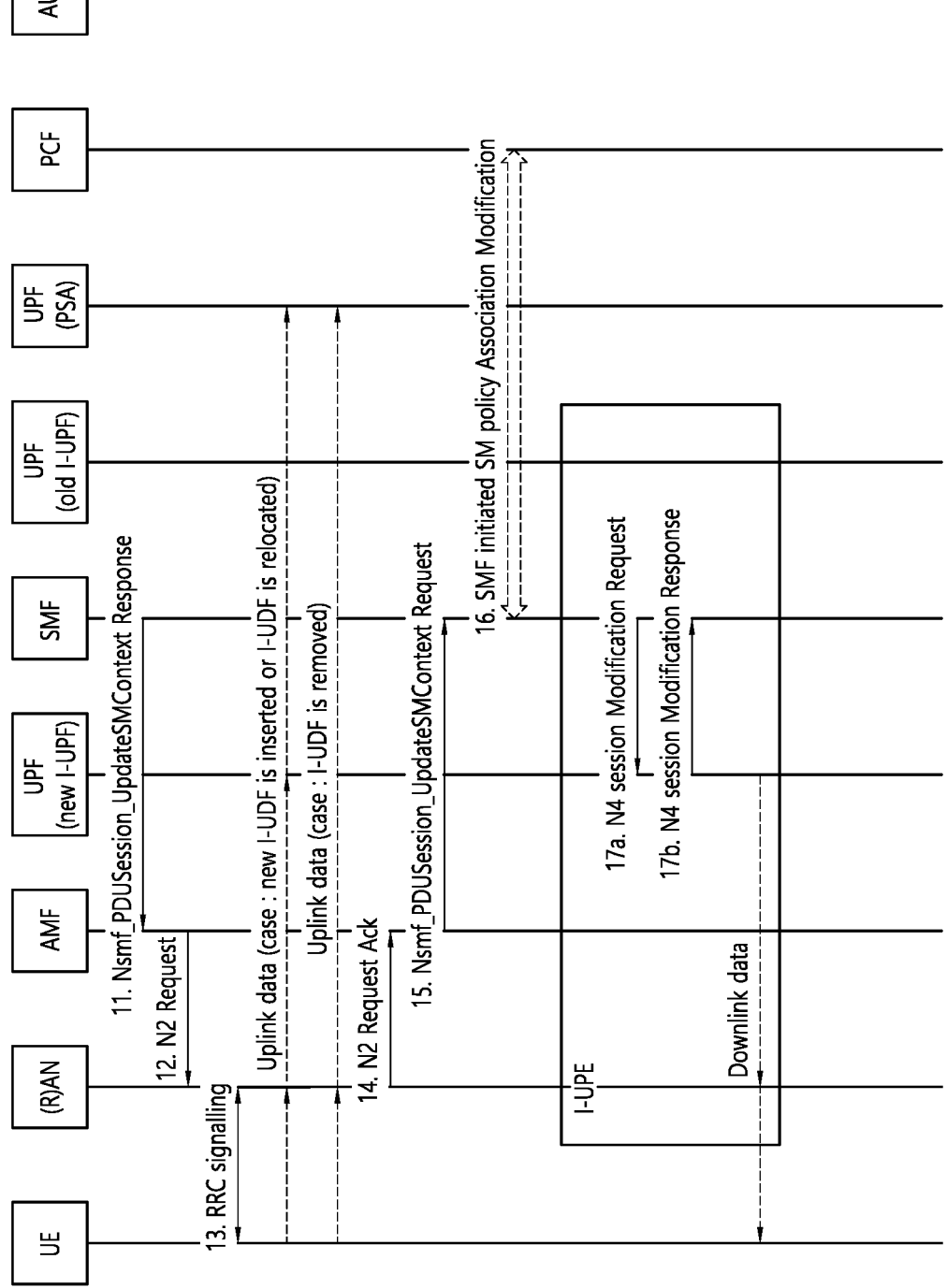
Figure 8C:
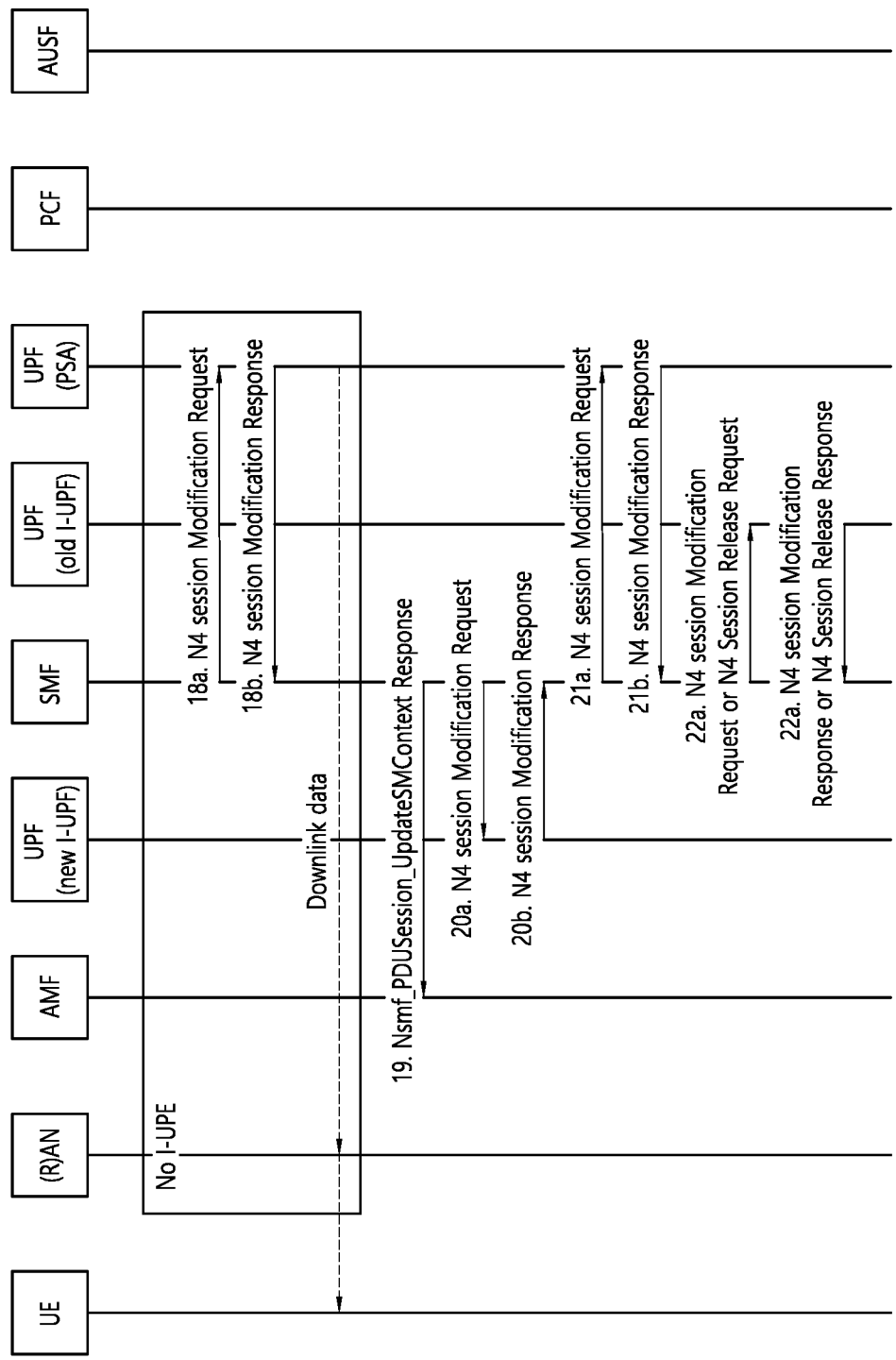
Figure 9:
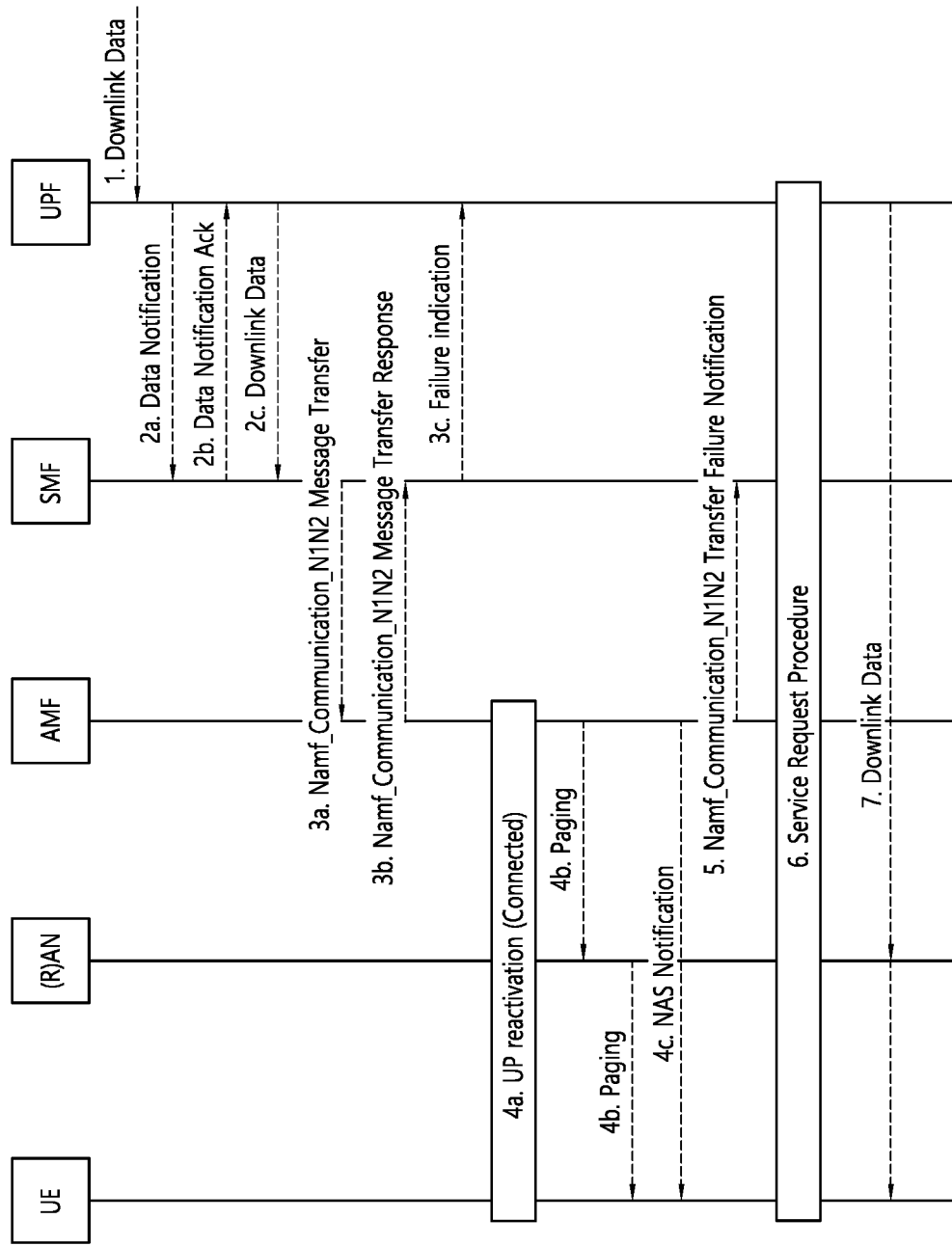
FIG. 9 is a signal flowchart illustrating an exemplary network initiated service request procedure.

FIGS. 8A to 8C are signal flowcharts illustrating an exemplary UE triggered service request procedure.

The UE in the CM-ILDE state initiates a service request procedure to transmit a response on an uplink signaling message, user data, or network paging request. After receiving the service request message, the AMF may perform authentication. After establishing a signaling connection for AMF, the UE or the network may transmit a signaling message (e.g., establishment of a PDU session from the UE to the SMF through the AMF).

The service request procedure may be used by a UE in CM-CONNECTED state to request activation of a user plane connection for a PDU session and to respond to a NAS notification message received from the AMF.

For any service request procedure, if necessary, the AMF may include state information of the PDU session in a service accept message to synchronize a PDU session state between the UE and the network.

If the service request is not accepted by the network, the AMF responds to the UE with a service reject message. The service rejection message may include an indication or a cause code for requesting that the UE perform a registration update procedure.

In the UE triggered service request procedure, both SMF and UPF belong to a PLMN that serves the UE. For example, in a home routed roaming case, the SMF and UPF of the HPLMN are not affected by the service request procedure (that is, the SMF and UPF of the HPLMN are not involved in the service request procedure).

In response to a service request according to user data, the network may take additional action if the user plane connection activation is not successful.

The UE triggered service request procedure may be applied to a scenario with or without an intermediate UPF and a scenario with or without an intermediate UPF reselection.

1) Signaling from UE to (R)AN: the UE may transmit an access network (AN) message (including AN parameters, service request (list of PDU sessions to be activated, list of allowed PDU sessions), security parameters and PDU session status (status)) to the (R)AN.

The list of PDU sessions to be activated is provided by the UE when the UE attempts to re-activate the PDU session. The list of allowed PDU sessions is provided by the UE when the service request is a response to a NAS notification or paging of a PDU session related to non-3GPP access. And, the list of allowed PDU sessions identifies PDU sessions that may be moved to 3GPP access.

In case of NG-RAN:
  AN parameters include the selected PLMN ID and establishment cause. The establishment cause provides a reason for requesting establishment of an RRC connection.
  The UE transmits a service request message (message to AMF) encapsulated in an RRC message to the NG-RAN. The RRC message may be used to carry 5G system architecture evolution (SAE)-temporary mobile subscriber identity) (5G-S-TMSI).

When a service request is triggered for user data, the UE notifies a PDU session in which a user plane (UP) connection is to be activated in a service request message using a list of PDU sessions to be activated.

When the service request is triggered only for signaling, the UE does not include a list of PDU sessions to be activated.

When a service request procedure is triggered for a paging response and the UE has user data to be transmitted at the same time, the UE may inform about the PDU session with a UP connection to be activated in the service request message using the list of PDU sessions to be activated. Otherwise, the UE does not inform about any PDU session in the service request for paging response.

In a specific case, if there is no pending uplink data of PDU sessions, if a service request is triggered only for signaling, or if a service request is triggered for a paging response, the UE may include the PDU session to the list of PDU sessions to be activated.

When a service request through 3GPP access is triggered in response to a NAS notification indicating paging or non-3GPP access, the UE includes the non-3GPP PDU session that may be reactivated through 3GPp in the allowed PDU session list (See the example to be described in step 6 of FIG. 9).

The PDU session state indicates a PDU session available in the UE.

When the UE is located outside an available area of the LADN, the UE does not trigger a service request procedure for a PDU session corresponding to the LADN. Also, when the service request is triggered for other reasons, the UE does not include the PDU session in the list of PDU sessions to be activated.

When the UE is in the CM-CONNECTED state, only a list of PDU sessions to be activated and a list of allowed PDU sessions may be included in the service request.

2) (R)AN to AMF signaling: (R)AN may transmit an N2 message to AMF. The N2 message may include N2 parameters, a service request, and a UE context request.

If the AMF cannot handle the service request, the AMF will reject the service request.

When NG-RAN is used, N2 parameter may include 5G-S-TMSI, the selected PLMN ID, location information, and establishment cause.

When the UE is in the CM-IDLE state, the NG-RAN may acquire 5G-S-TMSI in the RRC procedure. The NG-RAN may select AMF based on 5G-S-TMSI. The location information is related to a cell on which the UE camps.

Based on the PDU session state, the AMF may perform a PDU session release procedure for PDU sessions indicated by the UE that the PDU session ID is not available in the network.

3a) Signaling from AMF to (R)AN: AMF may transmit an N2 request to (R)AN. Here, the N2 request may include a security context, a handover restriction list, and a list of recommended cells/TAs/NG-RAN node identifiers.

When the 5G-AN requests for the UE context or the AMF needs to provide the UE context (e.g., when the AMF needs to initiate a fallback procedure for an emergency service), the AMF may initiate an NG application protocol (NGAP) procedure. For a UE in a CM-IDLE state, the 5G-AN stores security context in the UE AN context. The handover restriction list is related to mobility restrictions.

The 5G-AN uses the security context to protect messages exchanged with the UE.

When the NG-RAN node provides a list of recommended cells/TAs/NG-RAN node identifiers during the AN release procedure, the AMF may include the list of recommended cells/TAs/NG-RAN node identifiers in the N2 request. When the RAN determines to enable the RRC inactive state for the UE, the RAN may use this information to allocate a RAN notification area.

3) If the service request is not transmitted as being integrity protected or integrity protection verification failed, the AMF may initiate a NAS authentication/security procedure.

When the UE in the CM-IDLE state initiates a service request only for signaling connection, the UE and the network may exchange NAS signaling after successful establishment of the signaling connection, and steps 4 to 11 and steps 15 to 22 of FIGS. 8A to 8C may be omitted.

4) [Conditional Operation] Signaling from AMF to SMF: The AMF may transmit an Nsmf_PDUSession_UpdateSM-Context Request to the SMF. Here, the Nsmf_PDUSession_UpdateSMContext Request may include a PDU session ID, operation type, UE location information, access type, RAT type, and UE presence in LADN service area.

Nsmf_PDUSession_UpdateSMContext Request is invoked in the following cases:
  When the UE includes a list of PDU sessions to be activated in the service request message;
  When this procedure is triggered by the SMF but a PDU session identified by the UE is correlated with a PDU session ID different from the PDU session ID that triggers this procedure;
  When this procedure is triggered by the SMF but a current UE location is outside the "area of validity for the N2 SM information" provided by the SMF (see step 3a in FIG. 9). In this case, the AMF does not transmit the N2 information provided by the SMF (see step 3a in FIG. 9). If the current UE location is outside the "available area of N2 SM information", steps 4 to 11 are omitted.

If the DNN corresponds to the LADN, "the presence of the UE in the LADN service area" indicates whether the UE is inside (IN) or outside (OUT) the LADN service area. If the AMF does not provide an indication of "the presence of a UE in the LADN service area" and the SMF determines that the DNN corresponds to the LADN, the SMF considers the UE to be outside the LADN service area.

The AMF determines whether the PDU session(s) will be activated. In addition, the AMF transmits the Nsmf_PDUSession_UpdateSMContext Request related to the PDU session to the SMF along with an operation type set to "UP active" to indicate establishment of the user plane resource for the PDU session. The AMF determines an access type and an RAT type based on a global RAN node ID related to an N2 interface.

If this procedure is triggered in response to a paging or NAS notification indicating non-3GPP access and the UE is not on the list (provided by the UE) of PDU sessions allowed in the paged or notified PDU session, the AMF may notify the SMF that the user plane for the PDU session cannot be reactivated. The service request procedure may be terminated without reactivation of the user plane for other PDU sessions in the list of allowed PDU sessions.

While the previous NAS signaling connection through the NG-RAN is maintained, the AMF may receive a service request through the NG-RAN to establish another NAS signaling connection. In this case, in order to release the previous NAS signaling connection, AMF may trigger an AN release procedure for the old NG-RAN according to the following logic:
  For the PDU session indicated in the "list of PDU sessions to be activated", the AMF may request the SMF to immediately activate the PDU session by performing this step 4.
  For a PDU session included in the "list of PDU session ID(s) with active N3 user plane" but not included in the "list of PDU sessions to be activated", the AMF may request the SMF to deactivate the PDU session.

5) If the PDU session ID corresponds to the LADN and the SMF determines that the UE is located outside the available area of the LADN based on the "UE presence in the LADN service area" provided by the AMF, the SMF may determine to perform the following actions (based on a local policy).

SMF may maintain the PDU session. However, the SMF may reject the activation of the user plane connection of the PDU session and notify the AMF accordingly. When the service request procedure is triggered by the network initiated service request of FIG. 9, the SMF may notify the UPF (UPF that has sent data notification) that the UPF should discard downlink data for the PDU session and/or should not provide an additional data notification message; or The SMF may release the PDU session: The SMF may release the PDU session and inform the AMF that the PDU session has been released.

In the above two cases, the SMF responds to the AMF with an appropriate reject cause, and user plane activation of the PDU session may be stopped.

When the SMF determines that the UE is located in the LADN available area, the SMF may check a UPF selection criterion based on the location information received from the AMF and determine to perform one of the following operations:

The SMF accepts the activation of the UP connection and may continue to use the current UPF;

When the UE moves outside the service area of the UPF (the UPF previously connected to the AN), the SMF, while maintaining the UPF acting as a PDU session anchor, may accept activation of the UP connection and select a new intermediate UPF (or may add/remove intermediate UPFs (I-UPF)). The steps to perform the addition/change/removal of the I-UPF are described below through conditional steps.

NOTE 1: When old and/or new I-UPF implements a UL uplink classifier (CL) or branching point (BP) function and a PDU session anchor for connectivity of local access to the data network, the signaling described in this figure is intended as signaling for adding, removing, or changing a PDU session anchor, and signaling for adding, releasing, or changing UL CL or BP, should be performed by a different procedure.

The SMF may reject activation of the UP connection of the PDU session in session and service continuity (SSC) mode 2. In addition, after the service request procedure, the SMF may trigger re-establishment of a PDU session in order to perform allocation of a new UPF (UPF acting as a PDU session anchor). (This operation may be performed, for example, when the UE is moved outside the service area of the anchor UPF connected to the NG-RAN)

6a) [Conditional operation] Signaling from SMF to new UPF (or new I-UPF): The SMF may transmit an N4 session establishment request to the UPF.

When the SMF selects a new UPF acting as an I-UPF for a PDU session or when the SMF chooses to insert an I-UPF for a PDU session (which did not have an I-UPF), the SMF may transmit a N4 session establishment request to the UPF. Here, the N4 establishment request provides packet detection to be installed in the I-UPF, data forwarding, enforcement, and reporting rules. PDU session anchor addressing information for a PDU session (PDU session anchor addressing information at an N9 reference point (a reference point between two UPFs)) is also provided to the I-UPF.

When a service request is triggered by the network, and the SMF selects a new UPF to replace the existing UPF (or the existing I-UPF), the SMF may include a data forwarding indication in the N4 session establishment request. The data forwarding indication may indicate to the UPF that second tunnel endpoint needs to be reserved for DL data buffered after being provided from the previous I-UPF.

6b) Signaling from new UPF (or I-UPF) to the SMF: The new UPF (or I-UPF) may transmit an N2 session establishment response (N4 Session establishment response) to the SMF.

The new I-UPF may transmit an N4 session establishment response to the SMF. When the UPF allocates CN tunnel information, the new I-UPF may transmit DL core network (CN) tunnel information for the UPF acting as a PDU session anchor and UL tunnel information of the new I-UPF to the SMF. When a data transfer indication is received, a new UPF (or I-UPF) operating as an N3 terminating point may transmit DL tunnel information of the new I-UPF to the SMF for data transmission from the existing UPF (or I-UPF) to the SMF. If the previous I-UPF resource exists, the SMF may drive a timer to be used in step 22a to release the corresponding resource.

7a) [Conditional operation] Signaling from SMF to UPF (PSA: PDU session anchor) signaling: SMF may transmit an N4 session modification request to the UPF.

When the SMF selects a new UPF to operate as an I-UPF for a PDU session, the SMF may transmit an N4 session modification request message to the PDU session anchor UPF to provide DL tunnel information received from the new I-UPF. When a new I-UPF is added for a PDU session, the UPF (PSA) may provide DL data to the new I-UPF as indicated in the DL tunnel information.

If a service request is triggered by the network and the SMF removes the existing I-UPF and does not replace the existing I-UPF with a new I-UPF, the SMF may include the data forwarding indication in the N4 session modification request. The data forwarding indication may indicate to the UPF (PSA) that the second tunnel endpoint needs to be reserved for buffered DL data received from the existing I-UPF. In this case, the UPF (PSA) may start buffering DL data that may be simultaneously received from the N6 interface.

7b) The UPF (PSA) may transmit an N4 session modification response message to the SMF.

When the UPF (PSA) receives the data forwarding indication, the UPF (PSA) becomes an N3 endpoint and the UPF (PSA) may transmit CN DL tunnel information for the previous UPF (or I-UPF) to the SMF. The SMF may start a timer. If the previous I-UPF resource exists, the SMF may drive a timer to be used in step 22a in order to release the corresponding resource.

When the UPF connected to the RAN is a UPF (PSA) and the SMF receives Nsmf_PDUSession_UpdateSMContext Request (including operation type set to "UP activate" to indicate establishment of user plane resource for the PDU session), if the SMF finds that the PDU session is active, the SMF may initiate an N4 session modification procedure to remove the AN tunnel information and remove the AN tunnel information from the UPF.

8a) [Conditional operation] Signaling from SMF to existing UPF (or I-UPF): The SMF may transmit N4 session modification (including new UPF address, new UPF DL tunnel ID) to the existing UPF (or I-UPF).

When a service request is triggered by the network and the SMF removes the existing UPF (or I-UPF), the SMF may transmit an N4 session modification request message to the existing UPF (or I-UPF) to provide DL tunnel information for buffered DL data. When the SMF allocates a new I-UPF, the DL tunnel information is received from a new UPF (or I-UPF) operating as an N3 endpoint. If the SMF does not allocate a new I-UPF, the DL tunnel information is transmitted from the UPF (PSA) operating as an N3 endpoint. The SMF may drive a timer for monitoring a forwarding tunnel as in step 6b or 7b.

When the SMF receives the Nsmf_PDUSession_UpdateSMContext Request of step 4 (including an operation type set to "UP activate" to instruct establishment of user plane resources for the PDU session), if the SMF knows that the PDU session has been activated, the SMF may remove the AN tunnel information to remove tunnel information of the AN in the UPF and may initiate an N4 session modification procedure.

8b) Signaling from the existing UPF (or I-UPF) to the SMF: The existing UPF (or I-UPF) may transmit an N4 session modification response message to the SMF.

9) [Conditional operation] Signaling from an existing UPF (or I-UPF) to a new UPF (or I-UPF): The existing UPF (or I-UPF) may deliver downlink data buffered with a new UPF (or I-UPF).

When the I-UPF is changed and a forwarding tunnel is established for a new I-UPF, the existing UPF (or I-UPF) transfers the buffered data to the new UPF (or I-UPF) operating as an N3 endpoint.

10) [Conditional operation] Signaling from the existing UPF (or I-UPF) to the UPF (PSA): The existing UPF (or I-UPF) may transfer buffered downlink data to the UPF (PSA).

When the existing I-UPF is removed, the new I-UPF is not allocated t the PDU session, and a forwarding tunnel is established for the UPF (PSA), the existing UPF (or I-UPF) may transfer the data buffered to the existing UPF (or I-UPF) to a new UPF (PSA) acting as an N3 endpoint.

11) [Conditional Operation] Signaling from SMF to AMF: SMF may transmit Nsmf_PDUSession_UpdateSMContext Response to AMF. Nsmf_PDUSession_UpdateSMContext Response may include N2 SM information (PDU session ID, QFI(s) (QoS Flow ID), quality of service (QoS) profile, CN N3 tunnel information, S-NSSAI, user plane security enforcement, UE integrity protection maximum data rate, and a cause. When the UPF connected to the RAN is UPF (PSA), the CN N3 tunnel information is UL tunnel information of UPF (PSA). When the UPF connected to the RAN is a new I-UPF, the CN N3 tunnel information is UL tunnel information of the I-UPF.

For the PDU session in which the SMF determines to accept the activation of the UP connection in step 5, the SMF may generate only N2 SM information and transmit an Nsmf_PDUSession_UpdateSMContext Response to the AMF to establish a user plane. The N2 SM information may include information to be provided by AMF to the NG-RAN. When the SMF determines to change the PSA UPF for the SSC mode 3 PDU session, the SMF may trigger a change of the SSC mode 3 PDU session anchor as an independent procedure after accepting UP activation of the PDU session.

The SMF may reject the activation of the UP of the PDU session by including the cause in the Nsmf_PDUSession_UpdateSMContext Response. The SMF may reject activation of the UP of the PDU session in the following cases, for example:

When the PDU session corresponds to the LADN and the UE is located outside the available area of the LADN as in step 5;

When the AMF informs the SMF that the UE is reachable only for a regulatory prioritized service and the PDU session to be activated is not for the regulatory prioritized service; or When the SMF determines to change the PSA UPF for the requested PDU session as in step 5. In this case, after the SMF transmits the Nsmf_PDUSession_UpdateSMContext Response, the SMF may perform another procedure to instruct the UE to re-establish the PDU session for SSC mode 2.

If the SMF receives a negative response in step 6b due to UPF resource unavailability.

When an EPS bearer ID is assigned to a PDU session, the SMF maps the EPS bearer ID and QFI to N2 SM information and transmits the same to the NG-RAN.

User plane security enforcement information is determined by the SMF during a PDU session establishment procedure. When integrity protection indicates "preferred" or "required", the SMF may also include UE integrity protection maximum data rate in the user plane security enforcement information.

12) Signaling from AMF to (R)AN: The AMF may transmit an N2 request to (R)AN. N2 request may include N2 SM information received from the SMF, security context, handover restriction list, subscribed UE-aggregate maximum bit rate (AMBR), MM NAS service acceptance (a list of recommended cells/TAs/NG-RAN node identifiers, and UE radio capability. Allowed NSSAI for the access type of the UE may be included in the N2 message.

When the UE triggers a service request while in the CM-CONNECTED state, only N2 SM information received from the SMF and MM NAS service acceptance may be included in the N2 request.

While the UE is in the CM-CONNECTED state, when a service request procedure is triggered by the network, only N2 SM information received from the SMF may be included in the N2 request.

When the service request procedure is triggered, the NG-RAN may store the security context and the NAS signaling connection Id for the UE in the CM-IDLE state. When the service request is not triggered by the UE only for the signaling connection, the RAN may store QoS information for a QoS flow of the activated PDU session, an N3 tunnel ID of the UE RAN context, and a handover restriction list.

MM NAS service acceptance may include a PDU session state of the AMF. During the session request procedure, certain local PDU session release may be notified to the UE through the PDU session state. The service acceptance message includes a PDU session reactivation result. The PDU session reactivation result provides an activation result for the PDU session of the allowed PDU session list which has generated a PDU session in the list of allowed PDU sessions and paging or NAS notification. If the PDU session reactivation result of the PDU session is failure, a cause of the failure may also be provided.

When there are a plurality of PDU sessions related to a plurality of SMFs, the AMF does not need to wait for a response from all SMFs in step 11. However, the AMF must wait for all responses from the plurality of SMFs before transmitting an MM NAS service acceptance message to the UE.

When step 12 is triggered for PDU session user plane activation, the AMF may include at least one N2 SM information received from the SMF in the N2 request. When there is additional N2 SM information received from the SMF, the AMF may include the additional N2 SM information received from the SMF in a separate N2 message (e.g., N2 tunnel setup request) and transmit the same. Alternatively, when a plurality of SMFs are involved, after all Nsmf_PDUSession_UpdateSMContext response service operations related to the UE are received from the SMF, the AMF may transmit one N2 request message to the (R)AN.

When the NG-RAN node provides a list of recommended cells/TAs/NG-RAN node identifiers during the AN release procedure, the AMF may include a list of recommended cells/TAs/NG-RAN node identifiers in the N2 request. When the NG-RAN determines to enable the RRC inactive state for the UE, the NG-RAN may use this information to allocate the RAN notification area.

The AMF based on the network configuration may include "RRC inactive assistance information" of the UE in the N2 request.

If possible, the AMF may include UE radio capability information in the N2 request and transmit the same to the NG-RAN node.

13) Signaling from (R)AN to UE: The NG-RAN may perform RRC connection reconfiguration with the UE. Specifically, the NG-RAN may perform RRC connection reconfiguration with the UE according to QoS information on all QoS flows of a data radio bearer and a PDU session in which the UP connection is activated. For the UE that was in the CM-IDLE state, if the service request is not triggered by the UE only for a signaling connection, user plane security may be established in this step. For the UE in the CM-IDLE state, when a service request is triggered by the UE only for signaling connection, the AS security context may be established in this step.

When the N2 request includes a NAS message, the NG-RAN may deliver the NAS message to the UE. The UE deletes the context of the PDU session that is not available in 5GC locally.

NOTE 2: The reception of the service acceptance message may not mean that the user plane radio resource has been successfully activated.

After the user plane radio resource is set up, uplink data from the UE may now be delivered to the NG-RAN. The NG-RAN may transmit uplink data to the UPF address and tunnel ID provided in step 11.

14) [Conditional operation] Signaling from (R)AN to AMF: The (R)AN may transmit acknowledgement for N2 request to the AMF. For example, the (R)AN may transmit an N2 request Ack to the AMF. Here, the N2 request Ack may include N2 SM information (including AN tunnel information, list of accepted QoS flows for the PDU sessions whose UP connections are activated and a list of rejected QoS Flows for the PDU Sessions whose UP connections are activated) and a PDU session ID.

The message including the N2 request Ack may include N2 SM information (e.g., AN tunnel information). When the AMF transmits a separate N2 message in step 11, the NG-RAN may respond to N2 SM information with a separate N2 message.

When a plurality of N2 SM messages are included in the N2 request message of step 12, the N2 request Ack may include a plurality of N2 SM information and information enabling the AMF to associate a response with a related SMF.

15) [Conditional operation] Signaling from AMF to SMF: The AMF may transmit an Nsmf_PDUSession_UpdateSMContext request (including N2 SM information, RAT type, and access type) per PDU session to the SMF. The AMF may determine the access type and the RAT type based on the global RAN node ID associated with the N2 interface.

When the AMF receives the N2 SM information (one or more) in step 14, the AMF may deliver the N2 SM information to the related SMF per PDU session ID. When a UE time zone is changed compared to a previously reported UE time zone, the AMF may include UE time zone information element (IE) in the Nsmf_PDUSession_UpdateSMContext request.

16) [Optional action] Signaling from SMF to PCF: When dynamic PCC is distributed, SMF performs SMF initiated SM policy modification procedure to initiate notification of new location information to the PCF (if subscribed). The PCF may provide updated policies.

17a) [Conditional operation] Signaling from the SMF to new I-UPF: The SMF may transmit an N4 session modification request to a new I-UPF. The N4 session modification request may include AN tunnel information and a list of accepted QFIs.

When the SMF selects a new SMF to operate as an I-UPF for the PDU session in step 5, the SMF may initiate an N4 session modification procedure for the new I-UPF and provide AN tunnel information. Downlink data from the new I-UPF may be delivered to the NG-RAN and UE.

17b) [Conditional Operation] Signaling from UPF to SMF: The UPF may transmit an N4 session modification response to the SMF.

18a) [Conditional operation] Signaling from SMF to UPF (PSA): The SMF may transmit an N4 session modification request to UPF (PSA). The N4 session modification request may include AN tunnel information and a list of rejected QoS flows.

If the user plane is set up or modified and if there is no I-UPF after modification, the SMF may initiate the N4 session modification procedure for the UPF (PSA) and provide AN tunnel information. Downlink data from the UPF (PSA) may now be delivered to the NG-RAN and UE.

For QoS flows in the list of rejected QoS flows, the SMF may instruct the UPF to remove rules related to the corresponding QoS flow (e.g., packet detection rules, etc.).

18b) [Conditional operation] Signaling from UPF to SMF: The UPF may transmit an N4 session modification response to the SMF.

19) [Conditional operation] Signaling from SMF to AMF: The SMF may transmit an Nsmf_PDUSession_UpdateSMContext response to the AMF.

20a) [Conditional operation] Signaling from SMF to new UPF (or I-UPF): The SMF may transmit an N4 session modification request to a new UPF (or I-UPF).

When the forwarding tunnel is established for the new I-UPF and when the timer set by the SMF for the forwarding tunnel in step 8a expires, the SMF may transmit an N4 session modification request to the new UPF (or I-UPF) operating as an N3 endpoint to release the forwarding tunnel.

20b) [Conditional operation] Signaling from new UPF (or I-UPF) to SMF: The new UPF (or I-UPF) may transmit an N4 session modification response to the SMF.

The new UPF (or I-UPF) operating as the N3 endpoint may transmit an N4 session modification response to the SMF.

21a) [Conditional operation] Signaling from SMF to UPF (PSA): The SMF may transmit an N4 session modification request to the UPF (PSA).

When the forwarding tunnel is established for the UPF (PSA) and when the timer set by the SMF for the forwarding tunnel in step 7b expires, the SMF may transmit an N4 session modification request to the UPF (PSA) operating as the N3 endpoint to release the forwarding tunnel.

21b) [Conditional operation] Signaling from UPF (PSA) to SMF: UPF (PSA) may transmit an N4 session modification response to the SMF.

UPF (PSA) operating as an N3 endpoint may transmit an N4 session modification response to the SMF.

22a) [Conditional operation] Signaling from SMF to previous UPF: The SMF may transmit an N4 session modification request or an N4 session release request to the previous UPF.

When the SMF determines to continue to use the previous UPF in step 5, the SMF may transmit the N4 session modification request to the previous UPF and provide AN tunnel information.

When the SMF selects a new UPF operating as an I-UPF in step 5 and the previous UPF is not a PSA UPF, the SMF may initiate resource release by transmitting an N4 session release request (including release cause) to the previous I-UPF after the timer in step 6b or 7b expires.

22b) Signaling from previous I-UPF to the SMF: The previous I-UPF may transmit an N4 session modification response or an N4 session release response to the SMF.

The previous UPF checks the modification or release of resources through a N4 session modification response or a N4 session release response.

An example of the UE initiated service request procedure is the same as steps 1 to 22b described above.

For mobility-related events, the AMF may invoke an Namf_EventExposure_Notify service operation after step 4.

When Namf_EventExposure_Notify is received with an indication that the UE is reachable, if the SMF has pending DL data, the SMF may invoke the Namf_Communication_N1N2MessageTransfer service operation for the AMF to establish a user plane for the PDU session. In other cases, the SMF may resume transmitting the DL data notification to the AMF in the case of DL data.

FIG. 9 is a signal flowchart illustrating an exemplary network initiated service request procedure.

The network initiated service request procedure is used when there is a need for activating a user plane for the PDU session to transfer signaling (e.g., N1 signaling to the UE, mobile-terminated short message service (SMS)), mobile terminating (a destination of data is UE) user data with the UE.

When the network initiated service request procedure is triggered by a short message service function (SMSF), PCF, location management function (LMF), gateway mobile location center (GMLC), NEF or UDM, the SMF in FIG. 9 may be replaced by a corresponding NF. For example, when the network initiated service request procedure is triggered by the PCF, the PCF may perform operations performed by the SMF of FIG. 9.

When the UE is in the CM-IDLE state or the CM-CONNECTED state in 3GPP access, the network initiates a network service request procedure.

When the UE is in the CM-IDLE state and asynchronous type communication is not activated, the network may transmit a paging request to the (R)AN/UE. The paging request triggers a UE initiated service request procedure in the UE. When asynchronous type communication is activated, the network stores the received message, and when the UE enters the CM-CONNECTED state, the network may transfer the received message to the (R)AN and/or the UE.

When the UE is in the CM-IDLE state in non-3GPP access and the UE is simultaneously registered for 3GPP access and non-3GPP access in one public land mobile network (PLMN), the network may initiate the network initiated service request procedure via 3GPP access.

When the UE is in the CM-IDLE state in 3GPP access, in the CM-CONNECTED state in non-3GPP access, and the UE is simultaneously registered for 3GPP access and non-3GPP access in one PLMN, the network may initiate the network initiated service request procedure through 3GPP access.

In the network initiated service request procedure, both SMF and UPF belong to a PLMN serving the UE. For example, in a home routed roaming case, the SMF and UPF of a HPLMN are not affected by a service request procedure (that is, the SMF and UPF of the HPLMN are not involved in the service request procedure).

The procedure of FIG. 9 deals with a non exhaustive list of use-cases for 3GPP access as follows (detailed conditions to which each step is applied are described in the procedure below):

When the SMF needs to set up an N3 tunnel in order to deliver a downlink packet for a PDU session to the UE and the UE is in the CM-IDLE state: Step 3a includes an N2 message and step 4b (paging) may be performed.

When the SMF needs to set up an N3 tunnel in order to deliver a downlink packet for a PDU session to the UE and the UE is in a CM-CONNECTED state: Step 3a includes an N2 message and step 4a (UP activation) may be performed.

If an NF (e.g., SMF, SMSF, LMF or NEF) needs to transmit an N1 message to the UE and the UE is in the CM-IDLE state: Step 3a includes an N1 message, step 3b includes a cause "Attempting to reach UE", and step 4b (paging) occurs.

When the NF (e.g., SMSF, PCF, or UDM) triggers the AMF to set up a NAS connection with the UE and the UE is in the CM-IDLE state: Trigger differ according to procedures, step 4b (paging) is occurs.

1) When the UPF receives downlink data for the PDU session and AN tunnel information for the PDU session is not stored in the UPF, the UPF may buffer the downlink data or transfer the downlink data to the SMF based on an instruction received from the SMF.

2a) Signaling from the UPF to the SMF: The UPF may transmit a data notification to the SMF. The data notification may include an N4 session ID, information for identifying a QoS flow for a DL data packet, and DSCP.

When the first downlink data for a certain QoS flow arrives, if the SMF has not previously informed the UPF not to transmit a data notification to the SMF, the UPF may transmit a data notification message to the SMF. For reference, if the SMF previously informs the UPF not to transmit the data notification to the SMF, follow-up steps may be omitted.

When the UPF receives a downlink data packet for a different QoS flow in the same PDU session, the UPF may transmit another data notification message to the SMF.

When a paging policy differentiation feature is supported by the UPF and a PDU session type is IP, the UPF may include a DSCP of a TOS (Type of Service)(IPv4)/TC (Traffic Class)(IPv6) received from an IP header of the downlink data packet and information for identifying QoS flows for DL data packets in the data notification.

2b) Signaling from SMF to UPF: A data notification Ack may be transmitted.

2c) When the SMF instructs the UPF that it will buffer the data packet, the UPF may deliver the downlink data packet to the SMF.

When the paging policy differentiation feature is supported by the SMF, the SMF may determine a paging policy indication based on the DSCP of the TOS(IPv4)/TC(IPv6) value received from the IP header of the downlink data packet and identify a QFI of the QoS flow for the DL data packet.

3a) [Conditional operation] i) Signaling from SMF to AMF: The SMF may transmit a Namf_Communication_N1N2MessageTransfer (including SUPI, PDU session ID, N2 SM information (including QFI(s), QoS profile(s), CN N3 tunnel information, S-NSSAI, and paging policy indication), area of validity for N2 SM information, ARP (Allocation and Retention Priority) including paging policy indication, 5QI and N1N2TransferFailure notification target address) to the AMF. Or, ii) signaling from NF to AMF: NF may transmit Namf_Communication_N1N2MessageTransfer (including SUPI and N1 messages) to the AMF.

Upon receiving the data notification message, the SMF may perform an operation to support the LADN for a PDU session corresponding to the LADN. The SMF may notify the UPF that transmitted the data notification to discard downlink data for the PDU session and/or not to provide an additional data notification message.

In other cases, the SMF may determine whether to contact the AMF. The SMF may not contact the AMF in the following cases:

If the SMF previously notified that the UE is unreachable; or

If the UE is reachable only for a regulatory prioritized service and the PDU session is not a regulatory prioritized service.

The SMF determines the AMF, and the SMF may invoke Namf_Communication_N1N2MessageTransfer to the AMF by including the PDU session ID derived from the N4 session ID received in step 2a.

If the SMF receives any additional data notification message or downlink data packet while waiting for the user plane connection to be activated and if the SMF buffers a data packet for a QoS flow related to a priority (e.g., ARP priority level) higher than the priority related to the previous data notification message or downlink data packet, the SMF may invoke a new Namf_Communication_N1N2MessageTransfer indicating a higher priority ARP and PDU session ID to the AMF.

When the SMF receives a message from a new AMF (not the AMF to which the SMF previously called the Namf_Communication_N1N2MessageTransfer), while waiting for the user plane connection to be activated, the SMF may re-invoke Namf_Communication_N1N2MessageTransfer to the new AMF.

When supporting paging policy differentiation, the SMF may show a 5QI related to QFI of step 2a, packet received in step 2c, or a paging policy indication related to downlink data received from ARP or UPF or downlink data triggered a data notification message in the Namf_Communication_N1N2MessageTransfer.

NOTE 1: The AMF may receive a request message to perform signaling to the UE/RAN (e.g., network-initiated deregistration, SMF initiated PDU session modification, etc.) from other network functions (NFs). When the UE is in the CM-CONNECTED state and the AMF delivers only an N1 message to the UE, the flow continues in step 6 below.

N2 SM information is optional. For example, when the SMF intends to transmit a PDU session modification command only to update the UE to the PCO, N2 SM information may be optional.

3b) [Conditional operation] The AMF may respond to the SMF.

If the UE is in the CM-IDLE state for the AMF and the AMF may page the UE, the AMF may directly transmit a Namf_Communication_N1N2MessageTransfer response to the SMF with the cause "Attempting to reach UE". The cause "Attempting to reach UE" may indicate to the SMF that the N2 SM information provided in step 3a may be ignored by the AMF if the UE is reachable and that the SMF is requested to provide the N2 SM information again.

While waiting for the UE to respond to the previous paging request, when the AMF receives a Namf_Communication_N1N2MessageTransfer request message having the same priority or lower priority as the previous message triggering paging or when the AMF determines not to trigger an additional paging request for the UE based on a local policy, the AMF may reject the Namf_Communication_N1N2MessageTransfer request message.

When the UE is in the CM-CONNECTED state in the AMF, the AMF may immediately transmit a Namf_Communication_N1N2MessageTransfer response to the SMF with a "N1/N2 transfer success" cause.

If the UE is in the CM-IDLE state and the AMF determines that the UE is not reachable for paging, the AMF may transmit a Namf_Communication_N1N2MessageTransfer response to the SMF or other network functions (NF transmitting the request message to the AMF in step 3a). Alternatively, the AMF may perform asynchronous type communication and store UE context based on the received message. When asynchronous type communication is invoked, when the UE is reachable (e.g., when the UE enters the CM-CONNECTED state), the AMF may initiate communication with the UE and the (R)AN.

When the AMF determines that the UE is not reachable for the SMF (e.g., as the UE is in a mobile initiated connection only (MICO) mode or the UE is registered only through non-3 GPP access and the UE is in the CM-IDLE state), the AMF may reject the request from the SMF. When the SMF does not subscribe to a UE reachability event, the AMF may include an indication (indication that the SMF does not need to trigger a Namf_Communication_N1N2MessageTransfer request for the AMF) in the rejection message. The AMF may store the indication that the SMF has been informed that the UE is not reachable.

When the UE is not in the MICO mode and the AMF detects that the UE is in a non-allowed Area, the AMF may reject a request from the SMF and notify the SMF that the UE is reachable only for the regulatory prioritized service, unless the request from the SMF is for the regulation priority service. The AMF may store the indication that the SMF has been informed that the UE is only reachable for the regulatory prioritized service.

If a registration procedure with an AMF change is in progress when a previous AMF receives Namf_Communication_N1N2MessageTransfer, the previous AMF may reject the request with an indication that Namf_Communication_N1N2MessageTransfer has been temporarily rejected.

When a Namf_Communication_N1N2MessageTransfer response is received with the indication that the request has been temporarily rejected, the SMF may start a locally set guard timer and may wait until a random message comes from the AMF. When a message from the AMF is received, the SMF may re-call Namf_Communication_N1N2MessageTransfer (together with N2 SM information) to the AMF that transmitted the message. In other cases, the SMF may perform step 3a when the guard timer expires. If the SMF determines that control region buffering is applied, the SMF may request the UPF to start transmitting a downlink data PDU to the SMF.

3c) [Conditional operation] SMF may respond to UPF. For example, the SMF may transmit a failure indication to the UPF.

The SMF may notify the UPF of a user plane setup failure.

When the SMF receives an indication that the UE is not reachable or that the UE is reachable only for the regulation priority service from the AMF, the SMF may perform the following operation based on the network policy:

The SMF may instruct the UPF to stop sending data notifications;

The SMF may instruct the UPF to stop buffering the DL data and discard the buffered data;

The SMF may instruct the UPF to stop sending data notifications, stop buffering DL data, and discard the buffered data; or While the UE is not reachable, the SMF suppresses transmitting an additional Namf_Communication_N1N2MessageTransfer message for DL data.

Based on the operator policy, the SMF may apply a suspension of the charging procedure.

When the SMF receives an indication from the AMF that the Namf_Communication_N1N2MessageTransfer requested by the SMF has been temporarily rejected, the SMF may instruct the UPF to apply temporary buffering based on the network policy.

4a) [Conditional operation] When the UE is in the CM-CONNECTED state in the access related to the PDU session ID received from the SMF in step 3a, steps 12 to 22 of FIGS. 8A to 8C may be performed without transmitting a paging message to the (R)AN node and the UE to activate the user plane connection for the PDU session (e.g., radio resources and N3 tunnels may be established). In step 12 of FIGS. 8A to 8C, the AMF may not transmit a NAS service acceptance message to the UE. Parts other than steps 12 to 22 of FIGS. 8A to 8C may be omitted.

4b) [Conditional operation] Even when the UE is in the CM-IDLE state in 3GPP access, the PDU session ID received from the SMF in step 3a is related to the 3GPP access, and the UE is in the CM-CONNECTED state for non-3GPP access, if the AMF determines to notify the UE through 3GPP access based on the local policy, the AMF may transmit a paging message to the NG-RAN node through 3GPP access.

When the UE is simultaneously registered through 3GPP access and non-3GPP access in the same PLMN, the UE is in the CM-IDLE state in 3GPP access and non-3GPP access mode, and the PDU session ID of step 3a is related to the non-3GPP access, the AMF may transmit a paging message related to the access "non-3GPP" to the NG-RAN node through 3GPP access.

When the UE is in RM (Registration Management)-REGISTERED state and CM-IDLE state and the UE is reachable in 3GPP access, the AMF may transmit a paging message (including NAS ID for paging, registration area list, paging DRX length, paging priority indication, and access associated to the PDU session) to the (R)AN node belonging to the registration area in which the UE is registered. When the paging message is received from the AMF, the NG-RAN node may page the UE by including access related to the PDU session in the paging message.

For reference, two RM states of an RM-DEREGISTERED state and an RM-REGISTERED state are used in the UE and the AMF to reflect the registration state of the UE in the PLMN.

When supporting paging policy differentiation, the paging strategy may be set in the AMF for different combinations of DNN, paging policy indication, ARP, and 5QI.

For the RRC-inactive state, a paging strategy may be set in (R)AN for other combinations of paging policy indication, ARP, and 5QI.

The paging priority indication may be included only in the following cases:

When the AMF receives a Namf_Communication_N1N2MessageTransfe message including an ARP value related to priority services (e.g., MPS, MCS) set by an operator.

One paging priority level may be used for multiple ARP values. Mapping of the ARP value for the paging priority level may be set in the AMF and NG-RAN according to an operator policy.

The (R)AN may prioritize paging of the UE according to the paging priority indication (or paging policy indicator).

While waiting for a response from the UE to the paging request message transmitted without a paging priority indication (or paging policy indicator), if the AMF receives a Namf_Communication_N1N2MessageTransfer message indicating an ARP value related to the priority service (e.g., MPS, MCS) set by the operator, the AMF may transmit another paging message together with an appropriate paging priority (or paging policy indicator). For the Namf_Communication_N1N2MessageTransfer message received later having the same priority or higher priority, the AMF may determine whether to transmit a paging message with an appropriate paging priority based on the local policy.

Paging strategies may include the following:

Paging retransmission scheme (e.g., how often paging is repeated or at what time interval paging is repeated);

Determine whether to transmit a paging message to the (R)AN node during specific AMF high load conditions;

Whether to apply sub-area-based paging (e.g., first paging in the last known cell-id or TA and retransmission in all registered TAs)

NOTE 2: Setting a paging priority (or paging policy indicator) in the paging message is independent of any paging strategy.

In order to reduce the signaling load and network resources used to successfully page the UE, the AMF and (R)AN may support additional paging optimization using at least one or more of the following means:

By the AMF implementing specific paging strategies (e.g., the AMF may send an N2 paging message to the (R)AN node that has recently served the UE);

By that AMF taking into account information (information on recommended cells and NG-RAN nodes) on recommended cells and NG-RAN nodes provided by (R)AN when switching to the CM-IDLE state. The AMF may determine the (R)AN node to be paged by considering the (R)AN node-related part of the information, include the information on the recommended cells in the N2 paging message, and provide the information to each of the (R)AN nodes;

By the (R)AN taking into account paging attempt count information provided by the AMF in paging.

When the UE radio capability for paging information is available in the AMF, the AMF may include the UE radio capability for paging information in the N2 paging message and transmit the corresponding N2 paging message to the (R)AN node.

When information on recommended cells and NG-RAN nodes are available in the AMF, the AMF may determine the (R)AN node for paging in consideration of the information, and when paging the (R)AN node, the AMF may transparently transmit the information on the recommended cell to the (R)AN node.

The AMF may include paging attempt count information in the N2 paging message. The paging attempt count information may be the same for all (R)ANs selected for paging by the AMF.

4c) [Conditional operation] When the UE is simultaneously registered for 3GPP access and non-3GPP access in the same PLMN, the UE is in the CM-CONNECTED state in 3GPP access, and the PDU session ID of step 3a is associated with the non-3GPP access, the AMF may transmit a NAS notification message including a non-3GPP access type to the UE through 3GPP access and may set a notification timer. When step 4c is performed, step 5 may be omitted.

When the UE is simultaneously registered for 3GPP access and non-3GPP access in the same PLMN, the UE is in the CM-IDL state in 3GPP access and in the CM-CONNECTED state in non-3GPP access, the PDU session ID of step 3a is associated with 3GPP access, and the AMF determines to notify the UE through the non-3GPP access based on the local policy, the AMF may transmit a NAS notification message including the 3GPP access type to the UE through the non-3GPP access and set a notification timer.

5) [Conditional operation] Signaling from AMF to SMF: The AMF may transmit a notification related to failure of Namf_Communication_N1N2Transfer to the SMF. For example, the AMF may transmit a Namf_Communication_N1N2TransferFailure notification to the SMF.

The AMF oversees the paging procedure using a timer. If the AMF fails to receive a response with respect to the paging request message from the UE, the AMF may apply additional paging according to any available paging strategy described in step 4b.

If the UE does not respond to the paging, the AMF sends a Namf_Communications_N1N2MessageTransfer Failure notification to a notification target address provided by the SMF in step 3a to the SMF to notify the SMF unless the AMF recognizes an ongoing MM procedure that prevents the UE from responding to the SMF. Here, the AMF recognizes the ongoing MM procedure that prevents the UE from responding may be a case in which, for example, the AMF receives an N14 context request message indicating that the UE performs a registration procedure with another AMF.

When the Namf_Communication_N1N2TransferFailure notification is received, the SMF may notify the UPF.

6) When the UE is in the CM-IDLE state in 3GPP access and a paging request for a PDU session related to 3GPP access is received, the UE may initiate the UE initiated service request procedure described in FIGS. 8A to 8C. In step 4 of FIG. 8A, the AMF may call a Nsmf_PDUSession_UpdateSMContext request associated with a PDU session identified in the service request message (excluding the PDU session for the PDU session ID included in Namf_Communication_N1N2MessageTransfe in step 3a of FIG. 9) to the SMF. To support the transfer of buffered data, the SMF may instruct the UPF to establish a data transfer tunnel between the old UPF and the new UPF or PSA as described in steps 6a, 7a, and 8b of FIG. 8A.

When the UE is in the CM-IDLE state in both non-3GPP access and 3GPP access and receives a paging request for a PDU session associated with non-3GPP access, the UE may initiate the UE initiated service request procedure described in FIGS. 8A to 8C. Here, the UE initiated service request procedure may include a list of allowed PDU sessions that may be re-activated through 3GPP access according to the UE policy and whether an S-NSSAI of the PDU session is included in the allowed NSSAI for 3GPP access. If there is no PDU session that may be re-activated through 3GPP access, the UE may include a list of empty allowed PDU sessions. When the AMF receives a service request message from the UE through the non-3GPP access (e.g., due to the UE successfully connecting to the non-3GPP access), the AMF may stop the paging procedure and process the received service request procedure. When the AMF receives the service request message and the list of allowed PDU sessions provided by the UE does not include the PDU session for the UE that has been paged, the AMF may invoke the Namf_EventExposure_Notify service to notify the SMF that the UE is reachable but did not accept re-activation of the PDU session.

When the UE is in the CM-IDLE state in non-3GPP access and in the CM-CONNECTED state in 3GPP access, upon receiving the NAS notification message including the non-3GPP access type through 3GPP access, the UE may initiate UE initiated service request procedure described in FIGS. 8A to 8C. Here, the UE initiated service request procedure may include a list of allowed PDU sessions that may be re-activated through 3GPP access according to the UE policy and whether the S-NSSAI of this PDU session is included in the allowed NSSAI for 3GPP access. If there is no PDU session that may be re-activated through 3GPP access, the UE may include a list of empty allowed PDU sessions. When the AMF receives the service request message and the list of the allowed PDU sessions provided by the UE does not include a PDU session for the UE that has been notified, the AMF may call the Namf_EventExposure_Notify service to notify the SMF that the UE is reachable but did not accept re-activation of the PDU session. When the AMF receives the service request message from the UE through non-3GPP access, the AMF may stop the notification timer and process the received service request procedure.

When the UE is in the CM-IDLE state in 3GPP access and in the CM-CONNECTED state in non-3GPP access, upon receiving the NAS notification identifying the 3GPP access type through the non-3GPP access, the UE may initiate the UE initiated service request procedure described in FIGS. 8A to 8C through 3GPP access if the 3GPP access is available. If the AMF does not receive the service request message before the notification timer expires, the AMF may page the UE through 3GPP access or notify the SMF that the UE was unable to re-activate the PDU session.

7) The UPF may transmit buffered downlink data to the UE through the (R)AN node that has performed the service request procedure.

The network may transmit downlink signaling when a network initiated service request procedure is initiated according to a request from another network described in step 3a.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 10A:
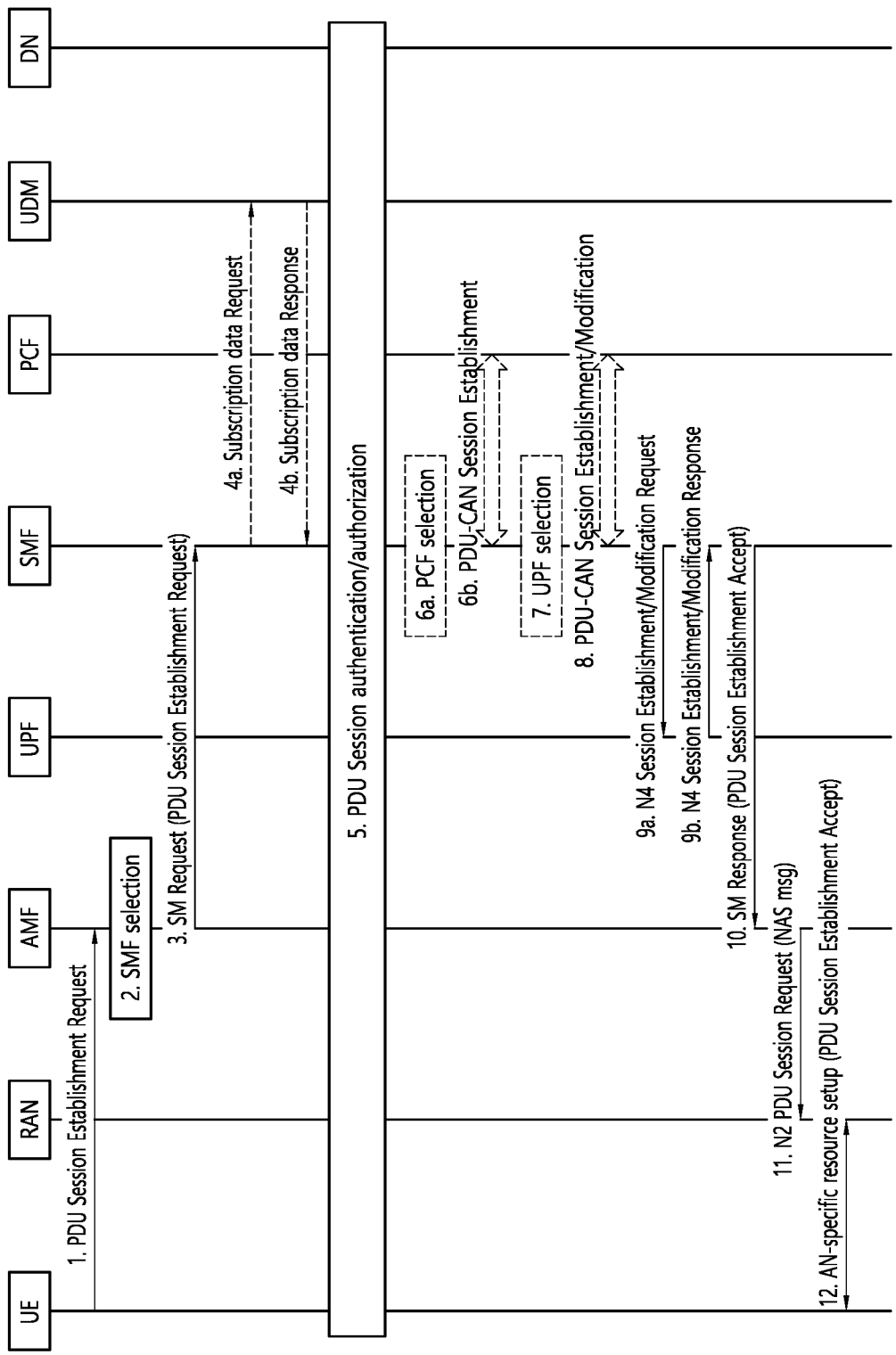
FIGS. 10A and 10B is a signal flowchart illustrating an exemplary PDU session establishment procedure.
Figure 10B:
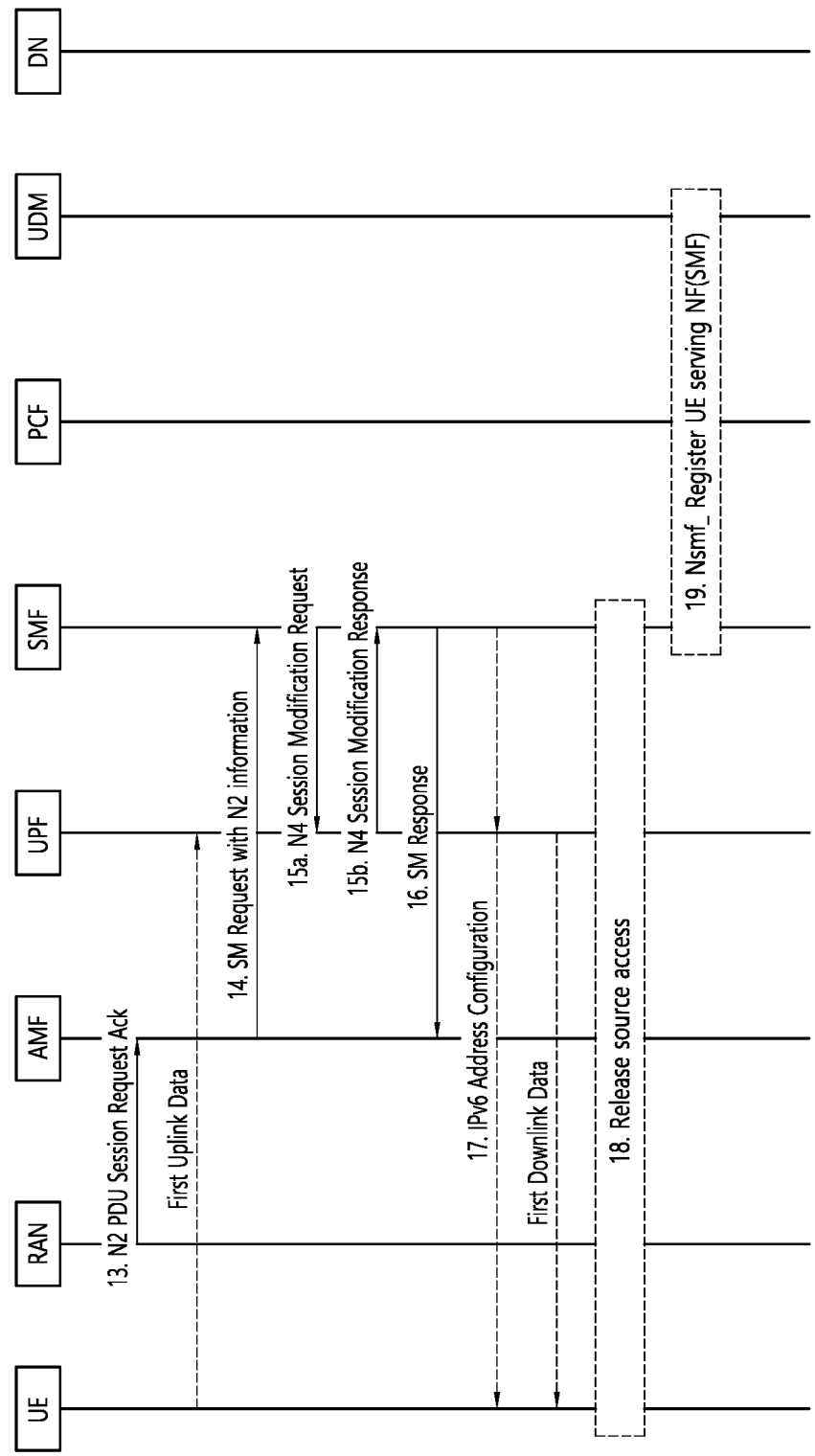

FIGS. 10A and 10B are a signal flowchart illustrating an exemplary PDU session establishment procedure.

The procedure shown in FIGS. 10A and 10B assumes that the UE has already registered on the AMF according to the registration procedure shown in FIGS. 7A and 7B. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (i.e., AMF) in the registration procedure of FIGS. 7A and 7B. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE.

The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/ Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.
  CN Tunnel information: This corresponds to a core network address of an N3 tunnel corresponding to the PDU session.
  QoS Profile: This is used for providing mapping between a QoS parameter and a QoS flow identifier (QFI) to the RAN.
  PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.
  The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/ Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM Register UE serving NF service" including an SMF address and DNN. The UDM may store the ID, address, and DNN of the SMF.

During the procedure, if the PDU Session Establishment is not successful, the SMF notifies this to the AMF.

<PDU Session Release procedure>

FIG. 11 shows a first example of a PDU session release procedure.

Figure 11A:
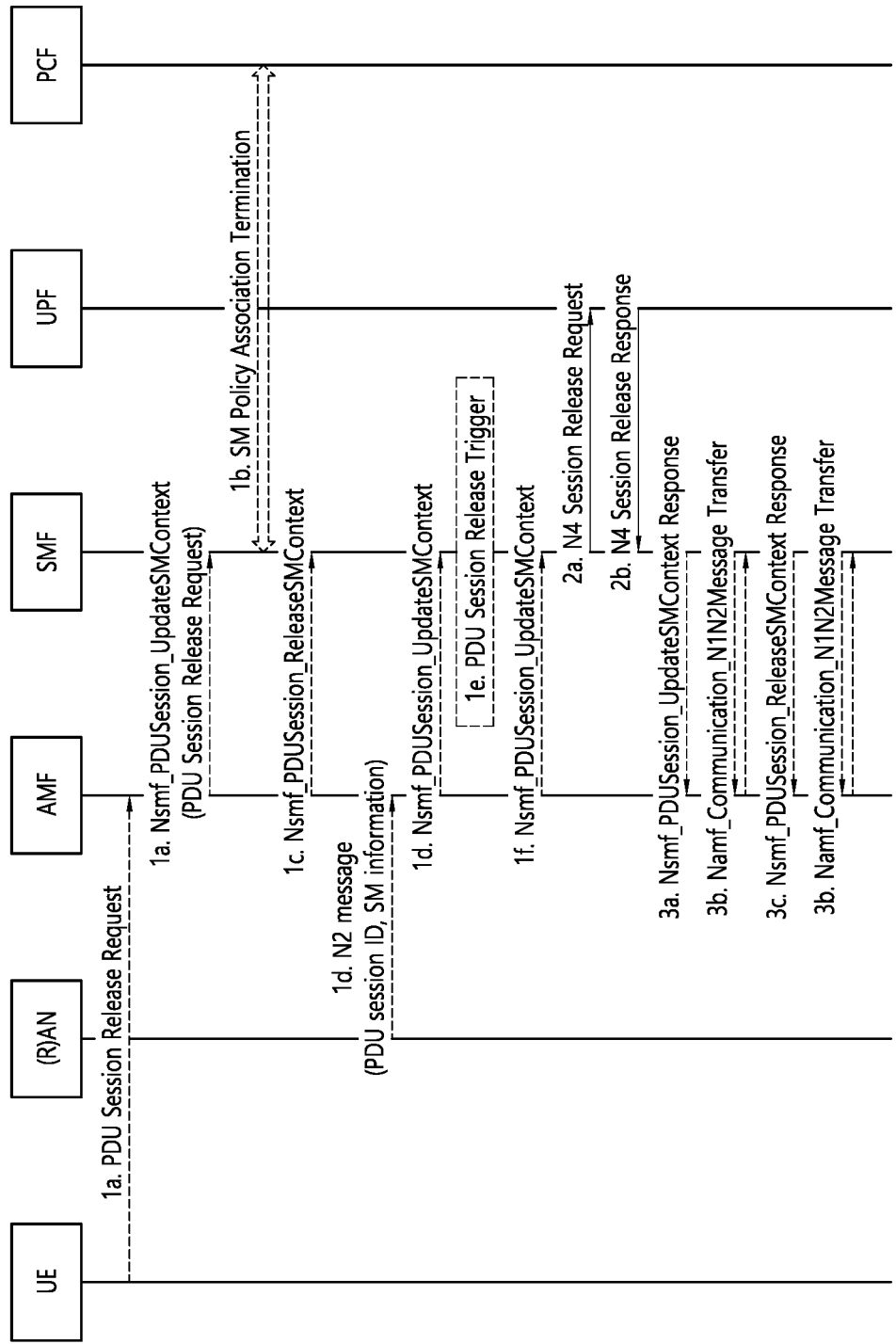
FIGS. 11a and 11b shows a first example of a PDU session release procedure.
Figure 11B:
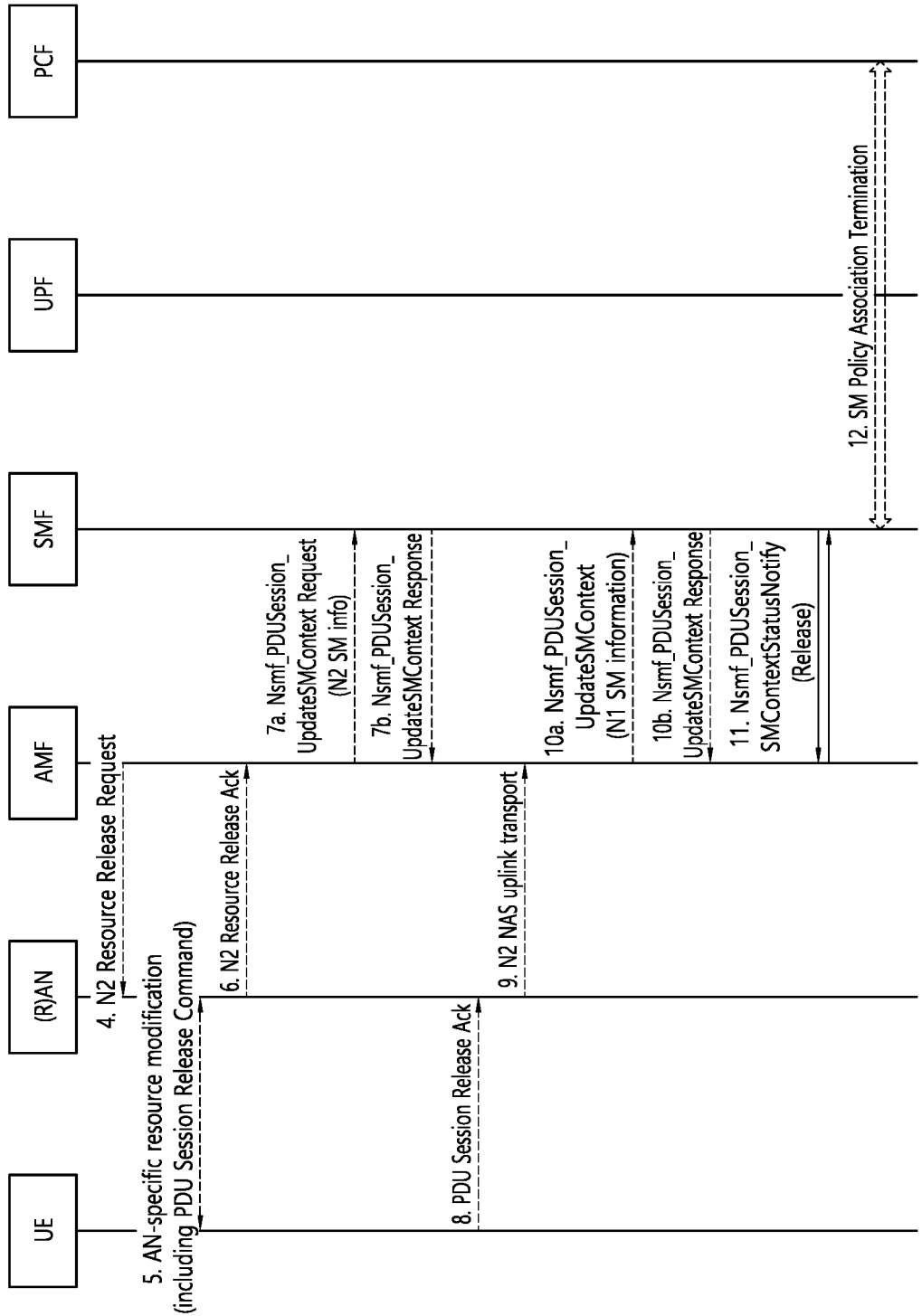

FIG. 11A and FIG. 11B show a first example of a PDU session release procedure. The example shown in FIGS. 11A and 11B is an example of a UE or network requested PDU session release procedure in a non-roaming case and a roaming with local breakout case.

Examples of the PDU session release procedure shown in FIGS. 11A and 11B include both a UE Requested PDU Session Release procedure and a network requested PDU Session Release procedure.

The example of the PDU session release procedure shown in FIGS. 11A and 11B allows the UE to release one PDU session. The example of the PDU session release procedure shown in FIGS. 11A and 11B enables the AMF, SMF, or PCF to initiate the release of a PDU session.

For reference, in the case of the PDU session release procedure of the LBO case (roaming with local breakout (LBO)) is the same as the PDU session release procedure of the non-roaming case shown in FIGS. 11a and 11b except for the difference that AMF, SMF, UPF and PCF are located in the visited network.

1) The PDU session procedure may be triggered by one of the following events.

1a) (UE requested (requested)) The UE may initiate a UE request PDU session release procedure by sending a NAS message to the AMF. The NAS message may include an N1 SM container and a PDU session ID. The N1 SM container may include a PDU session release request message (including a PDU session ID). The NAS message may be delivered to the AMF along with User Location Information (ULI) by the (R)AN. This message may be relayed to the SMF corresponding to the PDU session ID through AMF and N2. The AMF may transmit a PDU session update related message to the SMF. For example, the AMF may use the Nsmf_PDUSession_UpdateSMContext service to provide the ULI and N1 SM container received from the (R)AN to the SMF.

Note 1: According to the access type, when the UE is in the CM-IDLE state, the UE may trigger a service request procedure before being able to perform the procedure related to the release of the PDU session.

1b) (PDU session release initiated by PCF) The PCF may initiate a session management (SM) Policy Association Termination procedure to request release of the PDU session.

1c) When there is a mismatch in the PDU session state between the UE and the AMF, the AMF may transmit a PDU session release related message to the SMF to request the release of the PDU session. For example, the AMF may transmit the Nsmf_PDUSession_ReleaseSMContext message using the Nsmf_PDUSession_ReleaseSMContext service operation.

1d) (R)AN may decide to inform the SMF that the resource related to the PDU session has been released. For example, when all QoS (Quality of Service) flows of the PDU session are released, the (R)AN may transmit an N2 message (including PDU session ID and SM information) to the SMF to inform that the resource related to the PDU session is released.

Note 2: When the SMF receives the N2 message, the SMF may decide whether to keep the user plane connection of the PDU session in a deactivated state or release the PDU session.

1e) (PDU session release triggered by SMF) The SMF may decide to release the PDU session in a scenario such as the examples below:
 if PDU session release is requested from the DN (canceling the UE authorization to access to the DN);
 When a PDU session release is requested from a charging function (CHF) or a PDU session release is requested from a UDM (e.g., subscription change);
 When the SMF receives an event notification from the AMF that the UE is outside the LADN service area; or
 When a PDU session release is required based on an locally configured policy (e.g., the PDU session release procedure may be associated with UPF re-allocation for SSC mode 2/mode 3)

When the SMF receives one of the triggers in steps 1a, 1b, 1c or 1e, the SMF may initiate a PDU session release procedure.

1f) The AMF may perform the Nsmf_PDUSession_UpdateSMContext service operation together with a release indication for requesting release of a PDU session that may require N1 or N2 SM signaling before releasing the SM context. For example, the AMF may send a message related to the PDU session update to the SMF.

2) The SMF may release the IP address, Prefix(es) allocated to the PDU session. The SMF may release user plane resources corresponding to the PDU session. The SMF and UPF may perform the following operations (steps 2a and 2b).

2a) The SMF may transmit an N4 session release request message to the UPF(s) related to the PDU session. The N4 session release request message may include an N4 session ID. When the UPF(s) receives the N4 session release request message, the UPF(s) may drop remaining packets of the PDU Session. UPF may release all tunnel resources and contexts related to the N4 session.

2b) The UPF(s) may acknowledge the N4 session release request message by sending the N4 session release response message (including the N4 session ID) to the SMF.

Note 3: When there are multiple UPFs associated with a PDU session (e.g., due to the insertion of UL CL or Branching Point), the session release request procedure of steps 2a and 2b may be performed for each UPF.

3) When the PDU session release procedure is initiated by the PCF and the SMF, and the SMF is notified from the AMF that the UE is unreachable (e.g., the UE is in MICO mode (due to the UE is in MICO mode) or Periodical registration failure), the SMF performs step 11, and steps 3 and 4-10 may be omitted.

For example, the SMF may use Nsmf_PDUSession_SMContextStatusNotify to notify the AMF that the PDU session has been released. When the PDU session release procedure is triggered by steps 1a, 1b, 1d or 1e, the SMF may generate an N1 SM including a PDU session release command message (including a PDU session and a Cause value). The Cause value may indicate a trigger for establishing a new PDU session having the same characteristics (e.g., when a procedure related to SSC mode 2 is invoked).

3a) (when the PDU session release procedure is initiated by the UE) The SMF may respond to the AMF by sending a response message associated with the PDU session update. For example, the SMF may transmit an Nsmf_PDUSession_UpdateSMContext response message (including an N2 SM resource release request message and an N1 SM container (including a PDU session release command message)) to the AMF.

3b) When the PDU session release procedure is initiated by the SMF, the SMF may perform the Namf_Communication_N1N2MessageTransfer service operation. For example, the SMF may transmit a Namf_Communication_N1N2MessageTransfer message (including an N1 SM container (including a PDU session command message) and a skip indicator) to the AMF.

When the user plane connection of the PDU session is active, the SMF may include an N2 resource release request (including the PDU session ID) in the Namf_Communication_N1N2MessageTransfer message to release (R)AN resources associated with the PDU session.

"skip indicator" may inform the AMF to skip transmitting the N1 SM container to the UE (e.g., when the UE is in the CM-IDLE state). Except when the PDU session release procedure is triggered to change the PDU Session Anchor of the PDU session in SSC mode 2, the SMF may include a "skip indicator" in the Namf_Communication_N1N2MessageTransfer message.

When the UE is in the CM-IDLE state and a Namf_Communication_N1N2MessageTransfer message including a "skip indicator" is transmitted to the AMF, the AMF may transmit a Namf_Communication_N1N2MessageTransfer response message to the SMF to acknowledge the operation of step 3b. The Namf_Communication_N1N2MessageTransfer response message may include information "N1 SM Message Not Transferred". And, steps 4 to 10 may be skipped.

3c) When the PDU session release procedure is initiated by the AMF (e.g., when the SMF receives the Nsmf_PDUSession_ReleaseSMContext request message from the AMF in step 1c), the SMF may respond to the AMF by sending an Nsmf_PDUSession_ReleaseSMContext response message.

AMF and SMF may remove all contexts (including the PDU session ID) associated with the PDU session (indicated by the UE as released). AMF and SMF can remove all event subscriptions by SMF in AMF. Steps 4 to 11 may be skipped.

3d) The SMF may receive a request message related to the PDU session update. For example, the SMF may receive an Nsmf_PDUSession_UpdateSMContext request message including a release indication (an indication for requesting release of the PDU session according to step 1f).

If a request message associated with a PDU session update is received due to a change in the set of network slices for the UE when the network slice instance is no longer available, and the user plane connection of the PDU session is active, the SMF may perform a Namf_Communication_N1N2MessageTransfer service operation including the N2 resource release request message (including the PDU session ID) in order to release the (R)AN resource associated with the PDU session.

4) When the UE is in the CM-IDLE state and when "N1 SM delivery can be skipped" is not indicated (e.g., when the AMF does not receive a "skip indicator"), the AMF may initiate a network initiated service request procedure, in order to transmit a NAS message to the UE. The NAS message may include a PDU session ID and an N1 SM container.

When the UE is in the CM-CONNECTED state, the AMF may transmit SM information to (R)AN. Here, the SM information may be the N2 SM resource request message and the N1 SM container received by the SMF in step 4.

5) When the (R)AN receives the N2 SM request message for releasing the AN resource associated with the PDU session, in order to release the corresponding AN resource, the (R)AN may perform an AN-specific signaling exchange with the UE.

In the case of NG-RAN, RRC Connection Reconfiguration may be performed with the UE in order to release NG-RAN resources related to the PDU session.

While this procedure is being performed, the (R)AN may send the NAS message received from the AMF to the UE. Here, the NAS message may include an N1 SM container (including a PDU session release command message).

6) [Conditional action] When (R)AN receives an N2 SM request message to release AN resources, (R)AN sends N2 SM resource release Ack (including User Location Information, Secondary RAT usage data) to AMF, thus (R)AN may acknowledge the N2 SM resource release request message.

If the PLMN has set the secondary RAT usage reporting, the NG-RAN node may provide the RAN Usage Data Report to the AMF.

7a) The AMF may transmit a message related to the PDU session update to the SMF. For example, the AMF may send the Nsmf_PDUSession_UpdateSMContext message to the SMF. The Nsmf_PDUSession_UpdateSMContext message may include N2 SM resource release Ack (including Secondary RAT usage data) and User Location Information.

7b) The SMF may respond to the AMF by sending an Nsmf_PDUSession_UpdateSMContext response message.

8) The UE may acknowledge the PDU session release command message by transmitting a NAS message to the (R)AN. The NAS message includes the PDU session ID and the N1 SM container (including the PDU session release Ack message).

9) [Conditional operation] (R)AN may forward the NAS message received from the UE to the AMF. For example, the (R)AN may transmit the NAS message to the AMF by transmitting an N2 NAS uplink transport message. The N2 NAS uplink transport message may include a NAS message and User Location information. The NAS message may include a PDU session ID and an N1 SM container (including a PDU session release Ack message).

10a) The AMF may transmit a message related to the PDU session update to the SMF. For example, the AMF may send the Nsmf_PDUSession_UpdateSMContext message to the SMF. The Nsmf_PDUSession_UpdateSMContext message may include an N1 SM container (including a PDU session release Ack message) and User Location information.

10b) The SMF may respond to the AMF by sending a response message related to the PDU session update. For example, the SMF may send an Nsmf_PDUSession_UpdateSMContext response message to the AMF.

For reference, steps 8 to 10 may be performed before steps 6 to 7.

11) If step 3a, 3b or 3d has been performed, the SMF may wait until it receives a response to the N1 and N2 information provided in step 3 as needed.

In order to notify the AMF that the SM context for the PDU session has been released, the SMF may perform a PDU session context status notification related operation. For example, the SMF may transmit an Nsmf_PDUSession_SMContextStatusNotify message to the AMF. The AMF may release the association between the SMF ID and the PDU session ID, the DNN, and the S-NSSAI.

Note 5: The UE and 5GC may synchronize the status of the (released) PDU session when performing the next service request procedure or registration procedure.

12) If Dynamic Policy and Charging (PCC) is applied to the PDU session, the SMF may perform the PCF and SM Policy Association Termination procedure to delete the PDU session.

SMF notifies PDU session release to any entity that has subscribed to User Location Information related with PDU Session change.

If it is the last PDU Session the SMF is handling for the UE for the associated (DNN, S-NSSAI), the SMF may unsubscribe to the session management subscription data changes notification with the UDM. For example, the SMF may unsubscribe by performing a Nudm_SDM_Unsubscribe (including SUPI, DNN, and S-NSSAI) service operation. A UDM may unsubscribe from a subscription notification from a UDR using the Nudr_DM_Unsubscribe (including SUPI, Subscription Data, Session Management Subscription data, DNN, S-NSSAI) service action.

SMF may perform Nudm_UECM_Deregistration service operation including DNN and PDU session ID. UDM may remove association between DNN and PDU session ID related to SMF identity. UDM may update this information using Nudr_DM_Update (including SUPI, Subscription Data, UE context in SMF data) service action.

Figure 12A:
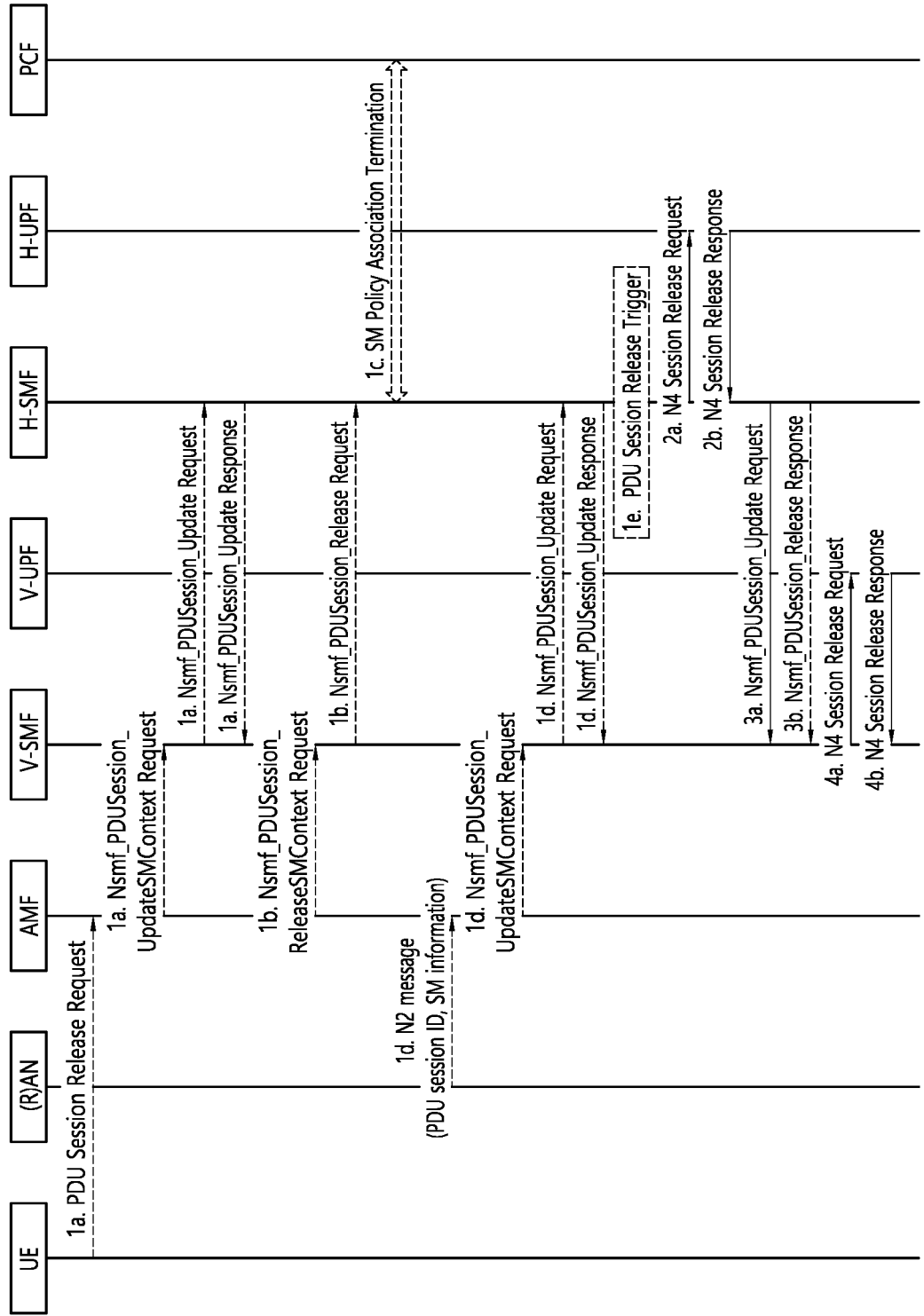
FIGS. 12a and 12b show a second example of a PDU session release procedure.
Figure 12B:
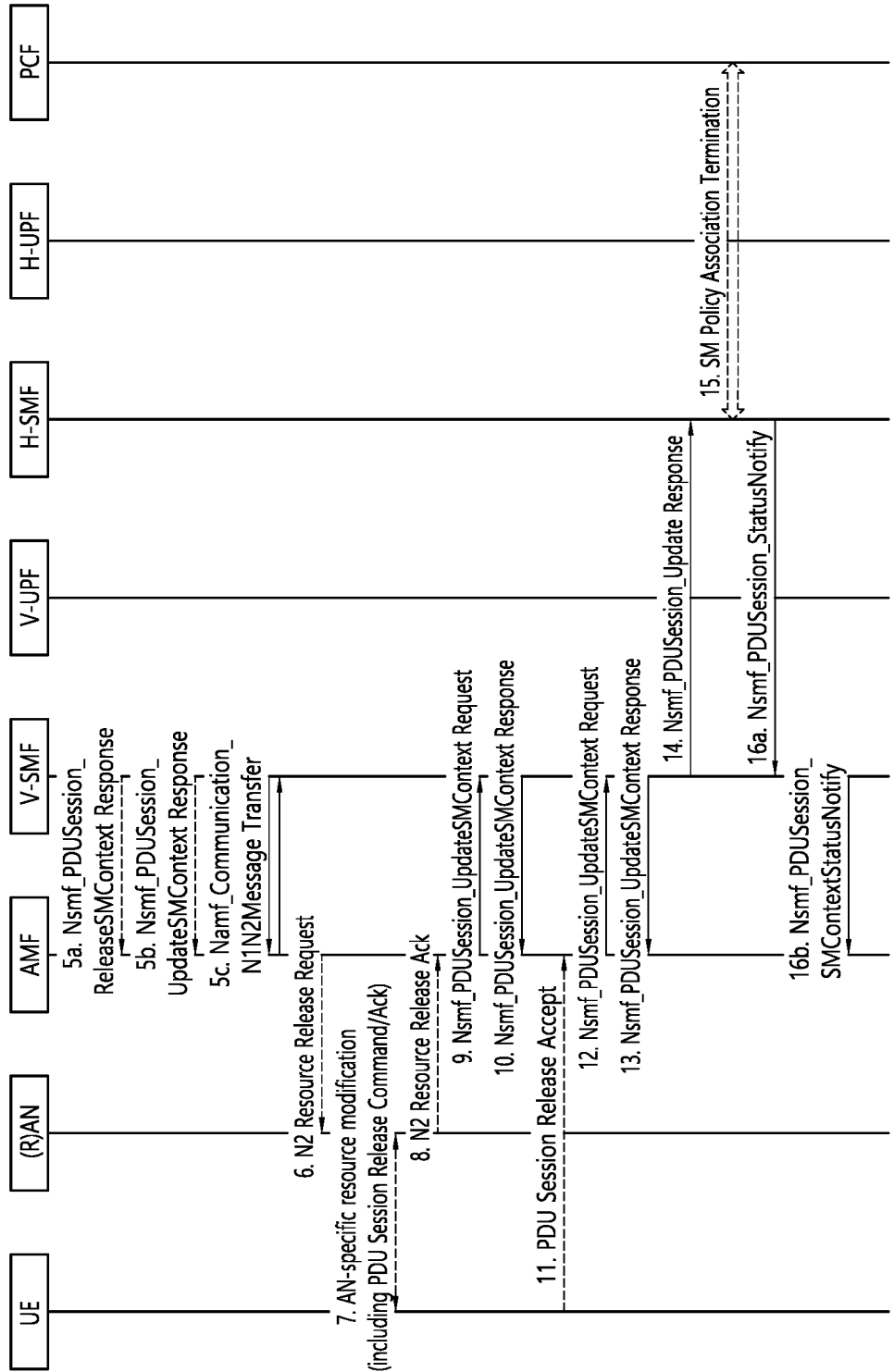

FIGS. 12A and 12B show a second example of a PDU session release procedure.

FIGS. 12A and 12B show a second example of a PDU session release procedure.

The example shown in FIGS. 12A and 12B is an example of a UE or network request PDU session release procedure in a home-routed roaming case. Among the steps of the example of the PDU session release procedure shown in FIGS. 12A and 12B, descriptions of parts overlapping with the example of the PDU session release procedure shown in FIGS. 11A and 11B will be omitted, and FIGS. 12A and 12B will be described with a focus on the differences between FIGS. 11A and 11B and FIGS. 12A and 12B.

1) The PDU session procedure may be triggered by one of the following events.

1a) (UE-initiated release) is performed in the same manner as step 1a of FIGS. 11A and 11B. Additionally, in order to request the H-SMF to release the PDU session in step 1a of FIGS. 11A and 11B1, a procedure in which the V-SMF transmits a PDU session update request message may be added. The PDU session update request message transmitted by the V-SMF may be an Nsmf_PDUSession_Update Request message. The Nsmf_PDUSession_Update Request message may include SUPI, PDU session ID, information (e.g., PCO) of an SM message received from the UE, "Trigger PDU Session Release" indication, Timezone, and User Location Information. The H-SMF can immediately respond to the request of the V-SMF.

1b) (Serving Network Initiated Release) The serving network may initiate a PDU session release procedure during the UE or serving network initiated Deregistration procedure (UE or serving network initiated Deregistration procedure). In this case, there may be no NAS SM message exchange between the UE and the V-SMF. The V-SMF may initiate a PDU session release procedure by sending a PDU session release request message to the H-SMF. For example, the V-SMF may initiate release of the PDU session in the H-SMF by sending an Nsmf_PDUSession_Release request message.

1c) (HPLMN initiation release) step 1c may be performed in the same manner as step 1b of FIGS. 11A and 11B.

1d) step 1d may be performed in the same manner as step 1d in FIGS. 11A and 11B.

1e) (HPLMN initiation release) Step 1e may be performed in the same manner as Step 1e of FIGS. 11A and 11B.

When the H-SMF receives one of the triggers of steps 1a, 1c or 1e described above, the H-SMF may initiate a PDU session release procedure.

2a and 2b) Steps 2a and 2b performed by the H-SMF and H-UPF of FIGS. 12a and 12b may be performed in the same manner as steps 2a and 2b of FIGS. 11a and 11b. Here, H-SMF is the SMF in HPLMN.

3a) (UE or HPLMN Initiated Release) The H-SMF may prepare an SM Release PDU Session Command message. In addition, the H-SMF may initiate PDU session release for the UE by sending a PDU session update request message (e.g., Nsmf_PDUSession_Update Request message). For example, the PDU session update request message may be transmitted based on the Nsmf_PDUSession_Update Request service operation. The Nsmf_PDUSession_Update Request message may include information (e.g., Release Cause or PCO) required for the V-SMF to build the SM Release PDU Session Command message for the UE.

3b) (Serving network initiation release) The H-SMF may respond to the PDU release request message transmitted from the V-SMF by transmitting a PDU session release response message (e.g., Nsmf_PDUSession_Release response).

4a-4b) The V-SMF may release the user plane resource corresponding to the PDU session. Steps 4a and 4b may be performed by V-SMF in the same manner as steps 2a and 2b.

5-13) Steps 5-13 may be performed in the same manner as steps 3 to 10 of FIGS. 11A and 11B.

14) (UE or HPLMN initiation release) The V-SMF sends a PDU session update response message (e.g., Nsmf_P-DUSession_Update response message) to the H-SMF, thus the V-SMF may respond to the PDU session update request message received in step 3a (e.g., Nsmf_PDUSession_Update Request message). The PDU session update response message may include information such as User Location Information, Time Zone, Secondary RAT Usage Data, and an SM PDU Session Accept message (including information received from the UE such as PCO).

15) (Release UE or HPLMN or Serving Network Initiation) The H-SMF may perform a PCF and SM Policy Association Termination procedure, and the H-SMF may release SM policy control association with the PCF. In the serving network initiated PDU session release case, step 15 may be performed between step 1b and step 3b.

16) (UE or HPLMN Initiation Release) The H-SMF may remove all contexts associated with the PDU session.

16a) The H-SMF may transmit a PDU session status notification message to the V-SMF to request the V-SMF to release all contexts related to the PDU session. For example, the H-SMF may transmit a PDU session status notification message to the V-SMF through the Nsmf_PDUSession_StatusNotify service operation. The PDU session state notification message may include PDU session status information indicating that the PDU session has been released.

16b) The V-SMF may request the AMF to release all contexts related to the PDU session by transmitting a PDU session context status notification message. For example, the PDU session context status notification message may be an Nsmf_PDUSession_SMContexStatusNotify message. The PDU session context status notification message may include PDU session status information indicating that the PDU session has been released. The AMF may release the association between the SMF ID and the PDU session ID.

FIG. 13 shows a third example of a PDU session release procedure.

FIG. 13 shows a third example of a PDU session release procedure. The example shown in FIG. 13 is an example of a UE or network Requested PDU Session Release via Untrusted non-3GPP access procedure. Among the steps of the example of the PDU session release procedure shown in FIG. 13, descriptions of parts overlapping with the examples of the PDU session release procedure shown in FIGS. 11A and 11B and 12A and 12B will be omitted, and FIG. 13 will be described with a focus on the differences between FIG. 13 and FIGS. 11A, 11B, FIGS. 12A, 12B.

Figure 14:
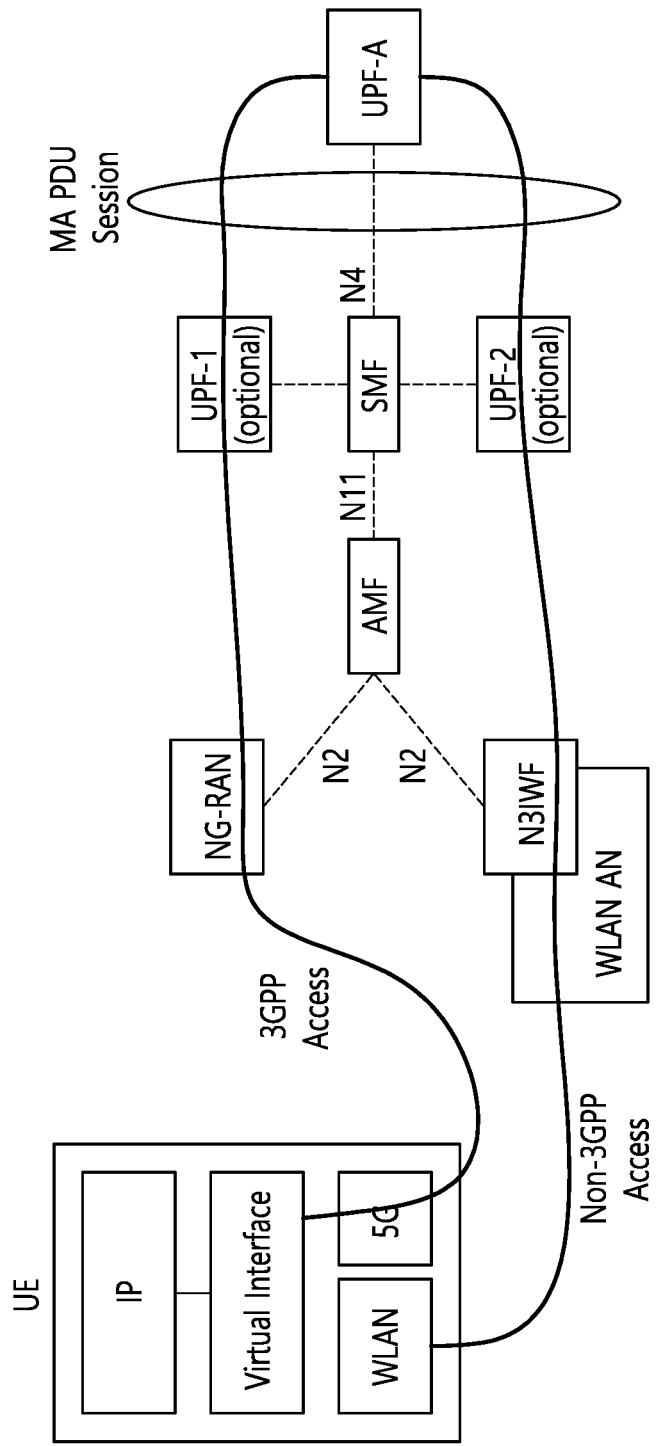
FIG. 14 shows an example in which an MA PDU session is generated.

FIG. 14 shows a procedure for a UE or network to release a PDU session via an untrusted non-3GPP access network. The UE requested PDU session release procedure through non-3GPP access may be applied to non-roaming case, roaming with LBO case and home-routed roaming case scenarios.

In non-roaming and roaming with LBO (LBO) scenarios, if the UE is simultaneously registered for 3GPP access in the N3IWF's PLMN and another PLMN, functional entities (e.g. UPF, SMF, AMF, etc.) may be located within the N3IWF's PLMN. In the home-routed roaming scenario, in the description below, the AMF, V-SMF and related UPF in the VPLMN may be located in the PLMN of the N3IWF.

Note: If the UE is simultaneously registered for 3GPP access in the same PLMN as the PLMN for non-3GPP access, if non-3GPP access is not available to the UE (e.g. due to out of non-3GPP coverage), or if the UE If the CM-IDLE state for access, the UE may perform a PDU session release procedure through 3GPP access based on FIGS. 11A to 12B.

1) One or more PDU sessions have already been established for the UE.

2) The UE may transmit a NAS message (including N1 SM container, PDU session ID) to AMF through N3IWF. The N1 SM container may include a PDU session release request message.

3) In the case of non-roaming and roaming with LBO, steps 1a to 3 of FIGS. 11A and 11B may be performed. In the case of home-routed roaming, steps 1a to 7 of FIGS. 12A and 12B may be performed.

4) The AMF may transmit an N2 resource release request message to the N3IWF. In the case of non-roaming and roaming with LBO, step 4 may be performed in the same manner as step 4 of FIGS. 11A and 11B. In the case of home-routed roaming, step 4 may be performed in the same manner as step 6 of FIGS. 12A and 12B.

5) When the N3IWF receives the AN session release request message from the AMF, the N3IWF may trigger the release of the Child SA (Security Association) by sending a corresponding INFORMATIONAL EXCHANGE message (including Delete Payload) to the UE. Delete Payload may be included in a message listing the Security Parameters Indication (SPI) of Child SAs to be deleted for this PDU session.

6) The UE may respond to the N3IWF by sending an INFORMATIONAL EXCHANGE message (including Delete Payload). Delete Payload may be included for paired SAs going in the other direction.

7) The N3IWF may transmit an N2 resource release Ack message to the AMF. In the case of non-roaming and roaming with LBO, step 7 may be performed in the same manner as step 6 of FIGS. 11A and 11B. In the case of home-routed roaming, step 7 may be performed in the same manner as step 8 of FIGS. 12A and 12B.

8) In the case of non-roaming and roaming with LBO, step 7 of FIGS. 11A and 11B may be performed. In the case of home-routed roaming, steps 9 and 10 of FIGS. 12A and 12B may be performed.

9) N3IWF may deliver a NAS message to the UE. The NAS message may include an N1 SM container (including a PDU session release command message), a PDU session ID, and a Cause.

10) The UE may send a NAS message to the N3IWF. NAS message may include N1 SM container (including PDU session release Ack message), PDU session ID 11) The N3IWF may transmit an N2 NAS uplink transport message to the AMF. In the case of non-roaming and roaming with LBO, step 11 may be performed in the same manner as step 9 of FIGS. 11A and 11B. In the case of home-routed roaming, step 11 may be performed in the same manner as step 11 of FIGS. 12A and 12B.

For reference, steps 5 and 9 may be sequentially performed. Step 10 may be performed before step 6.

12) In the case of non-roaming and roaming with LBO, steps 10 and subsequent steps of FIGS. 11A and 11B may be performed. In the case of home-routed roaming, steps 12 and subsequent steps of FIGS. 12A and 12B may be performed.

The network requested PDU session release procedure through untrusted non-3GPP access may be performed in the same manner as the network requested PDU session release procedure shown in FIGS. 11A and 11B. However, the following differences may be applied:

(R)AN corresponds to N3IWF

When the N3IWF receives an N2 SM request from the AMF to release the AN resource associated with the PDU session in step 5 of FIGS. 11A and 11B, the N3IWF may trigger release of the corresponding Child SA to the UE.

In steps 6, 7a, 9, 10a and 12 of FIGS. 11A and 11B, User Location Information is not included.

<ATSSS(Access Traffic Steering, Switching and Splitting)>

ATSSS feature (feature) is an optional feature that can be supported by the UE and the 5GC network.

The ATSSS feature enables multi-access PDU Connectivity Service by using one 3GPP access network and one non-3GPP access at the same time. The multi-access PDU connectivity service may be realized by establishing a MA PDU session. The MA PDU session may be a PDU session with a user plane in two access networks (e.g., a 3GPP access network and a non-3GPP access network).

When the UE is registered through both 3GPP access and non-3GPP access, or when the UE is registered through one access, the UE may request establishment of a MA PDU session.

When a MA PDU session is established and a user plane exists in the two access networks, the UE may apply a network-provided policy (e.g., ATSSS rule) provided by a network and consider local conditions (e.g. network interface availability, signal loss condition, user preference, etc.) to determine how to distribute uplink traffic for the two accesses. Similarly, the UPF anchor of the MA PDU session applies the network-provided policy (e.g., N4 rule) and feedback information (e.g., signal loss condition, etc.) received from the UE to decide how to distribute downlink traffic through two access networks.

The ATSSS feature can be supported in all types of access networks, such as untrusted non-3GPP access, trusted non-3GPP access, wired 5G access network, etc., if the MA PDU session can be established in that type of access network.

<Multi-Access (MA) PDU Session>

The MA PDU session is a PDU session that can be serviced simultaneously with 3GPP access and non-3GPP access using one PDU session.

FIG. 14 shows an example in which an MA PDU session is generated.

The MA PDU session is one PDU session shown in the example of FIG. 14 and has a separate session tunnel for each access. One is established on 3GPP access, and the other PDU session is established on untrusted non-3GPP access (e.g., WLAN AN).

Since the MA PDU session is one session, the MA PDU session has the following characteristics.

(i) One DNN;
(ii) One UPF anchor (UPF-A);
(iii) One PDU type (e.g., IPv6);
(iv) One session IP address;
(v) One SSC mode;
(vi) One HPLMN S-NSSAI.

The MA PDU session enables a multipath data link between the UE and UPF-A. This can be implemented below the IP layer.

The MA PDU session may be established through one of the following procedures.

(i) MA PDU session may be established through two separate PDU session establishment procedures. This is called individual establishment.

(ii) MA PDU session may be established through one MA PDU session establishment procedure. That is, the MA PDU session is simultaneously established in two accesses with one session creation request. This is called binding establishment.

After the MA-PDU session is established, SM (Session Management) signaling related to the MA PDU session may be transmitted and received through any access.

A. Individual establishment of MA PDU session

MA PDU session may be established through two separate PDU session establishment procedures. For example, the UE may establish a MA PDU session on 3GPP access, and then perform a PDU session establishment procedure to add non-3GPP access to the MA PDU session established on 3GPP access. The request type in the establishment request message for adding the second access may be set to "MA PDU Request".

B. Combined establishment of MA PDU session

MA PDU session may be established for 3GPP access and non-3GPP access at the same time through one procedure. One such procedure may be referred to as a MA PDU session establishment procedure by UE request. The above procedure may be useful when the UE intends to establish a MA PDU session while the UE is already registered with 5GC through two accesses. Instead of performing two separate PDU session establishment procedures, the UE may establish a MA PDU session by performing one MA PDU session establishment procedure.

Figure 15:
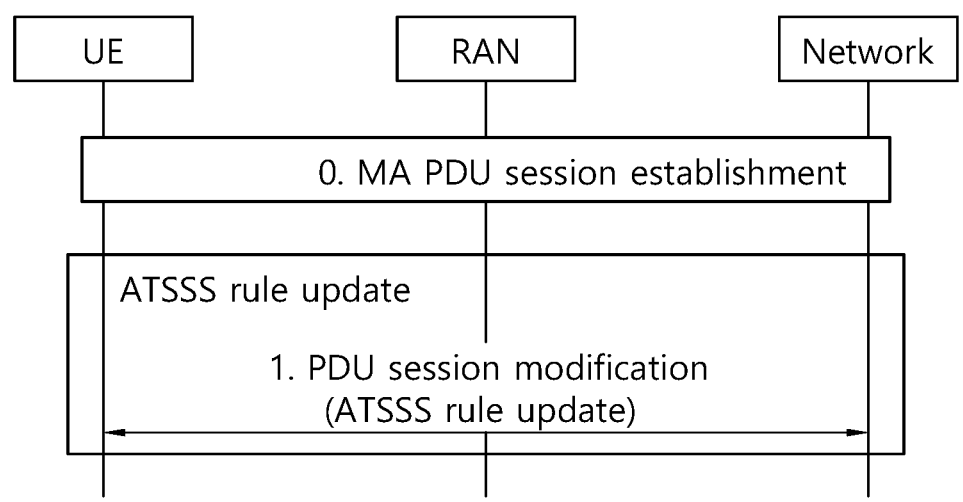
FIG. 15 shows an example of applying the ATSSS rule to the MA PDU session.

FIG. 15 shows an example of applying the ATSSS rule to the MA PDU session.

Referring to FIG. 15, if the SMF wants to move an IP flow transmitted via non-3GPP access to 3GPP access in a state in which a multi-access (MA) PDU session is established, the SMF may transmit the updated ATSSS rule through 3GPP access.

II. Problems to be Solved by the Disclosure of the Present Specification

A procedure for managing Multi Access PDU Session (MA PDU session) may be used in 5G. For example, a procedure for releasing the MA PDU session, a procedure for the UE to re-activate the MA PDU session, a procedure for establishing the MA PDU session, etc. may be used.

Meanwhile, a procedure for managing a MA PDU session has not been clearly defined in the prior art. Specifically, in the prior art, while the procedure for managing the MA PDU session is performed, the operations performed by the UE, the AMF node, the SMF node, etc. are not clearly defined.

As an example, it is not clearly defined which operations are to be performed in order to release the MA PDU session. As another example, when the MA PDU session is deactivated for at least one access, it is not clearly defined what operations are to be performed in order to re-activate the MA PDU session. As another example, when the user plane resource for one access is released after the MA PDU session is established in both accesses, it is not clearly defined what operations should be performed to add the user plane resource of the MA PDU session. As another example, the operation of synchronizing the PDU session state of the MA PDU session between the UE and the network node (e.g., AMF, SMF, etc.) is not clearly defined.

For example, when releasing an MA PDU session, it is not clearly defined what operation should be performed when releasing only one access or releasing both accesses. For another example, it is not clearly defined what operation should be performed when the UE wants to re-activate the MA PDU session. For another example, if the state of the MA PDU session understood by the network node (e.g., SMF node, AMF node, etc.) and the state of the MA PDU session understood by the UE are mismatched, what operation should be performed is not clearly defined.

The above-described examples are only examples in which operations performed while a procedure for managing a MA PDU session is performed are not clearly defined, and other problems may exist in addition to the above-described examples.

The MA PDU session release procedure includes a case where only one access of the MA PDU session is released or both accesses are released when the UE or the network releases the MA PDU session.

As described above, there is a problem in that a procedure for managing an MA PDU session is not clearly defined in the prior art. As one example of the problems related to the procedure for managing the MA PDU session, the problem of releasing both accesses of the MA PDU session will be described in detail.

The conventional MA PDU session release procedure does not accurately describe what operation should be performed when both accesses of the MA PDU session are released.

As an example, in the description of the conventional MA PDU session release procedure, it is described that the SMF generates one PDU Session Release Command message and transmits it to the UE. However, it is not clearly defined through which access the SMF transmits the PDU session release command message to the UE.

As another example, when both accesses of the MA PDU session are released, whether N2 release for 3GPP access and N2 release for non-3GPP access can be performed/transmitted at the same time or not or whether the N2 release for 3GPP access and the N2 release for non-3GPP access can be sequentially performed/transmitted or not is not clearly defined.

In a situation in which it is not clearly determined how the MA PDU session release procedure should be performed as described above, when the SMF performs the PDU session release procedure, the following operation may be performed.

Figure 16A:
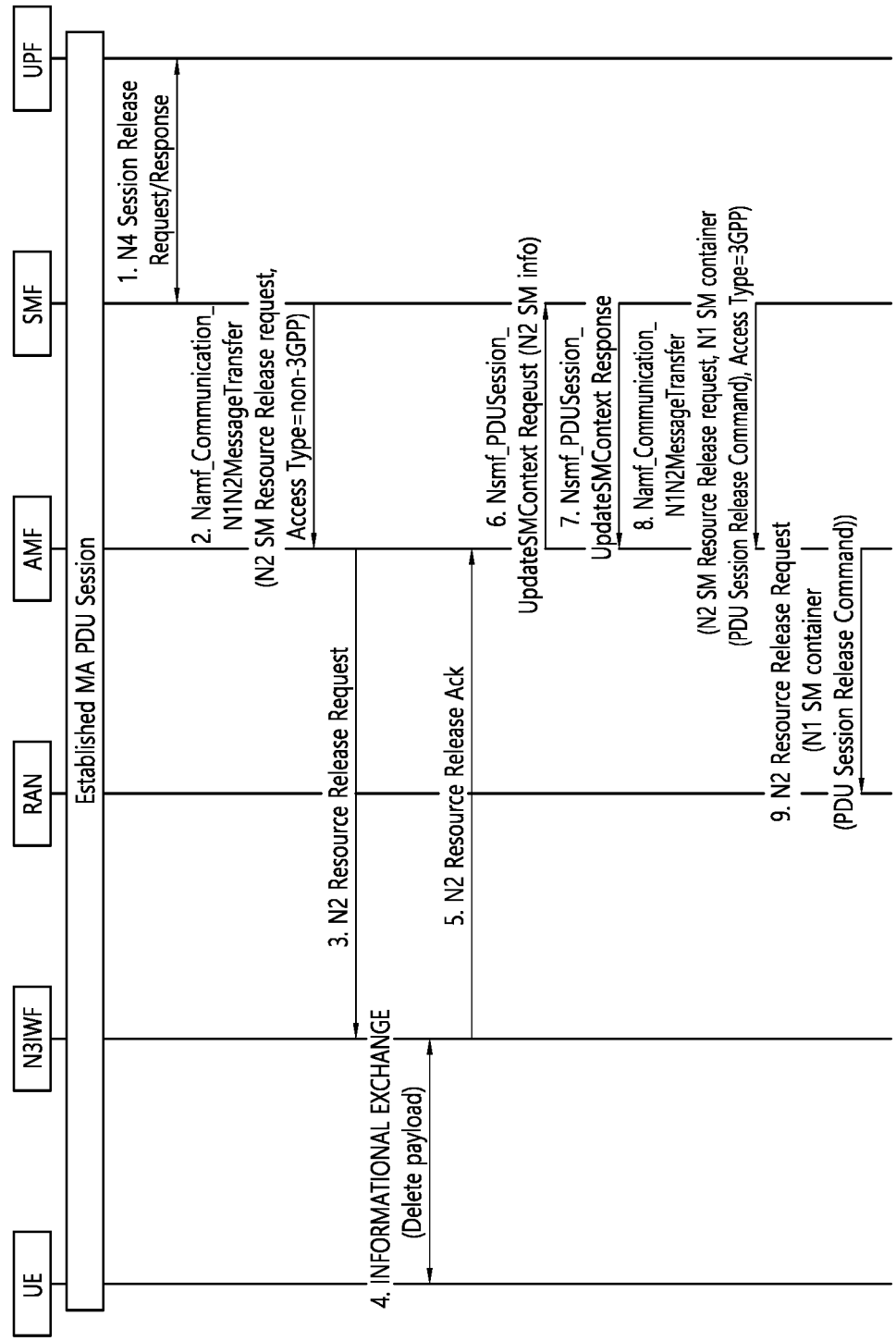
FIGS. 16a and 16b show an example of a PDU session release procedure.
Figure 16B:
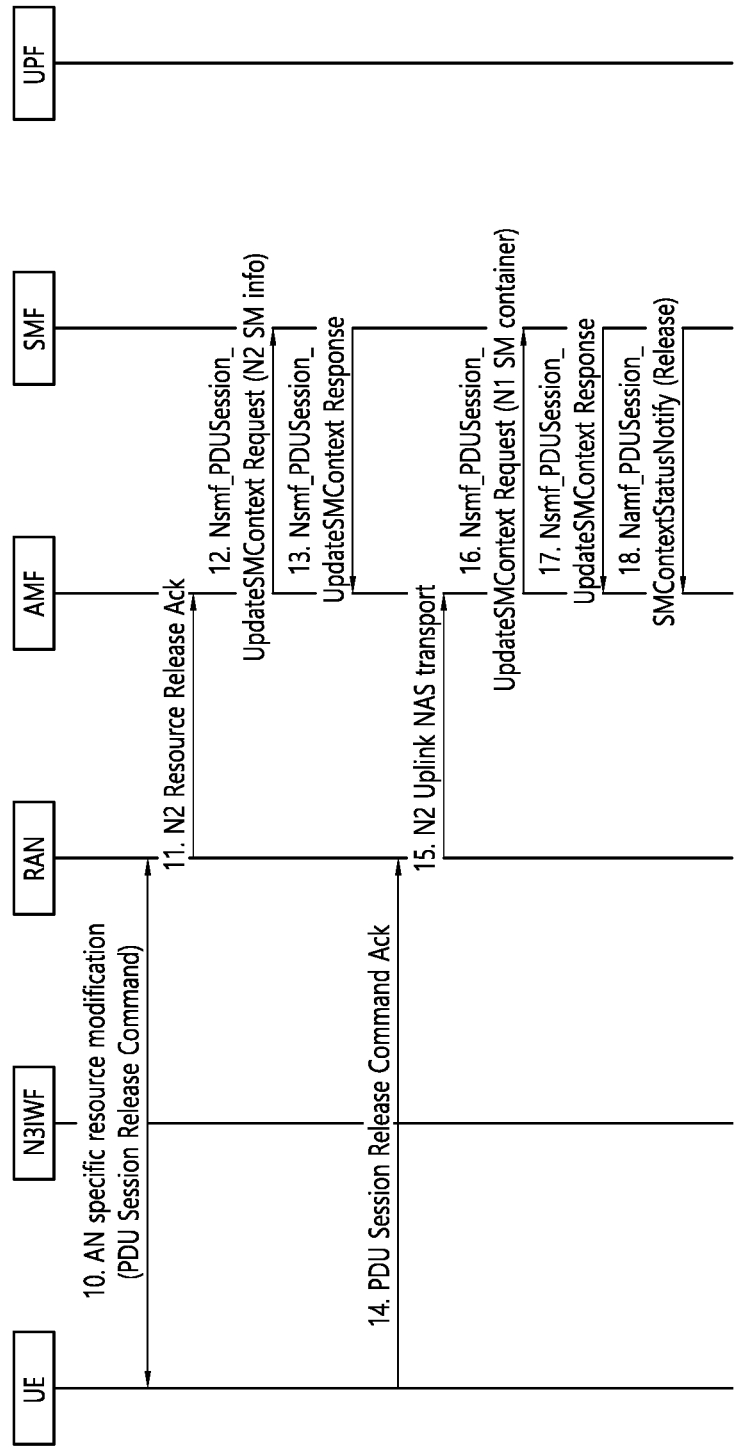

FIGS. 16A and 16B show an example of a PDU session release procedure.

1) The SMF may decide to completely release the MA PDU session. That is, the SMF may decide to release the MA PDU session for 3GPP access and non-3GPP access. In addition, the SMF may perform procedures related to UPF and N4 session release. For example, the SMF may transmit an N4 session release request message to the UPF. Then, the UPF may send an N4 session release response to the SMF.

2-7) The SMF may decide to first perform the N2 release related operation of the MA PDU session for non-3GPP access. At this time, the SMF does not send a NAS message to non-3GPP access, performs only an N2 release-related operation, and may transmit only an N2 release-related message.

For example, the SMF may transmit an N2 release related message to the AMF. Here, the N2 release related message may be transmitted through a Namf_Communication_N1N2MessageTransfer service (e.g., through a Namf_Communication_N1N2MessageTransfer message). The N2 release related message may include an N2 SM (Session Management) Resource Release Request and access type information. The access type information may include information that the access type is non-3 GPP.

When the AMF receives the N2 release related message from the SMF, the AMF may transmit an N2 resource release request message to the N3IWF. The N2 resource release request message may be, for example, an N2 resource release request.

The N3IWF may exchange information with the UE. For example, the N3IWF and the UE may delete IPsec (IP security) tunnels for the MA PDU session by performing information exchange.

The N3IWF may transmit an N2 resource release Ack to the AMF in response to the N2 resource release request message.

The AMF may transmit a PDU session update request message to the SMF in order to transmit the N2 resource release Ack to the SMF. For example, the PDU session update request message may be Nsmf_PDUSession_UpdateSMContext Request. The PDU session update request message may include N2 SM information (including N2 resource release Ack). For example, the N2 SM information may include information indicating that the N2 resource for non-3GPP access of the MA PDU session is released.

The SMF may transmit a PDU session update response message in response to the PDU session update request message. For example, the PDU session update response message may be Nsmf_PDUSession_UpdateSMContext Response.

8-17) After SMF performs N2 release-related operations for non-3GPP access, while the SMF perform N2 release-related operations for 3GPP access and transmits N2 release-related messages, the SMF may simultaneously transmitting a PDU session release command message (e.g. PDU Session Release Command) to the UE. The UE may transmit a PDU session release command Ack (e.g., PDU Session Release Command Ack) in response to the PDU session release command message.

For example, the SMF may transmit an N2 release related message to the AMF. Here, the N2 release related message may be transmitted by being included in the Namf_Communication_N1N2MessageTransfer message. The N2 release related message may include N2 SM (Session Management) Resource Release Request information. The SMF may transmit the Namf_Communication_N1N2MessageTransfer message by including the N1 SM container, and the N1 SM container may include a PDU Session Release Command message. The SMF may transmit the Namf_Communication_N1N2MessageTransfer message by including the access type information, and the access type information may include information that the access type is 3GPP.

After receiving the N2 release related message, the AMF may transmit an N2 resource release request message to the RAN. The N2 resource release request message may be, for example, an N2 Release Request. The N2 resource release request message may include an N1 SM container. The N1 SM container may include a PDU session release command message.

After receiving the N2 resource release request message, the RAN may perform an AN specific resource modification procedure with the UE. The RAN may transmit a PDU session release command message to the UE while the AN specific resource modification procedure is performed.

After performing the AN specific resource modification procedure, the RAN may transmit an N2 resource release Ack to the AMF.

After receiving the N2 resource release Ack, the AMF may transmit a PDU session update request message to the SMF. For example, the PDU session update request message may be Nsmf_PDUSession_UpdateSMContext Request. The PDU session update request message may include N2 SM information. For example, the N2 SM information may include information indicating that the N2 resource for 3GPP access of the MA PDU session is released.

The SMF may transmit a PDU session update response message in response to the PDU session update request message. For example, the PDU session update response message may be Nsmf_PDUSession_UpdateSMContext Response.

The UE may transmit a PDU Session Release Command Ack to the RAN in response to the PDU Session Release Command message. RAN may transmit N2 uplink NAS transport to AMF. For example, the N2 uplink NAS transport may include a PDU session release command Ack received from the UE.

The AMF may transmit a PDU session update request message to the SMF. For example, the PDU session update request message may be Nsmf_PDUSession_UpdateSMContext Request. The PDU session update request message may include an N1 SM container. For example, the N1 SM container may include a PDU session release command Ack.

The SMF may transmit a PDU session update response message in response to the PDU session update request message. For example, the PDU session update response message may be Nsmf_PDUSession_UpdateSMContext Response.

18) The SW' may transmit a message indicating that the MA PDU session has been released. For example, the SMF may transmit a PDU session context status notification message. For example, the PDU session context status notification message may be Namf_PDUSession_SMContextStatusNotify.

According to the procedure described with reference to FIGS. 16A and 16B, problems as the following examples may occur.

After step 4 of FIGS. 16A and 16B is performed, the UE cannot determine whether the MA PDU session is released or simply the MA PDU session is deactivated. Therefore, according to the prior art, when the Internet Key Exchange (IKE) tunnel is released, the UE may determine that the MA PDU session is deactivated. For this reason, when uplink traffic occurs in the UE, the UE may perform a procedure for activating the MA PDU session without recognizing that the PDU session release procedure is in progress. Accordingly, there is a problem that unnecessary signaling is generated.

Examples of unnecessary signaling will be described in detail with reference to steps A to D of FIGS. 17A and 17B.

Figure 17A:
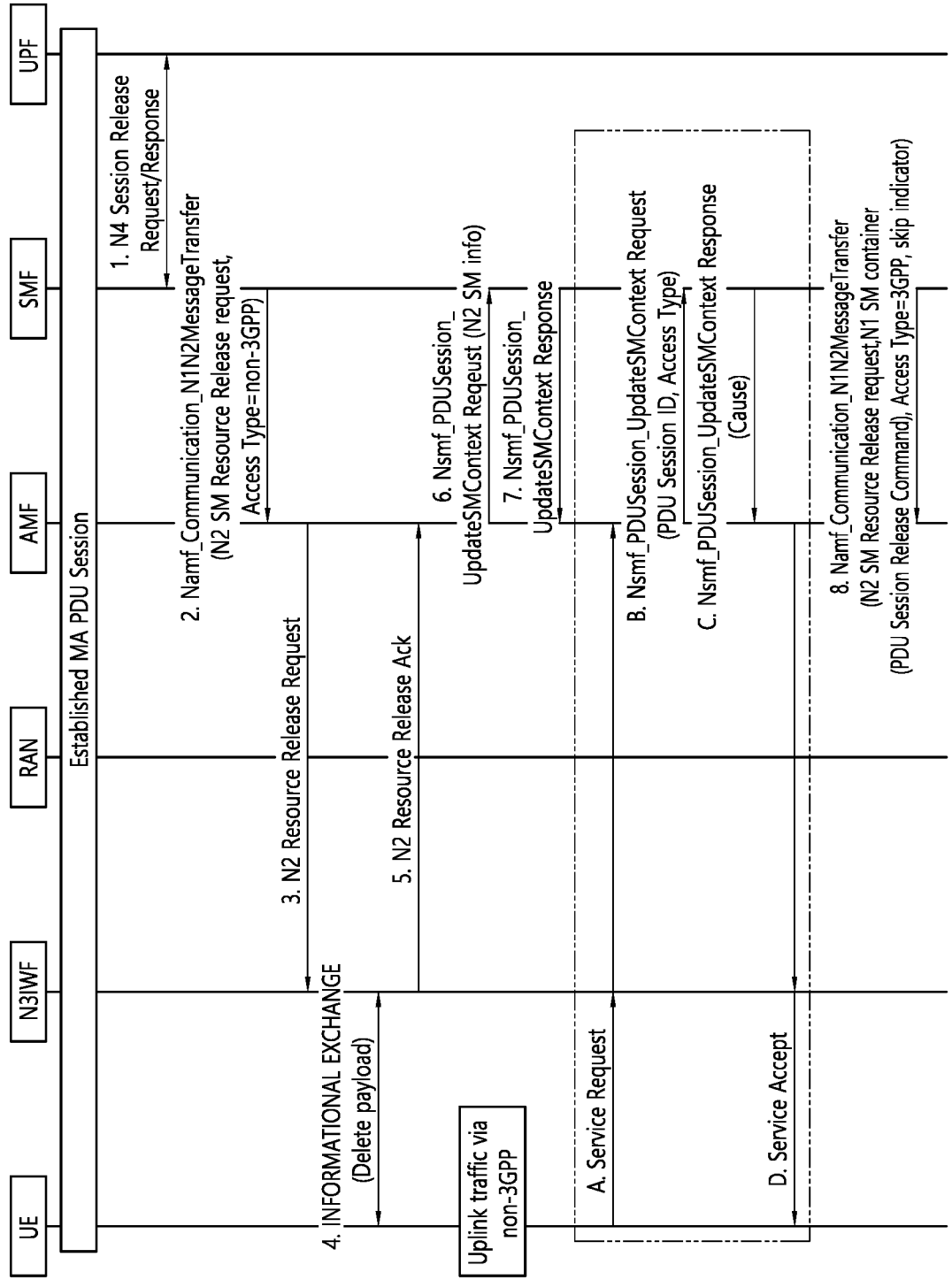
FIGS. 17a and 17b show an example of a problem situation of a PDU session release procedure.
Figure 17B:
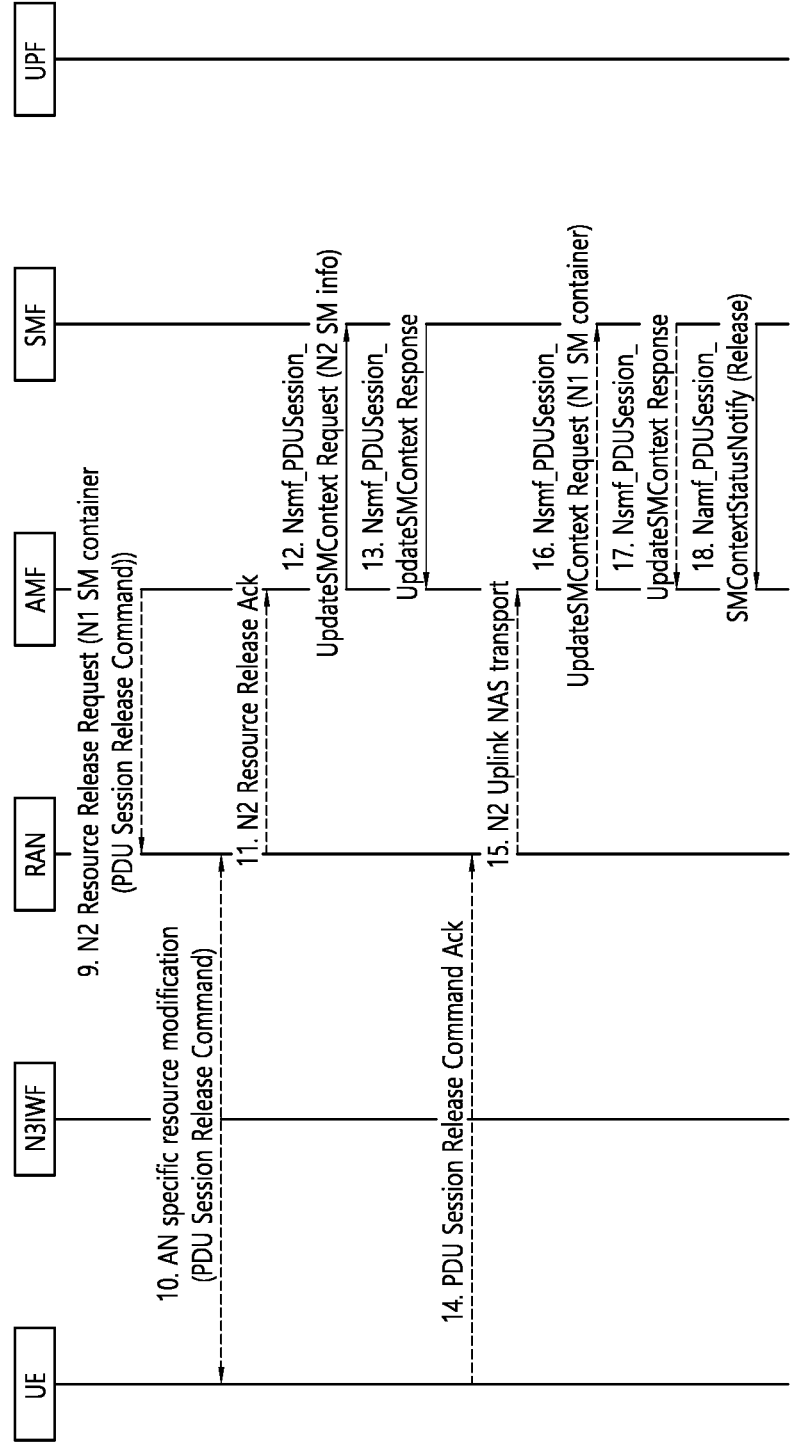

FIGS. 17A and 17B show an example of a problem situation of a PDU session release procedure.

Among the contents shown in FIGS. 17A and 17B, descriptions of contents overlapping those of FIGS. 16A and 16B will be omitted, and FIGS. 17A and 17B will be described based on the differences between FIGS. 17A and 17B and FIGS. 16A and 16B.

After step 4 is performed, the UE cannot determine whether the MA PDU session is released or simply the MA PDU session is deactivated. Therefore, according to the prior art, when the IKE tunnel is released, the UE may determine that the MA PDU session is deactivated.

A. If uplink traffic of the UE occurs after the UE determines that the MA PDU session is deactivated, the UE may perform a service request procedure through non-3GPP access to activate the MA PDU session. For example, the UE may transmit a service request message via non-3GPP access.

B. In this case, since the AMF has not yet received a notification about the release of the PDU session from the SMF (that is, this step is performed before step 18 is performed), according to the UE's request, the SMF may request PDU session activation. For example, the AMF may transmit a PDU session update request message. The PDU session update request message may be Nsmf_PDUSession_UpdateSMContext Request. The PDU session update request message may include PDU session ID information and access type information.

C. Afterwards, the SMF receives a request for activation of the PDU session from the AMF (e.g., a PDU session update request message), but since the PDU session release procedure is being performed, SMF must reject the activation request of the UE. For example, the SMF may transmit a PDU session update response message. The PDU session update response message may be Nsmf_PDUSession_UpdateSMContext Release. The PDU session update response message may include a Cause value.

D. After receiving the PDU session update response message from the SMF, the AMF may transmit a service acceptance message to the UE. The service acceptance message may include PDU session reactivation result information (e.g., activation result or PDU session reactivation result). The PDU session re-activation result information may include information on whether user plane activation succeeded or failed. When the UE receives the Service Accept message from the SMF, the UE knows that the activation requested by the UE has failed based on the PDU session re-activation result information.

In summary, since the UE cannot determine whether the MA PDU session is released or simply whether the MA PDU session is deactivated, there is a problem that unnecessary signaling (e.g., unnecessary signaling such as steps A to D) is generated as described above.

For reference, if the SMF receives a PDU session activation request according to a service request from the UE as in steps A and B while the SMF performing the procedure for releasing the MA PDU session, it is also unclear whether the SMF should stop the operation related to the PDU session release procedure, and should perform an operation (PDU session activation) for providing a service or not.

In addition, according to the prior art, the SMF should transmit a "skip indicator" to the AMF while performing an operation of releasing the PDU session. The Skip indicator is used to prevent the AMF from sending a PDU session release command message to the UE. For example, the skip indicator may be used to cause the AMF to not send a PDU session release command message to the UE when the UE is in the CM-IDLE state, and the skip indicator may be used to cause the SMF to perform a local release of the PDU session. Here, local release means releasing a PDU session as a state in which NAS signaling for PDU session release is not exchanged between the UE and network. When the SMF does not perform an operation for SSC mode 2, the SMF must transmit a "skip indicator" to the AMF. Therefore, when the UE is in CM-IDLE state in the access (e.g., 3GPP access or non-3GPP access) where the SMF sends a PDU session release command message, the AMF receives a skip indicator, so the AMF does not send the PDU session command message to the UE. For this reason, steps 9 to 11 and steps 14-17 of FIGS. 17A and 17B are not performed. If the AMF does not send a PDU session command message to the UE, the UE does not recognize that the MA PDU session has been released. That is, the UE may determine that the MA PDU session is simply deactivated.

According to the prior art, when the UE enters the CM-CONNECTED state in the CM-IDLE state, the UE performs an operation to match the sync (i.e., synchronization) of the PDU session state (session status). In this case, if the UE was in the CM-CONNECTED state in non-3GPP access, the UE may send a service request message to request activation of the MA PDU session. Then, since the UE requests activation of the locally released MA PDU session in the network (e.g., the SMF node), the AMF must perform an operation to reject the UE's service request. This causes unnecessary signaling.

III. Disclosure of the Present Specification

In the following, the operation of performing/transmitting N2 release may be interpreted as an operation of releasing/deleting the context for the PDU Session in 5G-AN (Access Network) (meaning NG-RAN in case of 3GPP access, meaning N3IWF in case of non-3GPP access), an operation of releasing/deleting a user plane for a PDU Session in 5G-AN, or an operation of releasing/deleting N3 tunnel information for a PDU Session in 5G-AN, etc. In addition, the operation associated with the N2 release of 5G-AN may include interaction with the UE.

The disclosures described below in this specification may be implemented in one or more combinations. Each of the drawings shows an embodiment of each disclosure, but the embodiments of the drawings may be implemented in combination with each other.

Hereinafter, examples for clearly defining a procedure for managing the MA PDU session will be described in detail. For example, operations performed by a UE, an AMF node, an SMF node, etc. for performing a procedure for managing a MA PDU session will be clearly described. As an example, what operations may be performed to release the MA PDU session will be described. As another example, if the MA PDU session is deactivated for at least one access, what operations may be performed to re-activate the MA PDU session will be described. As another example, when the user plane resource for one access is released after the MA PDU session is established in both accesses, what operations can be performed to add the user plane resource of the MA PDU session will be described. As another example, an operation for synchronizing the PDU session state of the MA PDU session between the UE and the network node (e.g., AMF, SMF, etc.) will be described. In addition to the above-described examples, various operations for performing a procedure for managing a MA PDU session will be described.

Various methods of the disclosure of the present specification to be described below (e.g., methods described in the first example, the second example) may be implemented in combination of one or more.

1. First example of the disclosure of the present specification

When the SMF performs the PDU session release procedure, the SMF may first determine through which access to transmit the N1 message to the UE. For example, when performing a PDU session release procedure for the MA PDU session, the SMF may decide to transmit an N1 message (e.g., a PDU session release command message) to the UE through 3GPP access or non-3GPP access.

The SMF may determine through which access to transmit the N1 message based on an operator policy or a local configuration. Alternatively, the SMF may determine through which access to transmit the N1 message based on information (e.g., information about the UE) that the SMF knows. For example, the information about the UE may include UE state information (CM-IDLE state/CM-CONNECTED state) obtained through a mobility event subscription, whether or not a user plane setup is performed.

The SMF may determine through which access to transmit the N1 message to the UE based on at least one of operator policy, local configuration, and/or information about the UE.

The SMF may request to simultaneously transmit the N1 message and the N2 Release related message through the access (e.g., 3GPP access or non-3GPP access) that has decided to transmit the N1 message. Hereinafter, the operation of the SMF will be described focusing on an example in which the SMF decides to send an N1 message through 3GPP access, but this is only an example. Even when the SMF decides to send the N1 message through non-3GPP access, the operation of the SMF may be performed in the same manner as in the example below.

For example, if the SMF decides to send the N1 message through 3GPP access, the SMF may request to simultaneously transmit the N1 message and the N2 Release with 3GPP access through the Namf_Communication_N1N2MessageTransfer service. For example, the SMF may simultaneously transmit an N1 message and an N2 Release related message through the Namf_Communication_N1N2MessageTransfer service.

When the SMF simultaneously transmits an N1 message (including a PDU session release command message) and an N2 Release related message, the user plane for 3GPP access of the MA PDU session is released, and at the same time, the UE may receive a PDU session release command message. Upon receiving the PDU session release command message, the UE determines that the MA PDU session is released even if the user plane of non-3GPP access to the corresponding MA PDU session is alive (i.e., not released).

After transmitting the N1 message and the N2 Release related message at the same time, the SMF may perform a procedure for releasing the user plane of non-3GPP access.

As an example, the UE may send a PDU session release command Ack to the SMF in response to the PDU session release command message. After receiving the PDU session release command Ack from the UE, the SMF may perform a procedure of releasing the user plane of the non-3GPP access by performing N2 Release for the non-3GPP access. For example, the SMF may perform a procedure for releasing the user plane of the non-3GPP access by transmitting an N2 Release related message to the non-3GPP access through the Namf_Communication_N1N2MessageTransfer service.

As another example, unlike the above example, the SMF may perform N2 Release for non-3GPP access before receiving the PDU session release command Ack from the UE. For example, the SMF may perform N2 Release at any point in time from when the N1 message and the N2 related message are transmitted until the time when the PDU session release command Ack is received from the UE.

After the SMF receives the PDU session release command Ack from the UE, an operation in which the SMF performs N2 Release for non-3GPP access may be preferred.

An example summarizing the operation of the above-described SMF is as follows. The following content is merely an example, and the SMF may perform the operations described in this specification in addition to the operations described in items 1) to 4) below.

1) The SMF may determine/initiate release of the MA PDU session. For example, the SMF may decide to release the MA PDU session and initiate a procedure for releasing the MA PDU session. The SMF may select/determine the first access to perform/transmit N2 Release first among 3GPP access and non-3GPP access. For example, the SMF may select or determine the first access for performing an N2 Release-related procedure (e.g., N2 Release-related message transmission) first among 3GPP access and non-3GPP access. The SMF will transmit a request message simultaneously including an N1 message to be transmitted to the UE through the first access to perform/transmit N2 Release first and an N2 Release related message to be transmitted to the first access. Accordingly, the operation of the SMF selecting/determining the first access may also be interpreted as the SMF selecting/determining the access to transmit the N1 message to the UE.

2) The SMF may transmit a request message simultaneously including an N1 message to be transmitted to the UE and an N2 Release related message to be transmitted to the first access to the AMF. Here, the N1 message may include a PDU session release command message. The request message including the N1 message and the N2 Release related message may be, for example, a Namf_Communication_N1N2MessageTransfer message. When the SMF transmits a request message including an N1 message and an N2 Release related message to the AMF, the SMF may also transmit information on the first access to the AMF.

3) The SMF may receive a response message with respect to the N1 message from the UE. For example, the SMF may receive a PDU session release command Ack message in response to the PDU session release command message from the UE.

4) The SMF may transmit a request message including an N2 Release related message to the AMF through the second access (e.g., access other than the first access among 3GPP access and non-3GPP access). The request message including the N2 Release related message may be a Namf_Communication_N1N2MessageTransfer message. When the SMF transmits a request message including an N2 Release related message, information on the second access may also be transmitted to the AMF.

When the SMF requests to simultaneously transmit an N1 message and an N2 Release related message using the Namf_Communication_N1N2MessageTransfer service, if the PDU session to be released by the SMF is an MA PDU session, the SMF may not transmit the skip indicator. For example, the SMF may transmit the message without including the skip indicator in the Namf_Communication_N1N2MessageTransfer message. When the AMF receives the skip indicator, the AMF does not transmit the N1 message to the UE if the UE is in CM-IDLE state. Since the SMF does not transmit a skip indicator to the AMF, the AMF may transmit an N1 message after switching the UE to the CM-CONNECTED state by performing a paging procedure for the UE when the UE is in the CM-IDLE state. Therefore, the UE can always be aware of the PDU session release for the MA PDU session. That is, even if the UE is in the CM-IDLE state, since the AMF transmits the N1 message to the UE after performing the paging procedure for the UE, the UE may always receive the N1 message.

On the other hand, AMF has a problem in that when the UE is in the CM-IDLE state in the non-3GPP access, the AMF cannot transmit the N1 message via non-3GPP access. In this case, since the AMF cannot transmit the N1 message with the access type determined by the SMF, the AMF may transmit the N1 message to the UE through another access (i.e., 3GPP access). The SMF may transmit information for instructing the AMF to transmit the N1 message via 3GPP access (this information may be transmitted by being included in the Namf_Communication_N1N2MessageTransfer message).

If the UE is registered with only one access (3GPP access or non-3GPP access) for the MA PDU session, if the SMF does not send a skip indicator to the AMF, the AMF always performs paging for the UE to perform the PDU session release procedure. If the UE is registered for only one access and has an MA PDU session, the SMF may not need to send the N1 message notifying the UE to release the PDU session. This is because the case in which the UE is registered only for one access and has an MA PDU session is similar to the case in which the UE has a general PDU session rather than an MA PDU session.

In this case, in order to prevent unnecessary signaling to the UE, the SMF may transmit a skip indicator when performing a release procedure for the MA PDU session. For example, the SMF may transmit a skip indicator when recognizing that the UE is registered for only one access for the MA PDU session. Examples of a case in which the SMF recognizes that the UE is registered with only one access for the MA PDU session are as follows. For example, i) a case that the SMF receives information (e.g., indication), indicating that the UE is deregistered in one access after the UE is using the user plane through both accesses for the MA PDU session, from the AMF, ii) a case the UE is in a state registered only from one access (e.g. 3GPP access), during the process of establishing the MA PDU session, the AMF did not inform the SMF that the UE is registered for both accesses, and then SMF did not receive a PDU session establishment request requesting MA PDU session establishment from the UE through the other access (e.g., non-3GPP access), etc., the SMF may recognize that the UE is registered with only one access for the MA PDU session.

2. Second example of the disclosure of the present specification

Hereinafter, an example of an operation performed when the UE intends to activate the MA PDU session or when the UE intends to add a user plane resource of the MA PDU session will be described. Also, an operation for synchronizing the state of the MA PDU session recognized by the UE and the state of the MA PDU session recognized by the network node (e.g., AMF node, SMF node, etc.) will be described.

First, an operation performed when the UE intends to activate the MA PDU session will be described. The UE may activate the MA PDU session through a service request message or a registration request message.

When the UE requests activation of a user plane resource of a single access PDU session (i.e., a PDU session other than a MA PDU session), the UE may transmit a service request message or a registration request message to the AMF node through the access associated with that PDU session. At this time, in order to indicate the PDU session(s) associated with the access type (3GPP access or non-3GPP access) to which message is transmitted, the UE may a list of PDU sessions to be activated (List Of PDU Sessions To Be Activated) in the service request message or the registration request message. For example, a PDU session associated with 3GPP access may be activated when a service request message is transmitted through 3GPP access.

On the other hand, for the MA PDU session, after the MA PDU session is successfully established through 3GPP access and non-3GPP access, it is not clearly defined how the network operation should be performed, when the UE will indicates user plane activation in the list of PDU sessions to be activated (List Of PDU Sessions To Be Activated). For example, the UE may transmit a service request message or registration request message including a list of PDU Sessions To Be Activated to the AMF node through one access (3GPP access or non-3GPP access). In this case, it is unclear whether the AMF node should perform the operation of activating the user plane resource of one access or the operation of activating the user plane resource of both accesses for the corresponding MA PDU session.

There may be two options for performing a network operation as follows.

Option 1: Network performs an operation to activate both user plane resources of two access networks (3GPP access and non-3GPP access)

Option 2: The network performs an operation of activating all the user plane resources of one access network (3GPP access or non-3GPP access) in which the service request message or registration request message is received (for example, when the UE wants to activate the user plane of the one access network, the UE may transmit a service request message or a registration request message through the one access network. Then, the network may perform an operation of activating all of the user plane resources for the one access network in which the service request message or the registration request message is received.)

According to Option 1, when the network activates the user plane resources of both access networks, if the UE is in the CM-IDLE state, the AMF node needs to perform the operation of paging the UE.

For example, if the UE is in CM-IDLE state in 3GPP access, and the UE requests activation of the user plane resource of the MA PDU session through non-3GPP access, the AMF needs to page the UE to set up the user plane resource of 3GPP access.

Similarly, if the UE is in the CM-IDLE state in non-3GPP access, and if the UE requests activation of the user plane resource of the MA PDU session through 3GPP access, the SMF transmits an N2 setup request message (e.g. N2 resource setup request message) to the N3IWF through AMF. On the other hand, the N2 setup request message cannot be processed by the AMF. Specifically, when the UE is in the CM-IDLE state in non-3GPP access, the UE is out of coverage of the 3GPP access network (e.g., WLAN). Therefore, the N2 setup request message cannot be processed by the AMF. And, since the paging procedure is not supported in the non-3GPP access unlike the 3GPP access, the N2 setup request message cannot be processed by the AMF. The SMF may transmit the N2 setup request message to the N3IWF even though the N2 setup request message cannot be processed by the AMF. Accordingly, when network nodes operate according to Option 1, unnecessary signaling may increase. For example, when the UE is in the CM-IDLE state in access other than the access in which the UE requested activation of the user plane resource as in the above example, unnecessary signaling may increase.

In summary, when the UE requests activation of the MA PDU session, if the network activates the user plane for both accesses (Option 1), unnecessary signaling may be increased depending on the state of the UE (e.g., CM-IDLE state).

In addition, the AMF provides a PDU Session Reactivation Result in a service accept message or a registration accept message transmitted to the UE to indicate whether the user plane has been successfully reactivated. For example, if a UE-initiated Service Request is used to activate the user plane resources of both access networks, the AMF needs to provide the UE with the re-activation result of both accesses of the MA PDU session. However, the current PDU Session Reactivation Result consists of 1 bit per PDU session. AMF cannot provide a re-activation result for each of the two accesses as a PDU Session Reactivation Result composed of 1 bit. In order to provide a reactivation result for both accesses of the MA PDU session, the coding of the PDU Session Reactivation Result should be changed.

In summary, when the UE requests activation of the MA PDU session, if the network activates the user plane for both accesses (Option 1), the protocol design of the UE must be changed. For example, the coding of the PDU Session Reactivation Result transmitted by the AMF to the UE should be changed.

As described above, since unnecessary signaling may be increased depending on the state of the UE, and the protocol design of the UE may be changed according to Option 1, a network operation according to Option 2 is proposed. In other words, the network may perform an operation of activating all user plane resources of one access network (3GPP access or non-3GPP access) from which the service request message or registration request message is received. The network operation according to Option 2 may be performed in a similar manner to the network operation related to a single access PDU session.

In other words, when the UE requests activation of the user plane resource of the MA PDU session by using the registration request message or the service request message, the network performs the operation of activating the user plane resource of the access for which the registration request message or service request message is received.

An operation for performing MA PDU session synchronization, performed by the UE and the network, will be described. For example, the UE and the network may perform an operation of synchronizing the PDU session state of the MA PDU session.

When the UE is in the CM-CONNECTED state, the UE and the network may exchange PDU session status information (e.g., PDU Session Status) in order to synchronize the PDU session(s) that are locally released. Similar to the (List Of PDU Sessions To Be Activated, the UE may transmit the PDU session status information of the access to which the registration request message is transmitted by including the PDU session status information in the service request message or registration request message.

The following two options are options of information included in the PDU session status information transmitted by the UE.

Option 1: PDU session status information indicates the status of the MA PDU session. That is, the PDU session status information indicates the PDU session state for both accesses of the MA PDU session.

Option 2: PDU session status information indicates the access state of each access of the MA PDU session. That is, the PDU session status information indicates both the access state of the 3GPP access of the MA PDU session and the access state of the non-3GPP access.

In the case of Option 1, the PDU session status information may indicate whether the MA PDU session is completely released for both accesses. In this case, the UE may not be notified of the release of one access of the MA PDU session. This is because the network transmits information about the local release of the MA PDU session to the UE only when the MA PDU session is completely released for both accesses. For example, if the network locally releases the MA PDU session for non-3GPP access, the UE does not know that the MA PDU session is established for single access, so a service request message or a registration request message can be transmitted to reactivate the user plane. However, since the MA PDU session is established only through single access (e.g., 3GPP access), the SMF may reject the service request message or registration request message transmitted by the UE.

To solve this problem, the SMF may not set a "skip indicator" when releasing the MA PDU session through single access. For example, the SMF may not transmit a "skip indicator" to the AMF so that the UE may know that the MA PDU session has been released for one access even when releasing the MA PDU session for one access.

In the case of Option 2, the PDU session status information may indicate information on whether the MA PDU session has been released for a specific access while the PDU session is still available for the other access.

In this case, if the UE was in the CM-IDLE state for both accesses and then became to be in the CM-CONNECTED state for one access, the UE cannot distinguish whether the MA PDU session is completely released for both accesses or only for a specific access. Therefore, the UE cannot determine the request type. For example, the UE cannot determine which one of "initial request" or "existing PDU session" should be used as the request type. The request type may be transmitted while being included in a PDU session establishment request message transmitted by the UE. To solve this problem, the SMF may not set the "skip indicator" when completely releasing the MA PDU session for both accesses.

In summary, both the operation according to Option 1 and Option 2 may affect the operation according to the PDU session release procedure. For example, the operation according to Option 1 and Option 2 may affect the condition including "skip indicator".

According to Option 2, for example, when the network provides PDU session status information per access to the UE, the AMF needs to memorize the session state of each access of the MA PDU session. Since this does not coincide with the conventional MM/SM separation, it affects the operation performed by the AMF.

In other words, Option 2 affects the operation of AMF. For example, the AMF needs to remember the state of the MA PDU session in each access network.

In summary, since Option 1 has less effect on AMF than Option 2, network operation according to Option 1 is proposed.

The PDU session status information may indicate the state of the MA PDU session. If there is a mismatch of the PDU session state information, the UE and the network node completely release the MA PDU session for both accesses.

As an example, when the UE receives PDU session status information from the network node, and the received PDU session status information and the state of the MA PDU session known to the UE do not match, the MA PDU session may be released for both accesses. As another example, when a network node (e.g., AMF or SMF) receives PDU session status information from the UE, and the received PDU session status information and the state of the MA PDU session known to the network node do not match, the network node may release the MA PDU session for both accesses.

When the SMF releases the MA PDU session through one access, the SMF may not transmit a "skip indicator" to the AMF. The SMF may transmit a PDU session release message through a target access (e.g., an access to release the MA PDU session). For example, the target access is the access to which the PDU session release procedure for the MA PDU session is applied.

3. Specific procedure description to which the first example and/or the second example of the disclosure of the present specification is applied Hereinafter, examples to which the contents described in the first and/or second examples of the disclosure of the present specification are applied will be described in detail. Here, the first example and/or the second example may mean an example to which the contents described in the first example are applied, an example to which the contents described in the second example are applied, and an example to which both the contents described in the first example and the second example are applied.

First, the registration procedure, the service request procedure, and the adding/re-activating User-Plane Resources based on the description of the first example and/or the second example of the disclosure of the present specification will be explained in detail.

The UE may include a List Of PDU Sessions To Be Activate) and PDU session status information in a service request message or a registration request message. Since the MA PDU session is established through both accesses, the operation performed by the UE and the network is unclear, when the UE transmits these IEs (Information Elements) (e.g., List Of PDU Sessions To Be Activated, PDU session state information, etc.) in a service request message or the registration request message.

As described above, the following may be applied to the procedure for managing the MA PDU session. 1) If the UE indicates activation in the List Of PDU Sessions To Be Activated, the network may activate the user plane of the access in which the service request message or registration request message is received. 2) PDU session status information may indicate the state of the MA PDU session. The UE and the network may completely release the MA PDU session for both accesses if there is a mismatch. The SMF may not transmit a "skip indicator" when releasing the MA PDU session through single access.

In reflection of the above description, the contents of the registration procedure and the service request procedure may be added to the ATSSS. If the contents of the registration procedure and service request procedure are not added for ATSSS, it may become unclear that when and how the UE and the network may handle the List Of PDU Sessions To Be Activated in the registration request message and the service request message and the PDU session status IE.

Examples of the registration procedure and service request procedure added for ATSSS are as follows.

1) Registration procedures

A signaling flow of the registration procedure related to the MA PDU session may be a signal flow in which the following description is applied to the examples of the registration procedure shown in FIGS. 7A and 7B. For example, the following differences and clarifications may be applied to the example of the registration procedure shown in FIGS. 7A and 7B:

In step 1 of FIGS. 7A and 7B, when the UE wants to re-activate a specific access (e.g., 3GPP access or non-3GPP access) MA PDU session, the UE may transmit a registration request message to the AMF through the specific access. Then, the MA PDU session may be re-activated for that specific access. For example, a network node (e.g., AMF, SMF, etc.) that has received the registration request message may perform a procedure for re-activating the MA PDU session for the specific access. When the UE wants to re-activate the MA PDU session for access on which a registration request message is transmitted, the UE may indicate the PDU session ID of the corresponding MA PDU session in the List Of PDU Sessions To Be Activated. For example, the registration request message may include a List Of PDU Sessions To Be Activated, and the List Of PDU Sessions To Be Activated may include the PDU session ID of the MA PDU session.

The UE may transmit a registration request message to the RAN or N3IWF through the specific access (e.g., 3GPP access or non-3GPP access). Then, the RAN or N3IWF may send a registration request message to the AMF. When the AMF receives the registration request message through the specific access, the AMF may know that the MA PDU session should be re-activated for the specific access. The AMF may transmit information that re-activation is required for a specific MA PDU session requested by the UE and information on the specific access (access for which the registration request message is received) to the SMF. Then, the SMF may transmit an N2 SM resource setup request message for re-activating the MA PDU session for the specific access to the AMF based on the registration request message and the information about the specific access. Then, the AMF may re-activate the MA PDU session for the specific access by transmitting an N2 SM resource setup request message to the RAN or N3IWF through the specific access.

If the UE locally releases the MA PDU session for both accesses, the UE may indicate this in the PDU session status information. For example, the PDU session status information may include information that the UE has locally released the MA PDU session for both accesses. When the AMF receives the PDU Session status information (which may include information that the UE has locally released the MA PDU session for both accesses), the AMF may invoke the PDU session release related service, in order to release the network resources associated with the MA PDU session. For example, the AMF may transmit a message related to PDU session release to the SMF by using invokes Nsmf_PDUSession_ReleaseSMContext service.

In step 22 of FIGS. 7A and 7B, the AMF may transmit the registration accept message to the UE by including the PDU session status information in the registration accept message. The PDU session status information transmitted by the AMF may include information informing that the MA PDU session has been released. The UE may locally remove internal resources associated with MA PDU sessions that are not marked as "established".

2) Service Request procedures

A signaling flow of the service request procedure related to the MA PDU session may be a signal flow in which the following description is applied to the example of the service request procedure shown in FIGS. 8a to 8c. For example, the following differences and clarifications may be applied to the example of the registration procedure shown in FIGS. 8A-8C:

In step 1 of FIGS. 8A to 8C, when the UE wants to re-activate a specific access (e.g., 3GPP access or non-3GPP access) MA PDU session, the UE may transmit a service request message through the specific access. Then, the MA PDU session can be re-activated for that specific access. For example, a network node (e.g., AMF, SMF, etc.) that has received the service request message may perform a procedure for re-activating the MA PDU session for the specific access. When the UE wants to re-activate the MA PDU session for access transmitting a service request message, the UE may indicate the PDU session ID of the corresponding MA PDU session in the List Of PDU Sessions To Be Activated. For example, the service request message may include a List Of PDU Sessions To Be Activated, and the List Of PDU Sessions To Be Activated may include a PDU session ID of the MA PDU session.

The UE may send a service request message to the RAN or N3IWF through the specific access (e.g., 3GPP access or non-3GPP access). Then, the RAN or N3IWF may send a service request message to the AMF. When the AMF receives the service request message through the specific access, the AMF may know that the MA PDU session should be re-activated for the specific access. The AMF may transmit information that re-activation is required for a specific MA PDU session requested by the service terminal and information about the specific access (access for which the service request message is received) to the SMF. Then, the SMF may transmit an N2 SM resource setup request message for re-activating the MA PDU session for the specific access to the AMF based on the service request message and the information about the specific access. Then, the AMF may re-activate the MA PDU session for the specific access by transmitting an N2 SM resource setup request message to the RAN or N3IWF through the specific access.

If the UE locally releases the MA PDU session for both accesses, the UE may indicate this in the PDU session status information (PDU Session status). For example, the PDU session status information (PDU Session status) may include information that the UE has locally released the MA PDU session for both accesses. When the AMF receives the PDU Session status information (which may include information that the UE has locally released the MA PDU session for both accesses), the AMF may invoke the PDU session release related service, in order to release the network resources associated with the MA PDU session. For example, the AMF may transmit a message related to PDU session release to the SMF by using the Nsmf_PDUSession_ReleaseSMContext service.

In step 11 of FIGS. 8A to 8C, the SMF may transmit an Nsmf_PDUSession_UpdateSMContext Response message (including N2 SM information) through the access from which the service request message is received.

In step 12 of FIGS. 8A to 8C, the AMF may transmit the service accept message to the UE by including the PDU session status information in the service acceptance message. The PDU session status information transmitted by the AMF may include information indicating that the MA PDU session has been released. The UE may locally remove internal resources associated with MA PDU sessions that are not marked as "established".

3) Adding/Re-activating of User-Plane Resources

When the UE establishes the MA PDU session, but user-plane resources are not established for one access (e.g., 3GPP access or non-3GPP access) of the MA PDU session, the following operations may be performed:

If the UE wants to add a user-plane through the one access, the UE may initiate a UE Requested PDU Session Establishment procedure through the one access. An example of a UE request PDU session establishment procedure is shown in FIGS. 9A and 9B. The UE may transmit a PDU session establishment request message. Here, the PDU session establishment request message may include a "MA PDU Request" indication and a PDU session ID of the established MA PDU session. The PDU session establishment request message may also include request type information indicating "Existing PDU Session".

The PDU session establishment accept message received by the UE may include an updated ATSSS rule for the MA PDU session.

When the UE has established a MA PDU session, the user-plane is established through one access of the MA PDU session, but the user-plane is currently in inactive state (e.g., when the UE is in the CM-IDLE state for the one access), the following actions may be performed:

When the UE wants to re-activate a user-plane resource through the one access, the UE may initiate a registration procedure or a UE initiated service request procedure through the one access. For example, the registration procedure may be as in the examples of FIGS. 7A and 7B, and the UE initiated service request procedure may be as in the examples of FIGS. 8A through 8C. For example, when the UE wants to re-activate a user-plane resource through the one access, the UE may transmit a registration request message or a service request message through the one access. That is, the UE may transmit a service request message or a registration request message to the RAN or N3IWF through the one access (e.g., 3GPP access or non-3GPP access). Then, the RAN or the N3IWF may transmit a service request message or a registration request message to the AMF. When the AMF receives a service request message or a registration request message through the specific access, the AMF may know that the MA PDU session should be re-activated for the specific access. The AMF may transmit a service request message or a registration request message and information about the specific access (access for which the service request message is received) to the SMF. Then, the SMF may send an N2 SM resource setup request message for re-activating the MA PDU session for the specific access to the AMF based on the service request message or the registration request message and the information on the specific access. Then, the AMF may re-activate the MA PDU session for the specific access by transmitting an N2 SM resource setup request message to the RAN or N3IWF through the specific access.

Hereinafter, the MA PDU session release procedure according to the first example and/or the second example of the disclosure of the present specification will be described in detail.

Hereinafter, an example of the PDU session release procedure of the MA PDU session will be described in detail. Based on the following description, a UE requested MA PDU session release procedure and a network requested MA PDU session release procedure may be added. If the PDU session release procedure of the MA PDU session is not added, the UE and the network cannot perform an operation related to the PDU session release procedure for the MA PDU session.

The MA PDU session release procedure may be used in the following cases:

Partial release: when a specific access network (one of the two accesses) of the MA PDU session is released Complete release: when the MA PDU session is completely released (e.g., when both accesses of the MA PDU session are released)

The above-described partial release may be triggered, for example, when the UE is deregistered for one access or when the S-NSSAI of the MA PDU session is not included in the NSSAI allowed for the one access.

<UE or network request MA PDU session release procedure (non-roaming and roaming with local breakout)>

The signal flow of the MA PDU session release procedure may be a signal flow in which the following description is applied to the example of the PDU session release procedure shown in FIGS. 11A and 11B. For example, when the UE is not roaming, or when the UE is roaming and the PDU Session Anchor (PSA) is located in the VPLMN, the signal flow of the MA PDU session release procedure may be a signal flow in which the following differences and clarifications are applied to the examples of the PDU session release procedure shown in FIGS. 11A and 11B:

- In step 1 (e.g., step 1a, 1d, or 1f) of FIGS. 11*a* and 11*b*, when the AMF needs to release the MA PDU session through a single access (non-3GPP access or 3GPP access), the AMF may transmit a message associated with the PDU session update in order to request partial (for specific access) release of the MA PDU session. For example, the AMF may transmit a PDU session release request message to the SMF by using the Nsmf_PDUSession_UpdateSMContext service operation. The AMF may transmit an Nsmf_PDUSession_UpdateSMContext message (including a PDU session release request message) to the SMF. In this case, the AMF may include information on which access the MA PDU session should be released for in the message associated with the PDU session update.

Note: When the SMF receives a PDU session release request message from the AMF, the SMF may determine whether to completely release or partially release the MA PDU session based on its local policy.

- In step 1 (e.g., step 1c) of FIGS. 11*a* and 11*b*, when the AMF needs to completely release the MA PDU session (for both non-3GPP access and 3GPP access) (e.g., when the MA PDU session is locally released during the UE is in the CM-IDLE state, the AMF may transmit a PDU session release related message to the SMF in order to request the complete release of the MA PDU session. For example, the AMF may transmit a PDU session release request message to the SMF by using the Nsmf_PDUSession_ReleaseSMContext service operation. The AMF may transmit the PDU session release request message to the SMF by including the PDU session release request message in the Nsmf_PDUSession_ReleaseSMContext message.
- In step 1 (e.g., step 1a, step 1e) of FIGS. 11*a* and 11*b*, when the UE or SMF initiates the MA PDU session release procedure, the UE or the SMF may include Access type information (e.g., 3GPP, non-3GPP, or both accesses) for the access that the UE or SMF wants to release in the PDU session release request message or PDU session release command message.
- In step 3 (e.g., step 3b) of FIGS. 11*a* and 11*b*, when the SMF releases the MA PDU session for a single access network (3GPP access or non-3GPP access), the SMF may not transmit "skip indicator" to the AMF. For example, when the SMF transmits a message related to the release of the MA PDU session to the AMF by using the Namf_Communication_N1N2MessageTransfer service, the SMF may not include "skip indicator" in the message related to the release of the MA PDU session. For example, the Namf_Communication_N1N2MessageTransfer message may not include a "skip indicator".
- In step 3 (e.g., any of steps 3a to 3b) of FIGS. 11*a* and 11*b*, when the SMF releases the MA PDU session for both accesses, and a user plane resource is established within both accesses, the SMF may transmit the N1 SM container and the N2 SM resource release request message together through one access to the AMF. Here, the N1 SM container may include a PDU session release command message. For example, the SMF may include both the N1 SM container and the N2 SM resource release request message in the Nsmf_PDUSession_UpdateSMContext message or the Namf_Communication_N1N2MessageTransfer message. Then, the UE may not request activation of the user plane resource. Specifically, when the UE receives the PDU session release command message included in the N1 SM container, since the UE recognizes that the release procedure for the corresponding MA PDU session is in progress, even if the UE recognizes that uplink traffic for the corresponding MA PDU session occurs, the UE may not request user plane resource activation. By transmitting the N2 SM resource release request message through the other access, the SMF may release the user plane resource of the other access (access that is not an access in which both the N1 SM container and the N2 SM resource release request message are transmitted). For example, the SMF may release the user plane of the other access by transmitting a Namf_Communication_N1N2MessageTransfer message (including the N2 SM resource release request message, but not the N1 SM container) through another access.
- In step 3 (e.g., step 3b) of FIGS. 11A and 11B, when the SMF provides the N1 SM container and/or N2 SM information to the AMF, the SMF may include information about the access type within a Namf_Communication_N1N2MessageTransfer message, in order to provide routing information.
- In step 11 of FIGS. 11A and 11B, the SMF may trigger a PDU session context status notification service (e.g., Nsmf_PDUSession_SMContextStatusNotify service) when the MA PDU session is completely released for both accesses. For example, the SMF may transmit a PDU session context status notification message to the AMF when the MA PDU session is completely released for both accesses.

<UE or Network Request MA PDU Session Release Procedure (Home-Routed Roaming)>

The signal flow of the MA PDU session release procedure may be a signal flow in which the following description is applied to the examples of the PDU session release procedure shown in FIGS. 12A and 12B. For example, the signal flow of the MA PDU session release procedure, for a case such as when the UE is roaming and the PSA is located in the HPLMN, may be a signal flow in which the following differences and clarifications are applied to the examples of the PDU session release procedure shown in FIGS. 12A and 12B:

- In step 1 (e.g., step 1a or step 1d) of FIGS. 12*a* and 12*b*, when the AMF needs to release the MA PDU session through single access (non-3GPP access or 3GPP access), the AMF may transmit a message associated with the PDU session update, in order to request the partial release of the MA PDU session. For example, the AMF may transmit a PDU session release request message to the V-SMF by using the Nsmf_PDUSession_UpdateSMContext service operation. The AMF may transmit an Nsmf_PDUSession_UpdateSMContext message (including a PDU session release request message) to the V-SMF. In this case, the AMF may include information on which access the MA PDU session should be released for in the message associated with the PDU session update. Then, the V-SMF may transmit a PDU session update related message to the H-SMF to request partial release of the MA PDU session. The PDU session update related message may include a PDU session release request message. For example, the V-SMF may request the H-SMF to partially release the MA PDU session by using the Nsmf_PDUSession_Update service operation. The V-SMF may include information on which access the MA PDU session should be released for in the PDU session update related message transmitted to the H-SMF.

Note: When the H-SMF receives a PDU session release request from the V-SMF, the H-SMF may decide whether to completely release or partially release the MA PDU session based on its local policy.

In step 1 (e.g., step 1b) of FIGS. 12a and 12b, when the AMF needs to completely release the MA PDU session (for both non-3GPP access and 3GPP access) (e.g., when the MA PDU session is locally released when the UE is in the CM-IDLE state), the AMF may transmit a PDU session release related message to the V-SMF to request the complete release of the MA PDU session. For example, the AMF may transmit a PDU session release request message to the V-SMF by using the Nsmf_PDUSession_ReleaseSMContext service operation. The AMF may transmit the PDU session release request message to the V-SMF by including the PDU session release request message in the Nsmf_PDUSession_ReleaseSMContext message. The V-SMF may transmit a message related to PDU session release to the H-SMF to request complete release of the MA PDU session. For example, the V-SMF may transmit a PDU session release request message to the H-SMF by using the Nsmf_PDUSession_Release service operation.

In step 1 (e.g., step 1e) of FIGS. 12A and 12B, when the H-SMF initiates the MA PDU session release procedure, the H-SMF may include Access type information (e.g., 3GPP, non-3GPP, or both accesses) for the access to be released by the H-SMF within a message related to the PDU session update (e.g., PDUSession_Update message).

In step 5 (any of steps 5a to 5c) of FIGS. 12a and 12b, when the UE or V-SMF initiates the MA PDU session release procedure, the UE or V-SMF may include Access type information (e.g., 3GPP, non-3GPP, or both accesses) that the UE or V-SMF wants to release within a PDU session release request message or the PDU session release command message.

In step 5 (e.g., step 5c) of FIGS. 12A and 12B, when the V-SMF releases the MA PDU session for a single access network (3GPP access or non-3GPP access), the V-SMF does not transmit "skip indicator" to the AMF. For example, when the V-SMF transmits a message related to the release of the MA PDU session to the AMF by using the Namf_Communication_N1N2MessageTransfer service, a "skip indicator" may not be included in the message related to the release of the MA PDU session. For example, the Namf_Communication_N1N2MessageTransfer message may not include a "skip indicator".

In step 5 of FIGS. 12a and 12b, when the V-SMF releases the MA PDU session for both accesses, and a user plane resource is established within both accesses, the V-SMF transmits the N1 SM container and N2 SM resource Request messages together through one access to the AMF. Here, the N1 SM container may include a PDU session release command message. For example, the V-SMF may include both the N1 SM container and the N2 SM resource release request message in the Nsmf_PDUSession_UpdateSMContext message or the Namf_Communication_N1N2MessageTransfer message. Then, the UE may not request activation of the user plane resource. Specifically, when the UE receives the PDU session release command message included in the N1 SM container, since the UE recognizes that the release procedure for the corresponding MA PDU session is in progress, even if uplink traffic for the corresponding MA PDU session occurs, the UE may not request user plane resource activation. By transmitting the N2 SM resource release request message through the other access, the SMF may release the user plane resource of the other access (access that is not an access in which both the N1 SM container and the N2 SM resource release request message are transmitted). For example, the V-SMF may release the user plane of the other access by transmitting a Namf_Communication_N1N2MessageTransfer message (including the N2 SM resource release request message, but not including the N1 SM container) through the other access.

In step 5 (e.g., step 5c) of FIGS. 12A and 12B, when the V-SMF provides the N1 SM container and/or N2 SM information to the AMF, the V-SMF may include information about the access type within the Namf_Communication_N1N2MessageTransfer message in order to provide routing information.

In step 16 (step 16a and step 16b) of FIGS. 12a and 12b, the H-SMF may trigger a PDU session context status notification service (e.g., Nsmf_PDUSession_SMContextStatusNotify service) when the MA PDU session is completely released for both accesses. For example, the H-SMF may transmit a PDU session context status notification message to the V-SMF when the MA PDU session is completely released for both accesses. V-SMF may also trigger a PDU session context status notification service (e.g., Nsmf_PDUSession_SMContextStatusNotify service) when the MA PDU session is completely released for both accesses. For example, the V-SMF may transmit a PDU session context status notification message to the AMF when the MA PDU session is completely released for both accesses.

IV. Summary of the Disclosure of the Present Specification

Hereinafter, the contents described in FIGS. 18 to 21b are examples of summarizing the contents described in the detailed procedure description to which the first example, the second example, the first example, and/or the second example of the present specification are applied. Since the description with reference to FIGS. 18 to 21b is only an example, if the operations not described in the description of in FIGS. 18 to 21b are also described in description of specific procedures to which the first example, the second example, the first example and/or the second example are applied, the operations may be performed by UE, N3IWF, RAN, AMF, SMF, UPF, etc.

Figure 18:
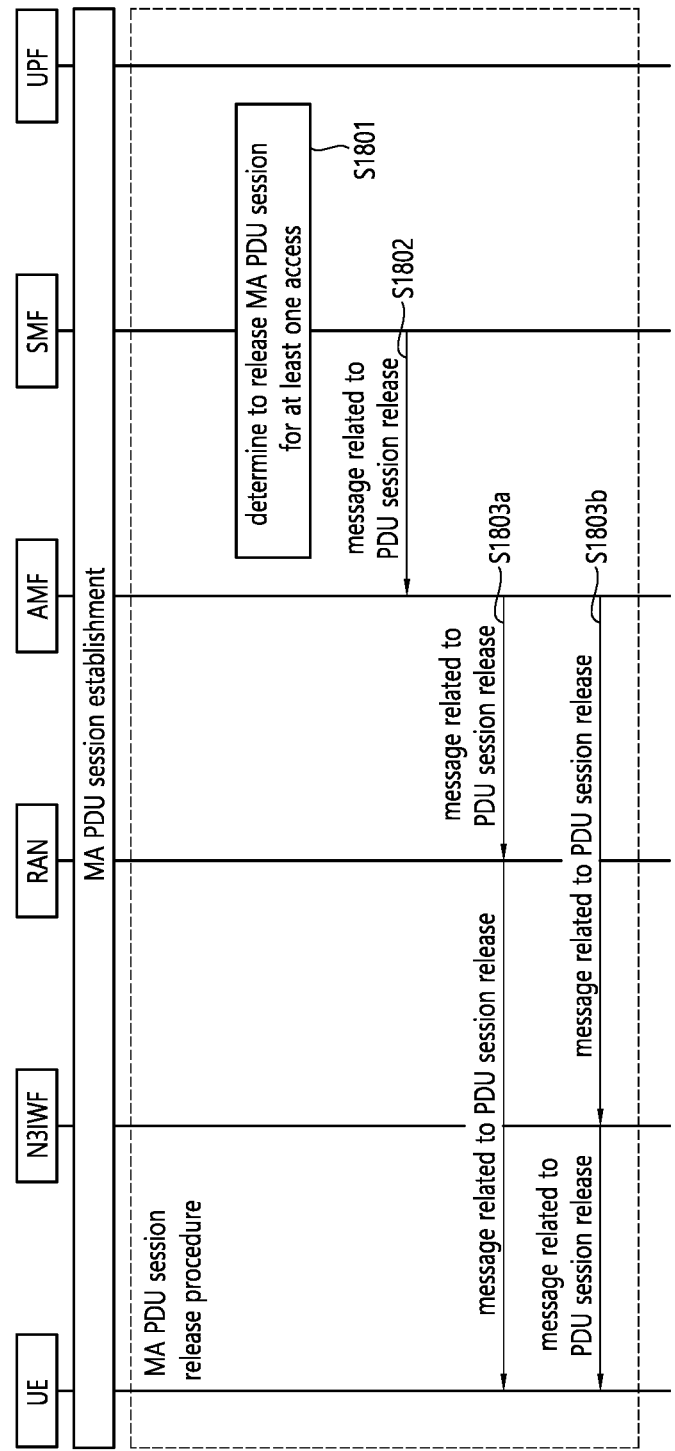
FIG. 18 is a first exemplary diagram showing a summary of the disclosure of the present specification.

FIG. 18 is a first exemplary diagram showing a summary of the disclosure of the present specification.

Referring to FIG. 18, it is assumed that the operations of FIG. 18 are performed in a state in which an MA PDU session is established between a UE, N3IWF, RAN, AMF, SMF, UPF, and the like.

The MA PDU session release procedure of FIG. 18 includes steps S1801, S1802, S1803*a*, and S1803*b*. Although only steps S1801, S1802, S1803*a*, and S1803*b* are illustrated in FIG. 18, the operations described in the present specification may be performed in addition to steps S1801, S1802, S1803*a*, and S1803*b*. For example, the operations described with reference to FIGS. 7A and 7B, 12A and 12B, 16A and 16B, and FIGS. 17A and 17B and the operations described in the detailed procedure description to which the first example, the second example, the first example, and/or the second example of the disclosure of the present specification are applied may be performed.

In step S1801, the SMF may determine to release the MA PDU session for at least one of 3GPP access and non-3GPP access. For example, the SMF may determine to release the MA PDU session for 3GPP access, non-3GPP access, or 3GPP access and non-3GPP access.

When the SMF determines to release the MA PDU session for 3GPP access and non-3GPP access, the SMF may determine which of the 3GPP access and non-3GPP access to transmit a message associated with the PDU session release first. Then, the SMF may transmit a message associated with PDU session release for the remaining access. When the SMF determines to transmit a message associated with PDU session release first for 3GPP access, step S103*a* may be performed. Thereafter, the SMF may transmit a message associated with PDU session release for non-3GPP access. If the SMF determines to first transmit a message associated with PDU session release for non-3GPP access, step S103*b* may be performed. Thereafter, the SMF may transmit a message associated with PDU session release for 3GPP access.

The MA PDU session release procedure may be initiated when the SMF receives a message associated with the PDU session release from the AMF. In this case, the AMF may determine to release the MA PDU session for at least one of 3GPP access and non-3GPP access, based on the information included in the message associated with the PDU session release.

In step S1802, the SMF may transmit a message (e.g., an Nsmf_PDUSession_UpdateSMContext message or a Namf_Communication_N1N2MessageTransfer message) associated with PDU session release to the AMF.

If the SMF determines to release the MA PDU session for both 3GPP access and non-3GPP access, the message associated with the PDU session release transmitted to the access that to be released first is the session management resource release request message (e.g., N2 Resource Release Request) and a PDU session release command message (e.g., a PDU session release command message included in the N1 SM container) to be delivered to the UE.

If the SMF determines that the MA PDU session will be released for one of the 3GPP access and the non-3GPP access, the SMF may not include the skip indicator in the message associated with the PDU session release. The skip indicator may be used to inform the AMF node to skip transmitting a PDU session release command message to the UE. For example, when the AMF receives the message associated with the PDU session not including the skip indicator, if the UE is in the CM-IDLE state, after the AMF pages the UE, the AMF may transmit a message associated with the PDU session release to the UE.

Here, the PDU session release command message may include access type information (e.g., 3GPP, non-3GPP, or both 3GPP and non-3GPP) for at least one access for which the MA PDU session is to be released.

In step S1803*a*, the AMF may transmit a message related to PDU session release to the UE through the RAN. Step S1803*a* may be performed when releasing the MA PDU session for non-3GPP access.

In step S1803*b*, the AMF may transmit a message related to PDU session release to the UE through the N3IWF. Step S1803*b* may be performed when releasing the MA PDU session for non-3GPP access.

After step S1803*a* or S1803*b* is performed, if the MA PDU session is released for both 3GPP access and non-3GPP access, the SMF may transmit a PDU session context status notification message (e.g., Nsmf_PDUSession_SM-ContextStatusNotify message) to the AMF. When it is determined that the MA PDU session is released for one of 3GPP access and non-3GPP access, a PDU session context status notification message may not be transmitted.

Figure 19:
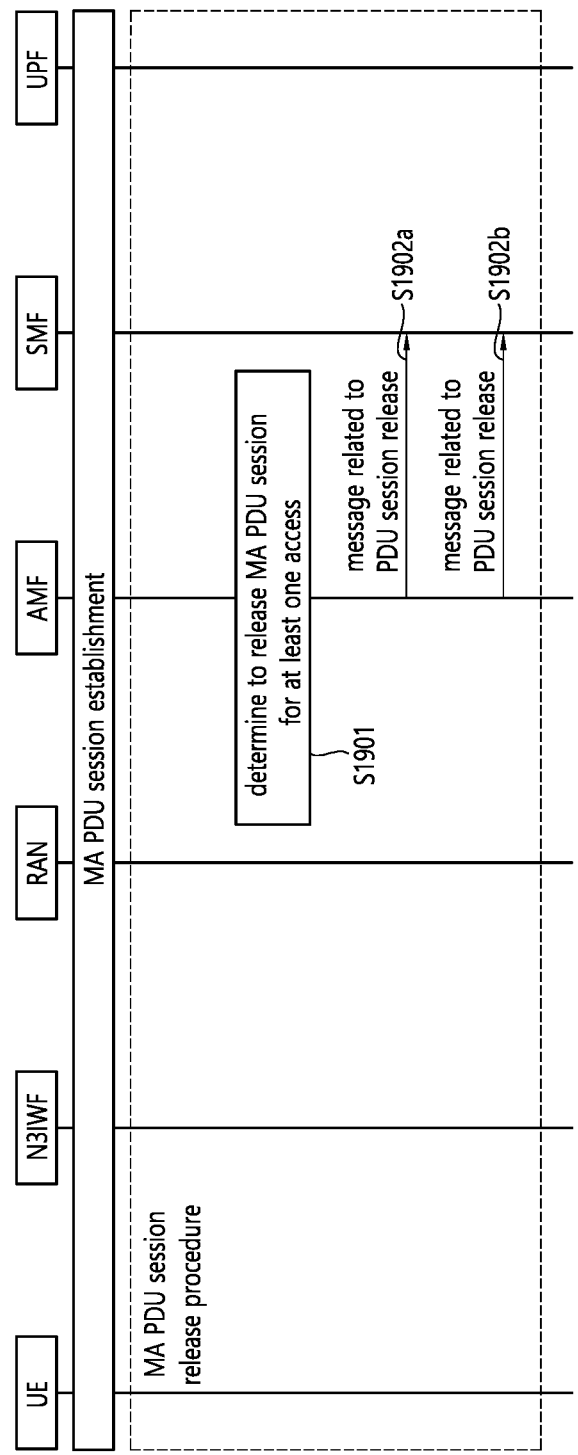
FIG. 19 is a second exemplary diagram showing a summary of the disclosure of the present specification.

FIG. 19 is a second exemplary diagram showing a summary of the disclosure of the present specification.

Referring to FIG. 19, it is assumed that the operations of FIG. 19 are performed in a state in which a MA PDU session is established between a UE, N3IWF, RAN, AMF, SMF, UPF, and the like.

The MA PDU session release procedure of FIG. 19 includes steps S1901, S1902*a*, and S1902*b*. Although only steps S1901, S1902*a* and S1902*b* are shown in FIG. 19, the operations described herein may also be performed in addition to steps S1901, S1902*a* and S1902*b*. For example, the operations described with reference to FIGS. 7A and 7B, 12A and 12B, 16A and 16B, and FIGS. 17A and 17B and the operations described in the detailed procedure description to which the first example, the second example, the first example and/or the second example is applied to may be performed.

In step S1901, the AMF may determine to release the MA PDU session for at least one of 3GPP access and non-3GPP access. For example, the AMF may determine to release the MA PDU session for 3GPP access, non-3GPP access, or 3GPP access and non-3GPP access.

After performing step S1901, the AMF may transmit a PDU session release related message (e.g., Nsmf_PDUSession_ReleaseSMContext message) to the SMF, or, the AMF transmits a PDU session update related message (e.g., Nsmf_PDUSession_UpdateSMContext message) to SMF as shown in step S1902*a*

In step S1902*a*, the AMF may transmit a message related to PDU session release to the SMF. A message associated with PDU session release may be transmitted when the MA PDU session is determined to be released for both 3GPP access and non-3GPP access.

In step S1902*b*, the AMF may transmit a message related to the PDU session update to the SMF. The message associated with the PDU session update may be transmitted when the MA PDU session is determined to be released for one of 3GPP access and non-3GPP access. The message associated with the PDU session update may include information about one access for which the MA PDU session is to be released. That is, the AMF may include information on one access for which the MA PDU session is to be released in the message associated with the PDU session update.

The AMF may receive PDU session status information from the UE. Here, the PDU session status information may be transmitted from the UE when the UE releases the MA PDU session locally. Then, the AMF may determine whether there is a mismatch between the PDU session state of the MA PDU session (e.g., the state of the current MA PDU session recognized by the AMF) and the PDU session status information received from the UE. If it is determined that there is a mismatch, the AMF may transmit a PDU session release related message (e.g., Nsmf_PDUSession_ReleaseSMContext message) to the SMF in order to release the corresponding MA PDU session.

For reference, before the MA PDU session release procedure is performed or when the MA PDU session is released for only one access, the AMF may receive a message associated with re-activation of the MA PDU session from the UE. For example, the AMF may receive a service request message or a registration request message transmitted by the UE through one of 3GPP access or non-3GPP access. Here, the service request message or registration request message may include a List Of PDU Sessions To Be Activated including the PDU session ID of the MA PDU session that the UE intends to re-activate through one access.

Figure 20:
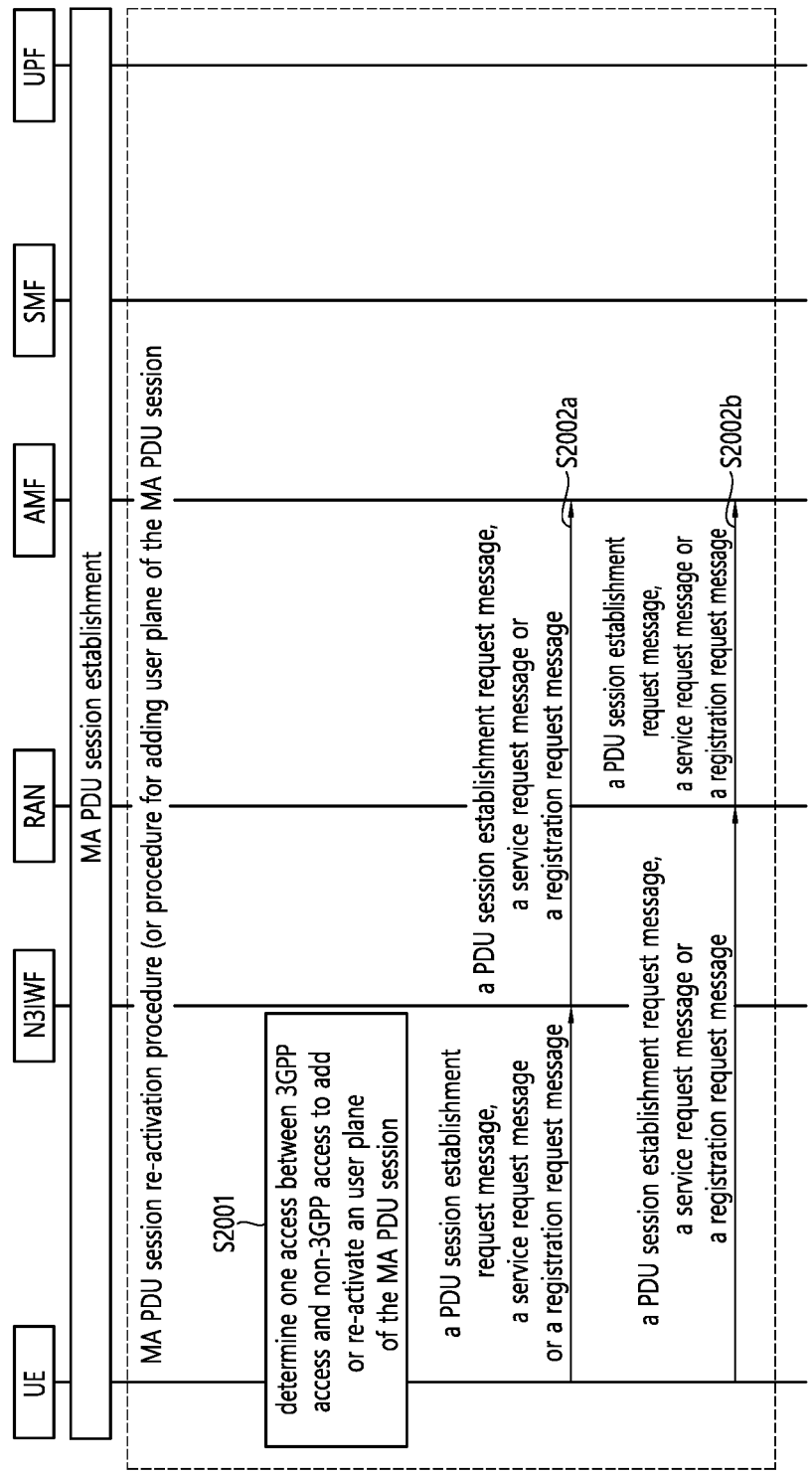
FIG. 20 is a third exemplary diagram showing a summary of the disclosure of the present specification.

FIG. 20 is a third exemplary diagram showing a summary of the disclosure of the present specification.

Referring to FIG. 20, it is assumed that the operations of FIG. 20 are performed in a state in which a MA PDU session is established between a UE, N3IWF, RAN, AMF, SMF, UPF, and the like.

The MA PDU session release procedure of FIG. 20 includes steps S2001, S2002a, and S2002b. Although only the steps S2001, S2002a, and S2002b are shown in FIG. 20, the operations described in the disclosure of the present specification may be performed in addition to the steps S2001, S2002a, and S2002b. For example, the operations described with reference to FIGS. 7A and 7B, 12A and 12B, 16A and 16B, and FIGS. 17A and 17B and the operations described in the detailed procedure description to which the first example, the second example, the first example, and/or the second example of the disclosure of the present specification are applied may be performed.

In step S2001, the UE may determine an access to add a user plane or an access to re-activate for the established MA PDU session. For example, the UE may determine the access to add or re-activate the user plane of the MA PDU session among 3GPP access and non-3GPP access.

The UE may transmit a PDU session request message, service request message or registration request message to the AMF through the access that the UE decides to re-activate the MA PDU session or the access that the UE decides to add the user plane of the MA PDU session. For example, if the UE decides to add the user plane of the MA PDU session for non-3GPP access, or to re-activate the MA PDU session, step S2002a may be performed. When the UE decides to add the user plane of the MA PDU session for 3GPP access, or to re-activate the MA PDU session, step S2002b may be performed.

In step S2002a, the UE may transmit a PDU session establishment request message, a service request message, or a registration request message to the AMF through the N3IWF.

In step S2002b, the UE may transmit a PDU session establishment request message, a service request message, or a registration request message to the AMF through the RAN.

In step S2002a or step S2002b, when the PDU session establishment request message is transmitted, the UE may receive a PDU session establishment accept message in response to the PDU session establishment request message from the AMF. Here, the PDU session establishment request message may include a "MA PDU Request" indication and a PDU session ID of the established MA PDU session. The PDU session establishment request message may also include request type information indicating "Existing PDU Session". When the PDU session establishment accept message is received, the UE may recognize that the user plane resource of the MA PDU session has been added.

In step S2002a or step S2002b, when the service request message is transmitted, the UE may receive a service accept message from the AMF in response to the service request message. When the service acceptance message is received, the UE may recognize that the user plane resource of the MA PDU session is re-activated based on the PDU session re-activation result information (e.g., activation result) of the service accept message. The service accept message may include PDU session state information. When the information indicating that the MA PDU session is released is included in the PDU session state information, the UE may locally remove the resource associated with the MA PDU session.

In step S2002a or step S2002b, when the registration request message is transmitted, the UE may receive a registration acceptance message from the AMF in response to the registration request message. When the registration accept message is received, the UE may recognize that the user plane resource of the MA PDU session is re-activated based on the PDU session re-activation result information of the registration accept message. The registration accept message may include PDU session state information. When the information indicating that the MA PDU session is released is included in the PDU session state information, the UE may locally remove the resource associated with the MA PDU session.

The service request message or registration request message may include a List Of PDU Sessions To Be Activated including the session ID of the MA PDU session to be re-activated by the UE. For example, the service request message or the registration request message may include a List of PDU Session To Be Activated, and the PDU session ID of the MA PDU session may be included in the List of PDU Session To Be Activated.

The UE may release the MA PDU session locally for 3GPP access and non-3GPP access. In this case, the UE may transmit PDU session status information to the AMF.

Figure 21A:
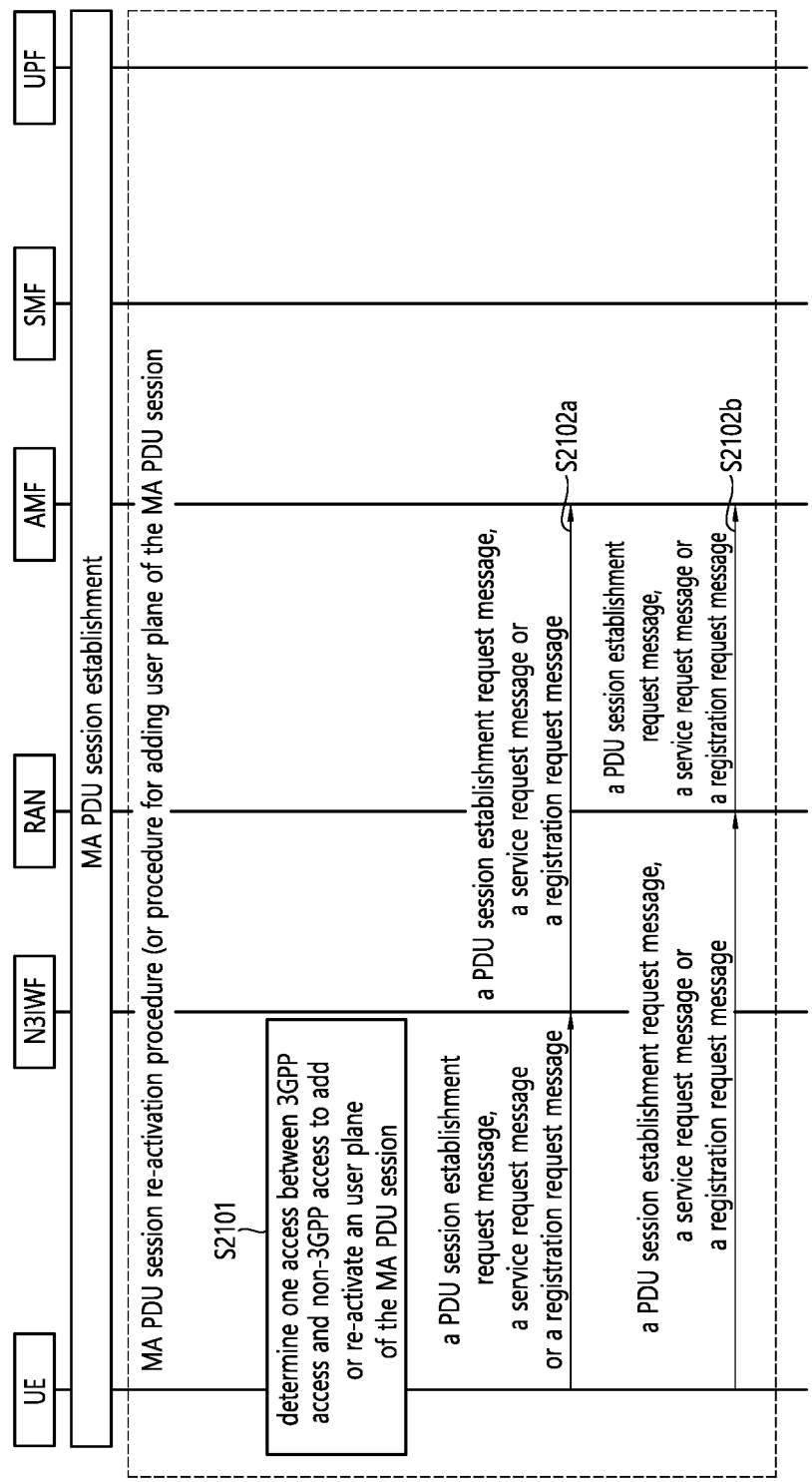
FIGS. 21a and 21b are a fourth exemplary view summarizing the disclosure of the present specification.
Figure 21B:
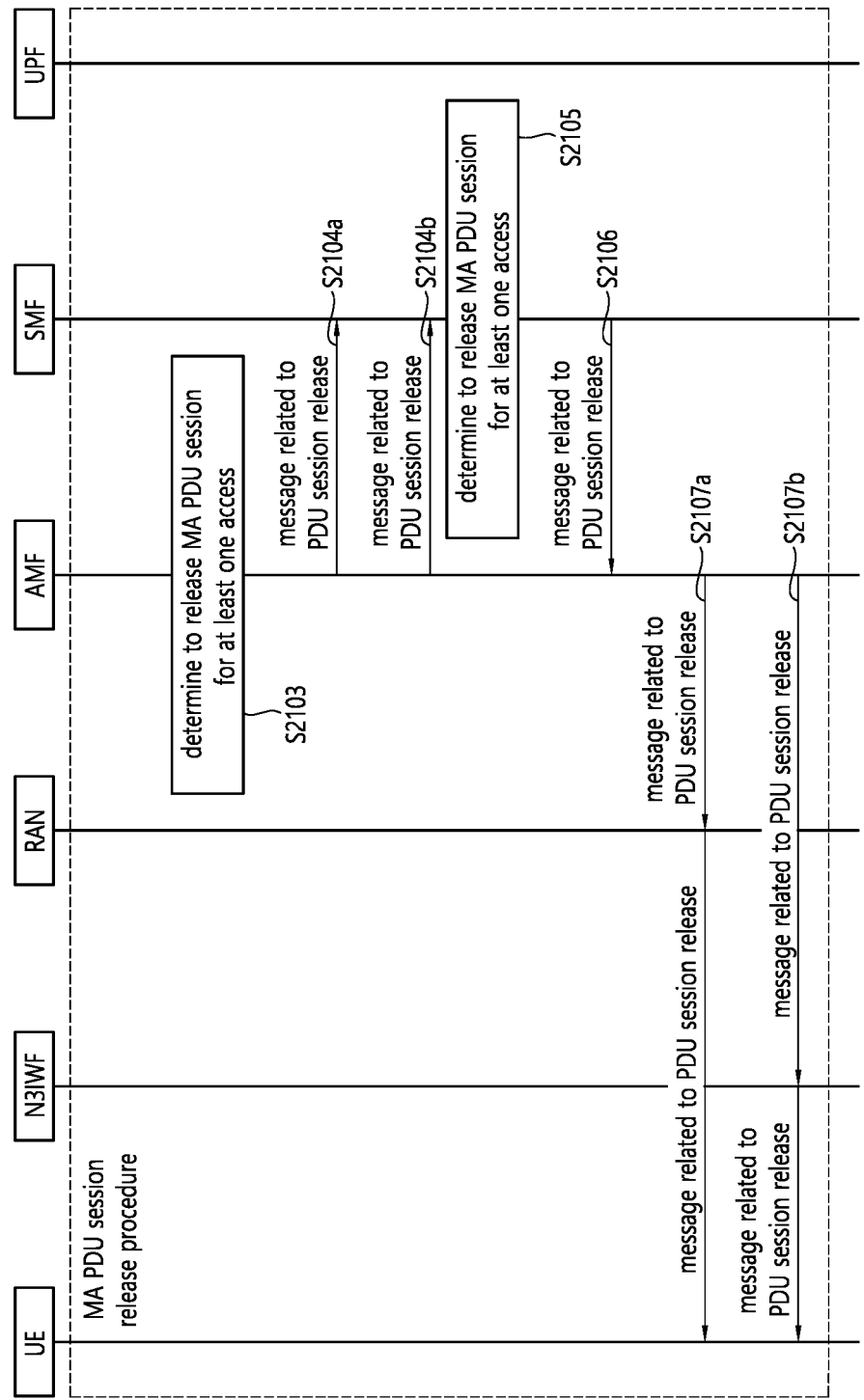

FIGS. 21a and 21b are a fourth exemplary view summarizing the disclosure of the present specification.

Referring to FIGS. 21A and 21B, it is assumed that the operations of FIG. 20 are performed in a state in which an MA PDU session is established between a UE, N3IWF, RAN, AMF, SMF, UPF, and the like.

A fourth exemplary view of FIGS. 21A and 21B is an exemplary view in which the examples described in FIGS. 18 to 20 are combined. FIGS. 21a and 21b illustrate an example in which the MA PDU session release procedure is performed after the MA PDU session re-activation procedure is performed, but this is only an example, and the MA PDU session re-activation procedure may be performed after the MA PDU session release procedure is performed. A re-activation procedure may be performed. In addition, the MA PDU session release procedure may be performed while the MA PDU session re-activation procedure is being performed.

The MA PDU session release procedure of FIGS. 21A and 21B includes steps S2101, S2102a, S2102b, S2103, S2104a, S2104b, S2105, S2106, S2107a, and S2107b. FIGS. 21A and 21B show only steps S2101, S2102a, S2102b, S2103, S2104a, S2104b, S2105, S2106, S2107a, S2107b, but steps S2101, S2102a, S2102b, S2103, S2104a, S2104b, S2105 In addition to S2106, S2107a, S2107b), the operations described herein may also be performed. For example, the operations described with reference to FIGS. 7A and 7B, 12A and 12B, 16A and 16B, and FIGS. 17A and 17B and the operations described in the detailed procedure description to which the first example, the second example, the first example, and/or the second example of the disclosure of the present specification are applied may be performed.

In step S2101, the UE may determine, for the established MA PDU session, an access to add or re-activate a user plane. For example, the UE may determine the access to add or re-activate the user plane of the MA PDU session among 3GPP access and non-3GPP access.

The UE may transmit a PDU session request message, service request message or registration request message to the AMF through the access that the UE decides to re-activate the MA PDU session or the access that the UE decides to add the user plane of the MA PDU session. For example, if the UE decides to add the user plane of the MA PDU session for non-3GPP access, or to re-activate the MA PDU session, step S2102a may be performed. When the UE decides to add the user plane of the MA PDU session for 3GPP access, or to re-activate the MA PDU session, step S2102b may be performed.

In step S2102a, the UE may transmit a PDU session establishment request message, a service request message, or a registration request message to the AMF through the N3IWF.

In step S2102b, the UE may transmit a PDU session establishment request message, a service request message, or a registration request message to the AMF through the RAN.

In step S2102a or step S2102b, when the PDU session establishment request message is transmitted, the UE may receive a PDU session establishment accept message from the AMF in response to the PDU session establishment request message. Here, the PDU session establishment request message may include a "MA PDU Request" indication and a PDU session ID of the established MA PDU session. The PDU session establishment request message may also include request type information indicating "Existing PDU Session". When the PDU session establishment accept message is received, the UE may recognize that the user plane resource of the MA PDU session has been added.

In step S2102a or step S2102b, when the service request message is transmitted, the UE may receive a service acceptance message from the AMF in response to the service request message. When the service acceptance message is received, the UE may recognize that the user plane resource of the MA PDU session is re-activated based on the PDU session re-activation result information of the service acceptance message. The service acceptance message may include PDU session state information. When the information indicating that the AMF MA PDU session is released is included in the PDU session state information, the UE may locally remove the resource associated with the MA PDU session.

In step S2102a or step S2102b, when the registration request message is transmitted, the UE may receive a registration accept message from the AMF in response to the registration request message. When the registration accept message is received, the UE may recognize that the user plane resource of the MA PDU session is re-activated based on the PDU session re-activation result information of the registration accept message. The registration accept message may include PDU session state information. When the information indicating that the AMF MA PDU session is released is included in the PDU session state information, the UE may locally remove the resource associated with the MA PDU session.

The service request message or registration request message may include a List Of PDU Sessions To Be Activated including the session ID of the MA PDU session that the UE intends to re-activate. For example, the service request message or the registration request message may include a List of PDU Session To Be Activated, and the PDU session ID of the MA PDU session may be included in the List of PDU Session To Be Activated.

The UE may locally release the MA PDU session for 3GPP access and non-3GPP access. In this case, the UE may transmit PDU session status information to the AMF.

A MA PDU session release procedure may be performed.

In step S2103, the AMF may determine to release the MA PDU session for at least one of 3GPP access and non-3GPP access. For example, the AMF may decide to release the MA PDU session for 3GPP access, non-3GPP access, or 3GPP access and non-3GPP access.

After performing step S2103, the AMF may transmits a PDU session release related message (e.g., Nsmf_PDUSession_ReleaseSMContext message) to the SMF as shown in step S2104a, or the AMF may transmit the PDU session update related message (e.g., Nsmf_PDUSession_UpdateSMContext message) to SMF as shown in step S2104b.

In step S2104a, the AMF may transmit a message related to the PDU session release to the SMF. A message related to PDU session release may be transmitted when the MA PDU session is determined to be released for both 3GPP access and non-3GPP access.

In step S2104b, the AMF may transmit a message related to the PDU session update to the SMF. The message related to the PDU session update may be transmitted when it is determined that the MA PDU session is to be released for one of 3GPP access and non-3GPP access. The message related to the PDU session update may include information about one access for which the MA PDU session is to be released. That is, the AMF may include information on one access for which the MA PDU session is to be released in the message related to the PDU session update.

In step S2105, the SMF may determine to release the MA PDU session for at least one of 3GPP access and non-3GPP access. For example, the SMF may determine to release the MA PDU session for 3GPP access, non-3GPP access, or 3GPP access and non-3GPP access.

When the SMF decides to release the MA PDU session for 3GPP access and non-3GPP access, the SMF may determine which of the 3GPP access and non-3GPP access to transmit a message related to the PDU session release first. Then, the SMF may transmit a message related to PDU session release for the remaining access. When the SMF determines to transmit a message associated with PDU session release first for 3GPP access, step S2107a may be performed. Thereafter, the SMF may transmit a message related to PDU session release for non-3GPP access. If the SMF determines to transmit a message related to PDU session release first for non-3GPP access, step 2107b may be performed. Thereafter, the SMF may transmit a message associated with PDU session release for 3GPP access.

The MA PDU session release procedure may be initiated when the SMF receives a PDU session release-related message (message according to step S2104a or step S2104b) from the AMF. In this case, the AMF may determine to release the MA PDU session for at least one of 3GPP access and non-3GPP access, based on the information included in the message associated with the PDU session release.

In step S2106, the SMF may transmit a message related to PDU session release (e.g., an Nsmf_PDUSession_UpdateSMContext message or a Namf_Communication_N1N2MessageTransfer message) to the AMF.

If the SMF decides to release the MA PDU session for both 3GPP access and non-3GPP access, the messages related to the PDU session release may include both a session management resource release request message (e.g., N2 Resource Release Request) and a PDU session release command message to be delivered to the UE (e.g., PDU session release command messages included in the N1 SM container).

If the SMF determines that the MA PDU session will be released for one of 3GPP access and non-3GPP access, the SMF may not include the skip indicator in the message related to the PDU session. The skip indicator may be used to inform the AMF node to skip transmitting a PDU session release command message to the UE. For example, when the AMF receives the message related to the PDU session not including the skip indicator, when the UE is in the CM-IDLE state, after the AMF pages the UE, the AMF may transmit a message related to the PDU session release to the UE.

Here, the PDU session release command message may include access type information (e.g., 3GPP, non-3GPP, or both 3GPP and non-3GPP) for at least one access for which the MA PDU session is to be released.

In step S2107a, the AMF may transmit a message associated with the PDU session release to the UE through the RAN. Step S2107a may be performed when releasing the MA PDU session for non-3GPP access.

In step S2107b, the AMF may transmit a message related to PDU session release to the UE through the N3IWF. Step S2107b may be performed when releasing the MA PDU session for non-3GPP access.

After step S2107a or S2107b is performed, if the MA PDU session is released for both 3GPP access and non-3GPP access, the SMF may transmit a PDU session context status notification message (e.g., Nsmf_PDUSession_SMContextStatusNotify message) to the AMF. When it is determined that the MA PDU session is released for one of 3GPP access and non-3GPP access, a PDU session context status notification message may not be transmitted.

The AMF may receive PDU session status information from the UE. Here, the PDU session status information may be transmitted from the UE when the UE locally releases the MA PDU session. Then, the AMF may determine whether there is a mismatch between the PDU session state of the MA PDU session (e.g., the state of the current MA PDU session recognized by the AMF) and the PDU session status information received from the UE. If it is determined that there is a mismatch, the AMF may transmit a PDU session release related message (e.g., Nsmf_PDUSession_ReleaseSMContext message) to the SMF in order to release the corresponding MA PDU session.

For reference, the operation of the UE described in this specification may be implemented by the apparatus of FIGS. 22 to 27 to be described below. For example, the UE may be the first wireless device 100 or the second wireless device 200 of FIG. 23. For example, operations of a UE described herein may be handled by one or more processors 102 or 202. The operations of the UE described herein may be stored in one or more memories 104 or 204 in the form of instructions, executable code, executable by one or more processors 102 or 202. One or more processors 102 or 202 control one or more memories 104 or 204 and one or more transceivers 106 or 206, and may perform operations of the UE described in the disclosure of the present specification by executing instructions/programs stored in one or more memories 104 or 204.

For reference, the operation of the SMF described in this specification may be implemented by the apparatus of FIGS. 22 to 27 to be described below. For example, the SMF may be the first wireless device 100 or the second wireless device 200 of FIG. 23. For example, operations of a SMF described herein may be handled by one or more processors 102 or 202. The operations of the SMF described herein may be stored in one or more memories 104 or 204 in the form of instructions, executable code, executable by one or more processors 102 or 202. One or more processors 102 or 202 control one or more memories 104 or 204 and one or more transceivers 106 or 206, and may perform operations of the SMF described in the disclosure of the present specification by executing instructions/programs stored in one or more memories 104 or 204.

For reference, the operation of the AMF described in this specification may be implemented by the apparatus of FIGS. 22 to 27 to be described below. For example, the AMF may be the first wireless device 100 or the second wireless device 200 of FIG. 23. For example, operations of a AMF described herein may be handled by one or more processors 102 or 202. The operations of the AMF described herein may be stored in one or more memories 104 or 204 in the form of instructions, executable code, executable by one or more processors 102 or 202. One or more processors 102 or 202 control one or more memories 104 or 204 and one or more transceivers 106 or 206, and may perform operations of the AMF described in the disclosure of the present specification by executing instructions/programs stored in one or more memories 104 or 204.

V. Examples to which the Disclosure of this Specification is to be Applied

While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 22:
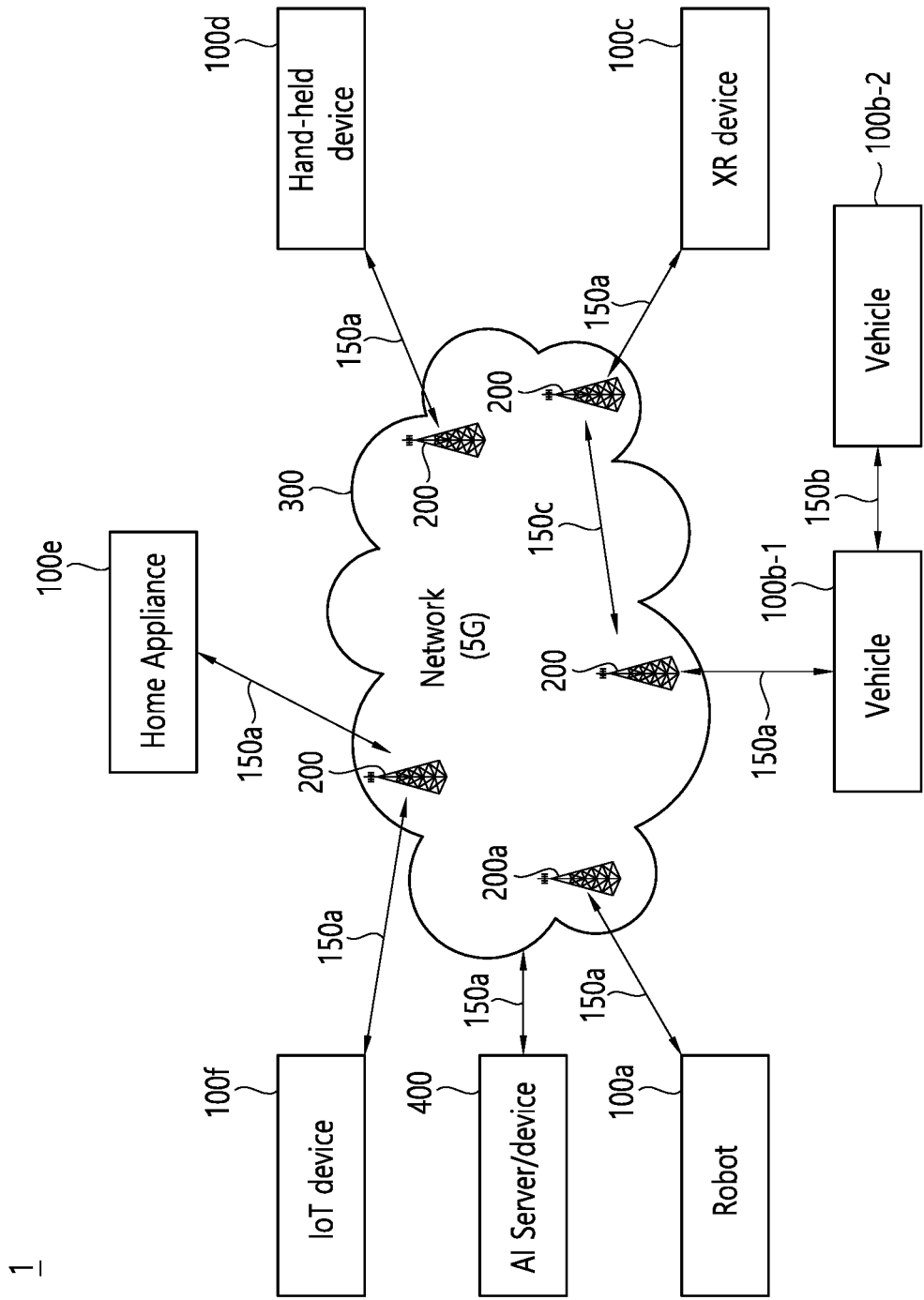
FIG. 22 illustrates a communication system 1 that can be applied to the present specification.

FIG. 22 illustrates a communication system 1 that can be applied to the present specification.

Referring to FIG. 22, a communication system 1 applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like. Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like. The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300. The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/ base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like. The wireless device and the base station/ wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Figure 23:
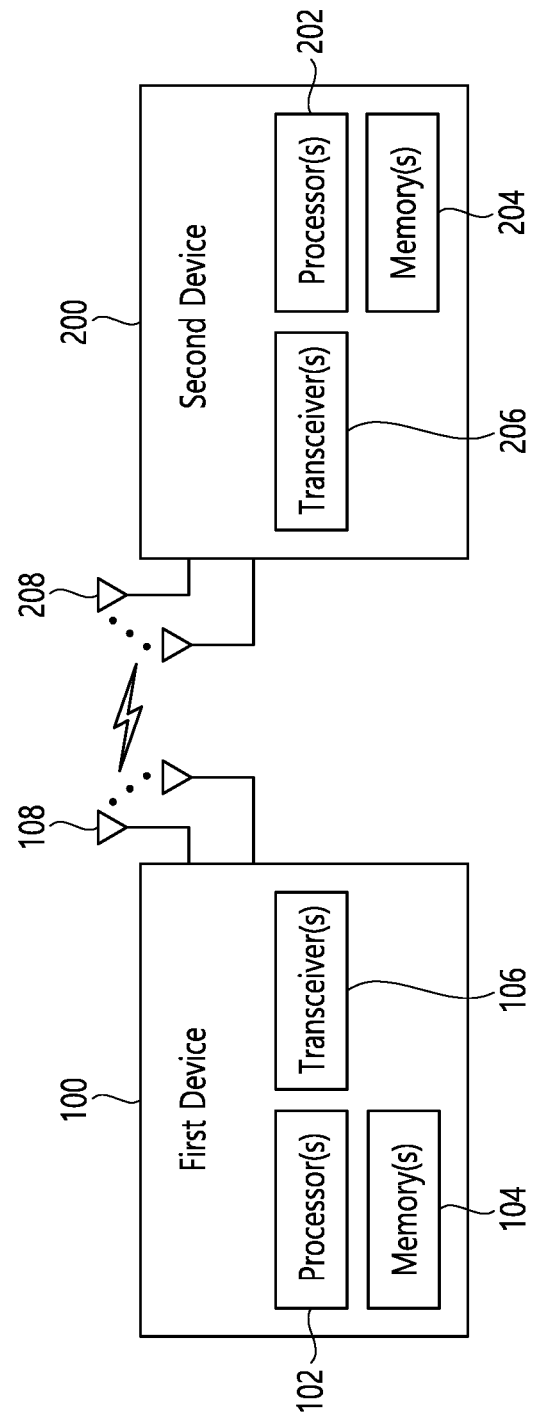
FIG. 23 illustrates an example of a wireless device that can be applied to the present specification.

FIG. 23 illustrates an example of a wireless device that can be applied to the present specification.

Referring to FIG. 23, the first wireless device 100 and the second wireless device 200 may transmit and receive wireless signals through various wireless access technologies (e.g., LTE and NR). Here, the {first wireless device 100 and the second wireless device 200} may refer to the {wireless device 100x, the base station 200} and/or the {wireless device 100x, the wireless device 100x of FIG. 22}. Alternatively, the first wireless device 100 may correspond to the UE, AMF, SMF, or UPF described in the disclosure of the present specification. In addition, the second wireless device 200 may correspond to a UE, AMF, SMF, or UPF that communicates with the first wireless device 100. The first wireless device 100 includes one or more processors 102 and one or more memories 104, and may further include one or more transceivers 106 and/or one or more antennas 108. The processor 102 controls the memory 104 and/or the transceiver 106 and may be configured to implement the descriptions, functions, procedures, suggestions, methods and/or operational flowcharts disclosed herein. For example, the processor 102 may process the information in the memory 104 to generate a first information/signal, and then transmit the wireless signal including the first information/ signal through the transceiver 106. In addition, the processor 102 may receive the radio signal including a second information/signal through the transceiver 106 and store the information obtained from the signal processing of the second information/signal in the memory 104. The memory 104 may be connected to the processor 102 and may store various information related to the operation of the processor 102. For example, the memory 104 may store software code that includes instructions to perform some or all of the processes controlled by the processor 102 or to perform descriptions, functions, procedures, suggestions, methods and/or operational flowcharts disclosed herein. Here, the processor 102 and memory 104 may be part of a communication modem/circuit/chip designed to implement wireless communication technology (e.g., LTE, NR). The transceiver 106 may be coupled with the processor 102 and may transmit and/or receive wireless signals via one or more antennas 108. The transceiver 106 may include a transmitter and/or a receiver. The transceiver 106 may be described as being mixed with a radio frequency (RF) unit. In the present specification, a wireless device may mean a communication modem/circuit/chip.

The second wireless device 200 may include one or more processors 202, one or more memories 204, and may further include one or more transceivers 206 and/or one or more antennas 208. The processor 202 controls the memory 204 and/or the transceiver 206 and may be configured to implement the descriptions, functions, procedures, suggestions, methods and/or operational flowcharts disclosed herein. For example, the processor 202 may process the information in the memory 204 to generate third information/signal, and then transmit a wireless signal including the third information/signal through the transceiver 206. In addition, the processor 202 may receive the radio signal including the fourth information/signal through the transceiver 206 and then store the information obtained from the signal processing of the fourth information/signal in the memory 204. The memory 204 may be connected to the processor 202 and store various information related to the operation of the processor 202. For example, the memory 204 may store software code that include instructions to perform some or all of the processes controlled by the processor 202 or to perform descriptions, functions, procedures, suggestions, methods and/or operational flowcharts disclosed herein. Here, processor 202 and memory 204 may be part of a communication modem/circuit/chip designed to implement wireless communication technology (e.g., LTE, NR). The transceiver 206 may be coupled with the processor 202 and may transmit and/or receive wireless signals via one or more antennas 208. The transceiver 206 may include a transmitter and/or a receiver. The transceiver 206 may be described being mixed with an RF unit. In the present specification, a wireless device may mean a communication modem/circuit/ chip.

Hereinafter, hardware elements of the wireless devices 100 and 200 will be described in more detail. One or more protocol layers may be implemented by one or more processors 102, 202. The hardware elements of the wireless devices 100 and 200 are not limited thereto. For example, one or more processors 102 and 202 may implement one or more layers (e.g., functional layers such as PHY, MAC, RLC, PDCP, RRC, SDAP). One or more processors 102, 202 may generate one or more Protocol Data Units (PDUs) and/or one or more Service Data Units (SDUs) based on the descriptions, functions, procedures, suggestions, methods and/or operational flowcharts disclosed herein. One or more processors 102, 202 may generate messages, control information, data or information in accordance with the descriptions, functions, procedures, suggestions, methods and/or operational flowcharts disclosed herein. One or more processors 102, 202 may generate signals (e.g., baseband signals) including PDUs, SDUs, messages, control information, data or information in accordance with the functions, procedures, suggestions and/or methods disclosed herein, and may provide the signals to one or more transceivers 106 and 206. One or more processors 102, 202 may receive signals (e.g., baseband signals) from one or more transceivers 106, 206 and may obtain the PDU, the SDU, the message, the control information, the data, or the information based on a description, functions, procedures, suggestions, methods, and/or operational flowcharts disclosed herein.

The descriptions, functions, procedures, suggestions, methods, and/or operational flowcharts disclosed herein may be implemented using firmware or software, and the firmware or software may be implemented to include modules, procedures, functions, and the like. Firmware or software configured to perform the descriptions, functions, procedures, suggestions, methods, and/or operational flowcharts disclosed herein may be included in one or more processors (102, 202), or may be stored in one or more memories (104, 204) and be executed by the processor (102, 202). The descriptions, functions, procedures, suggestions, methods, and/or operational flowcharts disclosed herein may be implemented using firmware or software in the form of code, instructions, and/or a set of instructions.

One or more memories 104, 204 may be coupled with one or more processors 102, 202 and may store various forms of data, signals, messages, information, programs, codes, instructions, and/or instructions. One or more memories 104, 204 may be comprised of ROM, RAM, EPROM, flash memory, hard drive, registers, cache memory, computer readable storage medium, and/or combinations thereof. One or more memories 104, 204 may be located inside and/or outside one or more processors 102, 202. In addition, one or more memories 104, 204 may be coupled with one or more processors 102, 202 through various techniques, such as a wired or wireless connection.

One or more transceivers 106 and 206 may transmit user data, control information, wireless signals/channels, etc., as mentioned in the methods and/or operational flowcharts of this document, to one or more other devices. One or more transceivers 106 and 206 may receive, from one or more other devices, user data, control information, wireless signals/channels, etc., as mentioned in the descriptions, functions, procedures, suggestions, methods and/or operational flowcharts disclosed herein. For example, one or more transceivers 106 and 206 may be coupled with one or more processors 102 and 202 and may transmit and receive wireless signals. For example, one or more processors 102 and 202 may control one or more transceivers 106 and 206 to transmit user data, control information or wireless signals to one or more other devices. In addition, one or more processors 102 and 202 may control one or more transceivers 106 and 206 to receive user data, control information or wireless signals from one or more other devices. In addition, one or more transceivers 106, 206 may be coupled with one or more antennas 108, 208. One or more transceivers 106, 206 may be configured to transmit and receive user data, control information, wireless signals/channels, etc., which are mentioned in the procedures, functions, descriptions, suggestions, methods and/or operational flowcharts, and the like via one or more antennas 108, 208. In the present disclosure, one or more antennas may be a plurality of physical antennas or a plurality of logical antennas (e.g., antenna ports). One or more transceivers 106, 206 may convert the received wireless signal/channel or the like from RF band signal to a baseband signal to process user data, control information, wireless signals/channels, etc. in an one or more processors 102, 202. One or more transceivers 106 and 206 may use the one or more processors 102 and 202 to convert processed user data, control information, wireless signals/channels, etc. from baseband signals to RF band signals. To this end, one or more transceivers 106 and 206 may include (analog) oscillators and/or filters.

Figure 24:
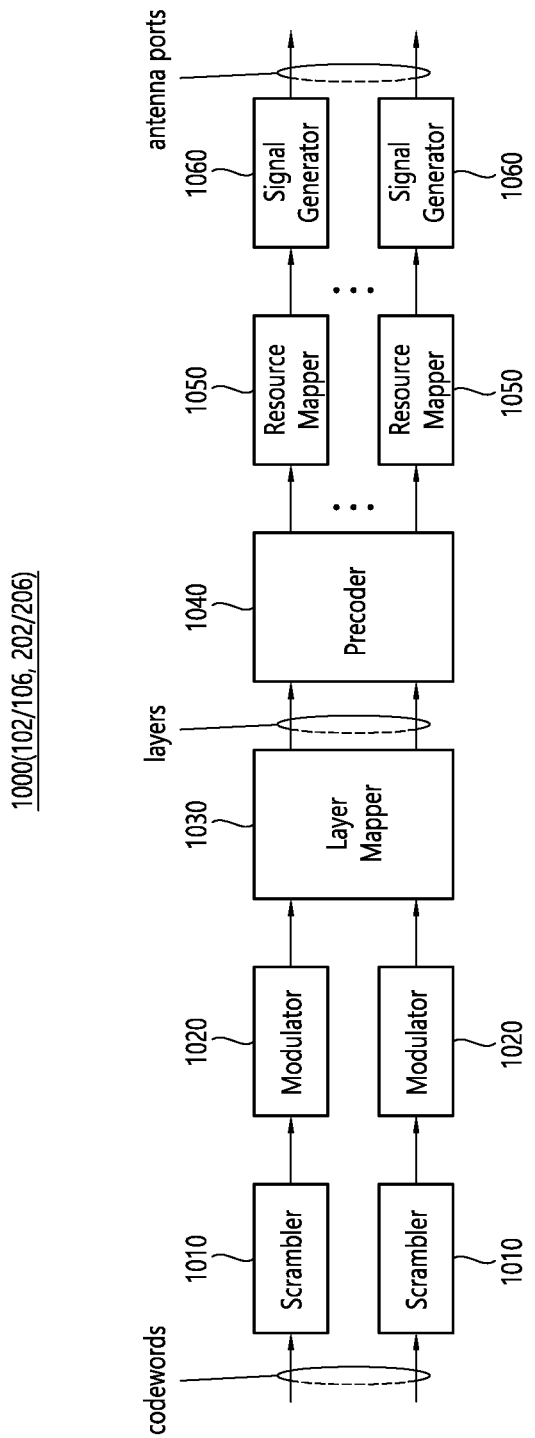
FIG. 24 illustrates an example of a signal processing circuit for a transmission signal that can be applied to the present specification.

FIG. 24 illustrates an example of a signal processing circuit for a transmission signal.

Referring to FIG. 24, the signal processing circuit 1000 may include a scrambler 1010, a modulator 1020, a layer mapper 1030, a precoder 1040, a resource mapper 1050, and a signal generator 1060. Although not limited thereto, the operations/functions of FIG. 24 may be performed in the processor (102, 202), the memory (104, 204) and/or transceiver (106, 206) of FIG. 23. The hardware element of FIG. 24 may be implemented in the processors 102 and 202 and/or the transceivers 106 and 206 of FIG. 23. For example, blocks 1010-1060 may be implemented in the processors 102, 202 of FIG. 23. Also, blocks 1010-1050 may be implemented in the processors 102 and 202 of FIG. 23, and block 1060 may be implemented in the transceivers 106 and 206 of FIG. 23.

The codeword may be converted into a wireless signal through the signal processing circuit 1000 of FIG. 24. Here, the codeword is an encoded bit sequence of the information block. The information block may include a transport block (e.g., a UL-SCH transport block and a DL-SCH transport block). The wireless signal may be transmitted through various physical channels (e.g., PUSCH, PDSCH).

In detail, the codeword may be converted into a scrambled bit sequence by the scrambler 1010. The scramble sequence used for scramble is generated based on the initialization value, and the initialization value may include ID information of the wireless device. The scrambled bit sequence may be modulated into a modulation symbol sequence by the modulator 1020. The modulation scheme may include pi/2-Binary Phase Shift Keying (pi/2-BPSK), m-Phase Shift Keying (m-PSK), m-Quadrature Amplitude Modulation (m-QAM), and the like. The complex modulation symbol sequence may be mapped to one or more transport layers by the layer mapper 1030. The modulation symbols of each transport layer may be mapped (precoding) to the corresponding antenna port (s) by the precoder 1040. The output z of the precoder 1040 may be obtained by multiplying the output y of the layer mapper 1030 by the precoding matrix W of N*M. Where N is the number of antenna ports and M is the number of transport layers. Here, the precoder 1040 may perform precoding after performing transform precoding (e.g., DFT transform) on complex modulation symbols. Also, the precoder 1040 may perform precoding without performing transform precoding.

The resource mapper 1050 may map modulation symbols of each antenna port to time-frequency resources. The time-frequency resource may include a plurality of symbols (e.g., CP-OFDMA symbols, DFT-s-OFDMA symbols) in the time domain, and may include a plurality of subcarriers in the frequency domain. The signal generator 1060 generates a radio signal from the mapped modulation symbols, and the generated radio signal may be transmitted to another device through each antenna. To this end, the signal generator 1060 may include an Inverse Fast Fourier Transform (IFFT) module, a Cyclic Prefix (CP) inserter, a Digital-to-Analog Converter (DAC), a frequency uplink converter, and the like.

The signal processing procedure for the received signal in the wireless device may be configured in the reverse manner of the signal processing procedures 1010 1060 of FIG. 24. For example, a wireless device (e.g., 100 and 200 of FIG. 23) may receive a wireless signal from the outside through an antenna port/transceiver. The received wireless signal may be converted into a baseband signal through a signal recoverer. To this end, the signal recoverer may include a frequency downlink converter, an analog-to-digital converter (ADC), a CP canceller, and a fast fourier transform (FFT) module. Thereafter, the baseband signal may be restored to a codeword through a resource de-mapper process, a postcoding process, a demodulation process, and a de-scramble process. The codeword may be restored to the original information block through decoding. Thus, signal processing circuitry (not shown) for the received signal may include a signal recoverer, a resource de-mapper, a postcoder, a demodulator, a de-scrambler and a decoder.

Figure 25:
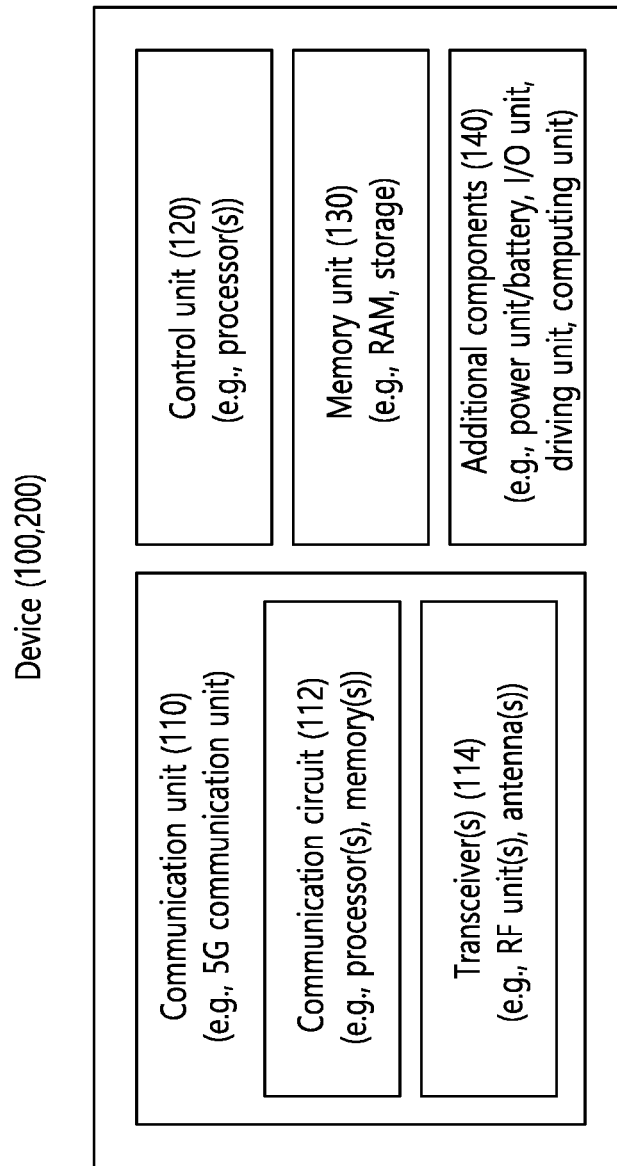
FIG. 25 illustrates another example of a wireless device that can be applied to the present specification.

FIG. 25 illustrates another example of a wireless device that can be applied to the present specification.

The wireless device may be implemented in various forms according to use-examples/services (refer to FIG. 22).

Referring to FIG. 25, the wireless devices 100 and 200 correspond to the wireless devices 100 and 200 of FIG. 23, and the wireless devices 100 and 200 may be configured with various elements, components, units, and/or modules. For example, the wireless device 100, 200 may include a communication unit 110, a control unit 120, a memory unit 130, and additional components 140. The communication unit may include communication circuit 112 and transceiver (s) 114. For example, the communication circuit 112 may include one or more processors 102, 202 and/or one or more memories 104, 204 of FIG. 23. For example, the transceiver (s) 114 may include one or more transceivers 106, 206 and/or one or more antennas 108, 208 of FIG. 23. The control unit 120 is electrically connected to the communication unit 110, the memory unit 130, and the additional components 140, and controls various operations of the wireless device. For example, the control unit 120 may control the electrical/mechanical operation of the wireless device based on the program/code/command/information stored in the memory unit 130. In addition, the control unit 120 may transmit information stored in the memory unit 130 to the outside (e.g., another communication device) through the communication unit 110 through a wireless/wired interface. The control unit 120 may store the information received through the wireless/wired interface from the outside (e.g., another communication device) through the communication unit 110 in the memory unit 130. For example, the control unit 120 may include one or more processors 102 and 202 and/or one or more memories 104 and 204 of FIG. 23. For example, the memory unit 130 may include one or more memories 104 and 204 of FIG. 23.

The additional components 140 may be variously configured according to the type of the wireless device. For example, the additional components 140 may include at least one of a power unit/battery, an input/output unit, a driving unit, and a computing unit. Although not limited thereto, the wireless device may be implemented in the form of a robot (FIG. 22, 100a), a vehicle (FIG. 22, 100b-1, 100b-2), an XR device (FIG. 22, 100c), a portable device (FIG. 22, 100d), a home appliance. (FIG. 22, 100e), IoT devices (FIG. 22, 100f), terminals for digital broadcasting, hologram devices, public safety devices, MTC devices, medical devices, fintech devices (or financial devices), security devices, climate/environment devices, an AI server/device (FIGS. 12 and 400), a base station (FIGS. 12 and 200), a network node, and the like. The wireless device may be used in a mobile or fixed location depending on the usage-example/service.

In FIG. 25, various elements, components, units/units, and/or modules in the wireless devices 100 and 200 may be entirely interconnected through a wired interface, or at least a part of them may be wirelessly connected through the communication unit 110. For example, the control unit 120 and the communication unit 110 are connected by wire in the wireless device 100 or 200, and the control unit 120 and the first unit (e.g., 130 and 140) are connected wirelessly through the communication unit 110. In addition, each element, component, unit/unit, and/or module in wireless device 100, 200 may further include one or more elements. For example, the control unit 120 may be composed of one or more processor sets. For example, the control unit 120 may be configured as a set of a communication control processor, an application processor, an electronic control unit (ECU), a graphics processing processor, a memory control processor, and the like. As another example, the memory unit 130 may include random access memory (RAM), dynamic RAM (DRAM), read only memory (ROM), flash memory, volatile memory, and non-volatile memory and/or combinations thereof.

Figure 26:
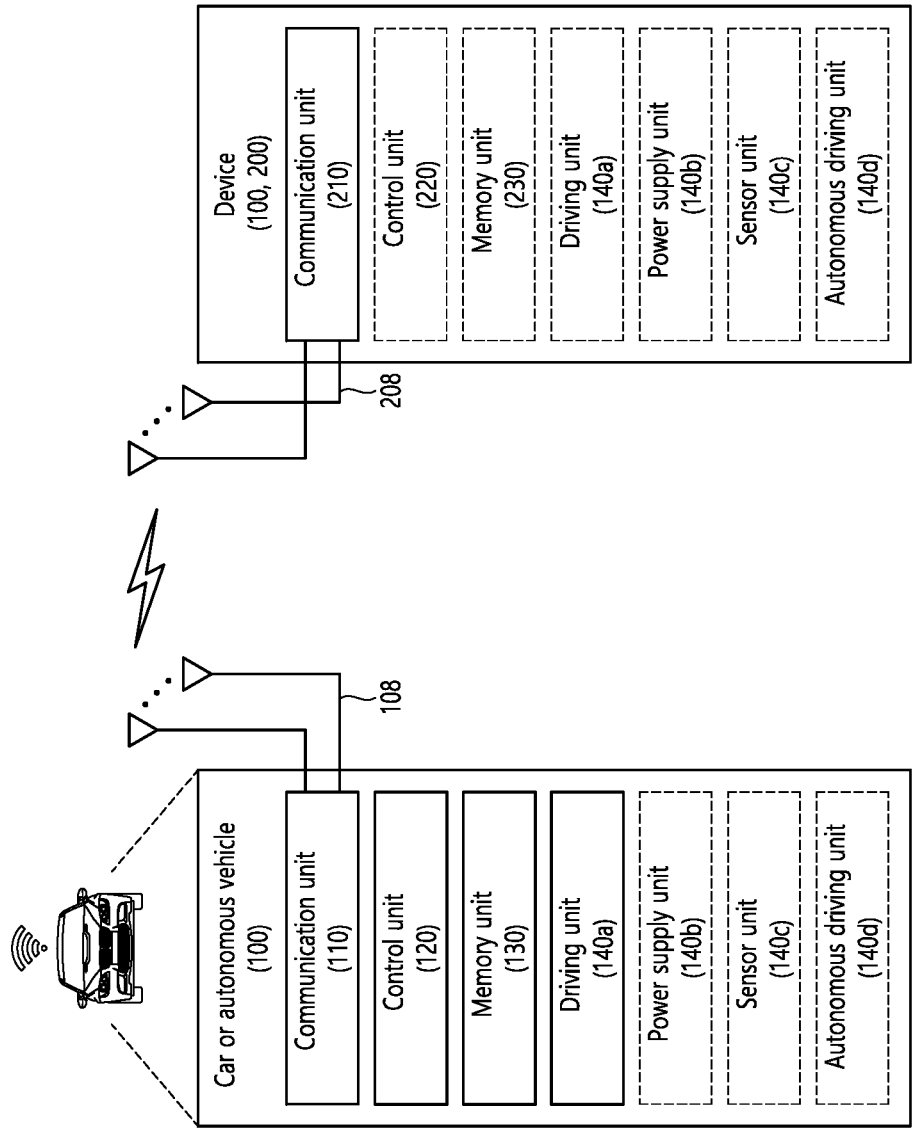
FIG. 26 illustrates an example of a vehicle or an autonomous vehicle that can be applied to the present specification.

FIG. 26 illustrates an example of a vehicle or an autonomous vehicle that can be applied to the present specification.

FIG. 26 illustrates a vehicle or autonomous vehicle applied to the disclosure of this specification. The vehicle or autonomous driving vehicle may be implemented as a mobile robot, a vehicle, a train, an aerial vehicle (AV), a ship, and the like.

Referring to FIG. 26, the vehicle or the autonomous vehicle 100 may include an antenna unit 108, a communication unit 110, a control unit 120, a driving unit 140a, a power supply unit 140b, a sensor unit 140c, and autonomous driving unit 140d. The antenna unit 108 may be configured as part of the communication unit 110. The blocks 110/130/140a to 140d may correspond to blocks 110/130/140 of FIG. 25, respectively.

The communication unit 110 may transmit or receive signals (e.g., data, control signals, etc.) with external devices, such as base stations (e.g. base stations, road side units, etc.), servers, and the like. The control unit 120 may control various elements of the vehicle or the autonomous vehicle 100 to perform various operations. The control unit 120 may include an ECU (Electronic Control Unit). The driving unit 140a may cause the vehicle or the autonomous vehicle 100 to drive on the ground. The driving unit 140a may include an engine, a motor, a power train, wheels, a brake, a steering device, and the like. The power supply unit 140b supplies power to the vehicle or the autonomous vehicle 100, and may include a wired/wireless charging circuit, a battery, and the like. The sensor unit 140c may obtain vehicle status, surrounding environment information, user information, and the like. The sensor unit 140c includes an inertial measurement unit (IMU) sensor, a collision sensor, a wheel sensor, a speed sensor, an inclination sensor, a weight sensor, a heading sensor, a position module, a position forward, and a vehicle forward/reverse sensors, battery sensors, fuel sensors, tire sensors, steering sensors, temperature sensors, humidity sensors, ultrasonic sensors, illuminance sensors, pedal position sensors, and the like. The autonomous driving unit 140d may implement a technology for maintaining a driving lane, a technology for automatically adjusting speed such as adaptive cruise control, a technology for automatically driving along a predetermined route, and automatically setting a route when a destination, and the like.

For example, the communication unit 110 may receive map data, traffic information data, and the like from an external server. The autonomous driving unit 140d may generate an autonomous driving route and a driving plan based on the obtained data. The control unit 120 may control the driving unit 140a to move the vehicle or the autonomous vehicle 100 along the autonomous driving path according to the driving plan (e.g., speed/direction adjustment). During autonomous driving, the communication unit 110 may acquire the latest traffic information data periodically or aperiodically from an external server and may obtain the surrounding traffic information data from the surrounding vehicles. In addition, during autonomous driving, the sensor unit 140c may acquire vehicle state and surrounding environment information. The autonomous driving unit 140d may update the autonomous driving route and the driving plan based on the newly obtained data/information. The communication unit 110 may transmit information regarding a vehicle location, an autonomous driving route, a driving plan, and the like to an external server. The external server may predict traffic information data in advance using AI technology or the like based on information collected from the vehicle or autonomous vehicles, and provide the predicted traffic information data to the vehicle or autonomous vehicles.

Figure 27:
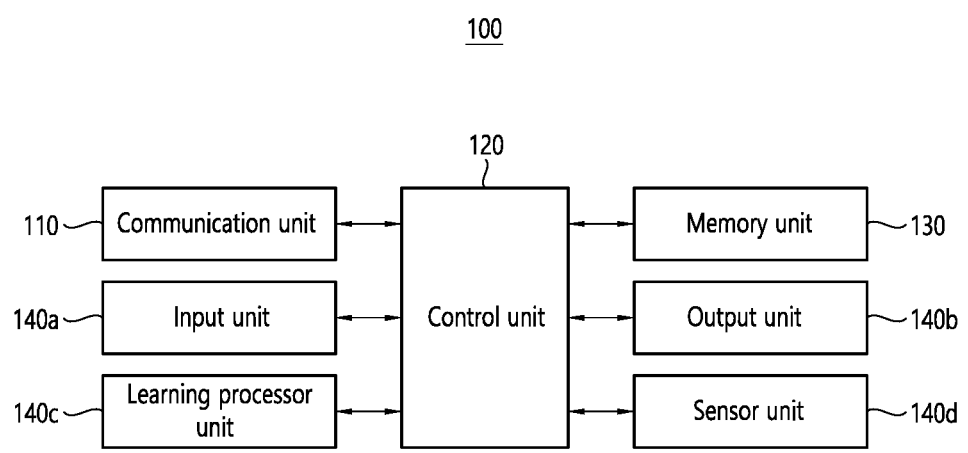
FIG. 27 illustrates an example of an AI device that can be applied to the present specification.

FIG. 27 illustrates an example of an AI device that can be applied to the disclosure of the present specification.

FIG. 27 illustrates an example of an AI device applied to the disclosure of the present specification. An AI device may be implemented as a fixed device or a mobile device, such as TVs, projectors, smartphones, PCs, laptops, digital broadcasting terminals, tablet PCs, wearable devices, set-top boxes (STBs), radios, washing machines, refrigerators, digital signage, robots, vehicles, and the like.

Referring to FIG. 27, the AI device 100 includes a communication unit 110, a control unit 120, a memory unit 130, an input/output unit 140a/140b, a learning processor unit 140c, and a sensor unit 140d. Blocks 110 to 130/140a to 140d respectively correspond to blocks 110 to 130/140 of FIG. 25.

The communication unit 110 communicates may transmit or receive wired signals and wireless signals (e.g., sensor information, user input, learning model, control signal, etc.) with external devices such as another AI device (e.g., FIG. 1, 100x, 200, 400) or an AI server (e.g., 400 of FIG. 22) by using a wired or wireless communication technology. To this end, the communication unit 110 may transmit information in the memory unit 130 to an external device, or may transmit a signal received from the external device to the memory unit 130.

The control unit 120 may determine at least one executable operation of the AI device 100 based on the information determined or generated using the data analysis algorithm or the machine learning algorithm. In addition, the control unit 120 may control the components of the AI device 100 to perform the determined operation. For example, the control unit 120 may request, search, receive, or utilize data of the running processor 140c or the memory 130. The control unit 120 may control the components of the AI device 100 to execute a predicted or desirable operation among at least one executable operation. In addition, the control unit 120 collects history information including the operation contents of the AI device 100 or the user's feedback on the operation, and stores the information in the memory unit 130 or the running processor unit 140c or transmits the information to an external device such as an AI server (FIG. 22, 400). The collected historical information can be used to update the learning model.

The memory unit 130 may store data supporting various functions of the AI device 100. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary for operation/execution of the control unit 120.

The input unit 140a may obtain various types of data from the outside of the AI device 100. For example, the input unit 140a may acquire training data for model learning, input data to which the training model is applied, and the like. The input unit 140a may include a camera, a microphone, and/or a user input unit. The output unit 140b may generate an output related to sight, hearing, or touch. The output unit 140b may include a display unit, a speaker, and/or a haptic module. The sensing unit 140 may obtain at least one of internal information of the AI device 100, environment information of the AI device 100, and user information using various sensors. The sensing unit 140 may include a proximity sensor, an illumination sensor, an acceleration sensor, a magnetic sensor, a gyro sensor, an inertial sensor, an RGB sensor, an IR sensor, a fingerprint sensor, an ultrasonic sensor, an optical sensor, a microphone, and/or a radar, and the like.

The learning processor unit 140c may train a model composed of artificial neural networks using the training data. The learning processor unit 140c may perform AI processing together with the learning processor unit of the AI server (FIGS. 12 and 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

As described above, although the embodiments have been described as examples, since the content and scope of this specification will not be limited only to a particular embodiment of this specification, this specification may be amended, modified, or enhanced to other various forms.

In the above exemplary systems, although the methods have been described on the basis of the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for managing Multi-Access (MA) Packet Data Unit (PDU) session, the method performed by Session Management Function (SMF) node and comprising:
   determining to release the MA PDU session for both of 3rd Generation Partnership Project (3GPP) access and non-3GPP access; and
   transmitting a first message related to PDU session release to Access and Mobility Management Function (AMF) node, via a first access being released firstly between the 3GPP access and the non-3GPP access, based on that the MA PDU session is determined to be released for both of the 3GPP access and the non-3GPP access,
   wherein the first message is Namf_Communication_N1N2MessageTransfer message or Nsmf_PDUSession_UpdateSMContext message, and
   wherein the first message includes a PDU session release command message, which is to be transferred to a User Equipment (UE); and
   transmitting a second message related to the PDU session release for releasing user plane resources of a second access being released secondly after the first access, after the first message is transmitted,
   wherein the second message is Namf_Communication_N1N2MessageTransfer message, and
   wherein the second message does not include a PDU session release command message, based on that the MA PDU session is to be released over both of the 3GPP access and non-3GPP access.

2. The method of claim 1, wherein the PDU session release command message includes information access type that the SMF wants to release.

3. The method of claim 1, further comprising:
   after the MA PDU session has released for both of the 3GPP access and the non-3GPP access, transmitting PDU session context status notify message to the AMF node.

4. A method for managing Multi-Access (MA) Packet Data Unit (PDU) session, the method performed by a user equipment (UE) and comprising:
   receiving Packet Data Unit (PDU) session establishment accept message related to the MA PDU session from a Session Management Function (SMF) node,
   wherein the MA PDU session is successfully established, based on the PDU session establishment accept message is received;
   receiving a PDU session release command message from an Access and Mobility Management Function (AMF) node via a first access,
   wherein the PDU session release command message is transmitted from the SMF node to the AMF node via the first access, which is being released firstly between the 3GPP access and the non-3GPP access, based on that the MA PDU session is determined to be released for both of the 3GPP access and the non-3GPP access,
   wherein the UE does not request to active user plane resources for the MA PDU session, based on the PDU session release command message, and
   wherein a PDU session release command message for second access being released after the first access is not received.

5. The method of claim 4, wherein the PDU session release command message includes information access type that the SMF wants to release.

* * * * *